United States Patent
Anderson et al.

(10) Patent No.: US 10,692,124 B1
(45) Date of Patent: Jun. 23, 2020

(54) SYSTEMS AND METHODS FOR ORDERING AND PREPARATION OF CUSTOMIZED COMESTIBLES

(71) Applicant: Decopac, Inc., Anoka, MN (US)

(72) Inventors: John R. Anderson, Lino Lakes, MN (US); Carlos A. Davila, Maple Grove, MN (US); Mitchell Huxhold, San Diego, CA (US); Sarah Schiebout, North Branch, MN (US); Andy Schnoebelen, Escondido, CA (US); Gina Watschke, Oak Grove, MN (US)

(73) Assignee: Decopac, Inc., Anoka, MN (US)

( * ) Notice: Subject to any disclaimer, the term of this patent is extended or adjusted under 35 U.S.C. 154(b) by 0 days.

(21) Appl. No.: 16/518,202

(22) Filed: Jul. 22, 2019

Related U.S. Application Data

(60) Provisional application No. 62/776,872, filed on Dec. 7, 2018.

(51) Int. Cl.
  *G06Q 30/00* (2012.01)
  *G06Q 30/06* (2012.01)
  (Continued)

(52) U.S. Cl.
  CPC ......... *G06Q 30/0621* (2013.01); *A21D 13/47* (2017.01); *A23P 20/25* (2016.08);
  (Continued)

(58) Field of Classification Search
  CPC ........... G06Q 30/0621; G06Q 30/0641; G06Q 10/087; A23P 20/25; A23P 2020/253; A21D 13/47
  See application file for complete search history.

(56) References Cited

U.S. PATENT DOCUMENTS

| 919,737 A | 4/1909 | Loesch |
| 1,605,903 A | 11/1926 | Schuler |

(Continued)

FOREIGN PATENT DOCUMENTS

| EP | 1702544 | 9/2006 |
| GB | 161740 | 4/1921 |

(Continued)

OTHER PUBLICATIONS

Liu, Zhenbin, et al. "3D printing: Printing precision and application in food sector." Trends in Food Science & Technology 69 (2017): 83-94. (Year: 2017).*

(Continued)

*Primary Examiner* — Matthew E Zimmerman
(74) *Attorney, Agent, or Firm* — Gardella Grace P.A.

(57) ABSTRACT

In an illustrative embodiment, systems for designing and producing customized food products include receiving a request to design a customized food product containing a printed edible medium. The systems may calculate, based on product inventory at a preferred bakery, a preparation lead time for the food product where the product inventory includes availability of printed edible media substrates. The systems may present customization user interface screens that provide customization options for the food product. The systems may convert customization option selections made at the customization user interface screens into decorating instructions for the food product and transmit the decorating instructions to the bakery. The systems may determine a position in a preparation queue for the food product based in part on attributes of pending food product orders in a preparation queue at the bakery.

24 Claims, 27 Drawing Sheets

(51) Int. Cl.
*G06Q 10/08* (2012.01)
*A23P 20/25* (2016.01)
*A21D 13/47* (2017.01)

(52) U.S. Cl.
CPC ....... *G06Q 10/087* (2013.01); *G06Q 30/0641* (2013.01); *A23P 2020/253* (2016.08)

(56) References Cited

U.S. PATENT DOCUMENTS

| | | | |
|---|---|---|---|
| 2,123,215 A | 7/1938 | Thomas |
| 2,347,022 A | 4/1944 | Austin |
| 2,353,594 A | 7/1944 | Seagren |
| 2,394,322 A | 2/1946 | McKee |
| 2,526,811 A | 10/1950 | Dawson |
| 2,578,150 A | 12/1951 | Rathke |
| 2,610,588 A | 9/1952 | Seagren et al. |
| 2,895,832 A | 7/1959 | Bersey |
| 3,057,730 A | 10/1962 | Morck |
| 3,192,086 A | 6/1965 | Gyurk |
| 3,649,347 A | 3/1972 | Battista |
| 3,654,894 A | 4/1972 | Rohrbacher et al. |
| 3,658,977 A | 4/1972 | Baker |
| 3,776,185 A | 12/1973 | Kawasaki |
| 3,852,494 A | 12/1974 | Williamson |
| 4,024,287 A | 5/1977 | Golchert |
| 4,038,423 A | 7/1977 | Hayward et al. |
| 4,061,783 A | 12/1977 | Hoffman et al. |
| 4,168,662 A | 9/1979 | Fell |
| 4,285,978 A | 8/1981 | Quinlivan |
| 4,292,917 A | 10/1981 | Ezaki |
| 4,388,862 A | 6/1983 | Thomas, Jr. |
| 4,409,893 A | 10/1983 | Newman et al. |
| 4,455,320 A | 6/1984 | Syrmis |
| 4,466,994 A | 8/1984 | Hubbard et al. |
| 4,531,292 A | 7/1985 | Pasternak |
| 4,537,647 A | 8/1985 | Foster |
| 4,548,825 A | 10/1985 | Voss et al. |
| 4,560,562 A | 12/1985 | Shroeder |
| 4,578,273 A | 3/1986 | Krubert |
| 4,592,916 A | 6/1986 | Akesson |
| 4,668,521 A | 5/1987 | Newsteder |
| 4,668,523 A | 5/1987 | Begleiter |
| 4,670,271 A | 6/1987 | Pasternak |
| 4,785,313 A | 11/1988 | Higuma et al. |
| 4,832,966 A | 5/1989 | Newsteder |
| 4,843,958 A | 7/1989 | Egosi |
| 4,910,661 A | 3/1990 | Barth et al. |
| 4,985,260 A | 1/1991 | Niaura et al. |
| 5,006,362 A | 4/1991 | Hilborn |
| 5,017,394 A | 5/1991 | Macpherson et al. |
| 5,032,416 A | 7/1991 | Niaura et al. |
| 5,035,907 A | 7/1991 | Phillips et al. |
| 5,081,917 A | 1/1992 | Masuda |
| 5,255,352 A | 10/1993 | Falk |
| 5,334,404 A | 8/1994 | Garcia et al. |
| 5,485,189 A | 1/1996 | Ebata |
| 5,505,775 A | 4/1996 | Kitos |
| 5,547,507 A | 8/1996 | Ciaramita |
| 5,555,350 A | 9/1996 | Strauss |
| 5,711,791 A | 1/1998 | Croker et al. |
| 5,795,395 A | 8/1998 | Ben-Matitayhu et al. |
| 5,834,047 A | 11/1998 | Ahn |
| 5,835,242 A | 11/1998 | Itoh |
| 5,862,326 A | 1/1999 | Bapat |
| 5,895,682 A | 4/1999 | Tsukioka |
| 6,045,220 A | 4/2000 | Kiyohara et al. |
| 6,058,843 A | 5/2000 | Young |
| 6,154,172 A | 11/2000 | Piccionelli et al. |
| 6,230,073 B1 | 5/2001 | Kofman et al. |
| 6,285,775 B1 | 9/2001 | Wu et al. |
| 6,499,842 B1 | 12/2002 | Kofman et al. |
| 6,536,345 B1 | 3/2003 | Young |
| 6,623,553 B2 | 9/2003 | Russell et al. |
| 7,012,712 B2 | 3/2006 | Spurgeon et al. |
| 7,161,710 B1 | 1/2007 | MacLeod |
| 7,216,092 B1 | 5/2007 | Weber et al. |
| 7,286,258 B2 | 10/2007 | Schnoebelen et al. |
| 7,360,853 B2 | 4/2008 | Barss |
| 7,884,953 B1 | 2/2011 | Willcocks et al. |
| 8,172,099 B1 | 5/2012 | Hardy |
| 8,219,494 B1 | 7/2012 | Pride et al. |
| 8,543,463 B2 | 9/2013 | Zakas et al. |
| 8,944,542 B2 | 2/2015 | Nohilly et al. |
| 9,044,037 B2 | 6/2015 | Ream et al. |
| 2001/0012529 A1 | 8/2001 | Genevieve |
| 2002/0047867 A1 | 4/2002 | Mault et al. |
| 2002/0049638 A1 | 4/2002 | Ito |
| 2002/0095231 A1 | 7/2002 | Yu et al. |
| 2002/0109600 A1 | 8/2002 | Mault et al. |
| 2002/0152927 A1 | 10/2002 | Russell et al. |
| 2003/0007191 A1 | 1/2003 | Herbert |
| 2003/0077074 A1 | 4/2003 | Okamoto et al. |
| 2003/0160824 A1 | 8/2003 | Szumla |
| 2003/0198719 A1 | 10/2003 | Stewart |
| 2004/0172149 A1 | 9/2004 | Eto |
| 2004/0267642 A1 | 12/2004 | Stenz et al. |
| 2005/0088693 A1 | 4/2005 | Schnoebelen et al. |
| 2005/0157148 A1 | 7/2005 | Baker et al. |
| 2005/0237567 A1 | 10/2005 | Morris |
| 2005/0254073 A1 | 11/2005 | Braun et al. |
| 2006/0155645 A1 | 7/2006 | Sainsbury-Carter et al. |
| 2006/0158685 A1 | 7/2006 | Spurgeon et al. |
| 2006/0207433 A1 | 9/2006 | Sadakata et al. |
| 2006/0279771 A1 | 12/2006 | Ludwig et al. |
| 2008/0144883 A1 | 6/2008 | Kacker et al. |
| 2008/0174676 A1 | 7/2008 | Squilla et al. |
| 2008/0184377 A1 | 7/2008 | Kato |
| 2008/0209509 A1 | 8/2008 | Koike et al. |
| 2008/0232686 A1 | 9/2008 | Ohashi |
| 2008/0309961 A1 | 12/2008 | Aichi et al. |
| 2008/0313011 A1 | 12/2008 | Rose et al. |
| 2008/0319870 A1 | 12/2008 | Ranjitkumar et al. |
| 2009/0046308 A1 | 2/2009 | Ishizuka |
| 2009/0100013 A1 | 4/2009 | Fein et al. |
| 2009/0244096 A1 | 10/2009 | Yamaji et al. |
| 2009/0285480 A1 | 11/2009 | Bennett et al. |
| 2009/0308931 A1 | 12/2009 | Halbur et al. |
| 2010/0017491 A1 | 1/2010 | Johns et al. |
| 2010/0185529 A1 | 7/2010 | Chesnut et al. |
| 2010/0199232 A1 | 8/2010 | Mistry et al. |
| 2010/0232716 A1 | 9/2010 | Sanders |
| 2010/0281424 A1 | 11/2010 | Vaysburg et al. |
| 2010/0315491 A1 | 12/2010 | Carter et al. |
| 2011/0025735 A1 | 2/2011 | Nohilly et al. |
| 2011/0071894 A1 | 3/2011 | Nesamoney et al. |
| 2011/0090541 A1 | 4/2011 | Harper |
| 2011/0290694 A1 | 12/2011 | Fuisz et al. |
| 2012/0020648 A1 | 1/2012 | Yamaji |
| 2012/0064204 A1 | 3/2012 | Davila et al. |
| 2012/0251689 A1 | 10/2012 | Batchelder |
| 2014/0176608 A1 | 6/2014 | Boysen et al. |
| 2014/0210947 A1 | 7/2014 | Finn et al. |
| 2015/0015919 A1 | 1/2015 | Anderson et al. |
| 2016/0262442 A1* | 9/2016 | Davila ............... H04N 1/00411 |
| 2017/0265515 A1* | 9/2017 | Davila ..................... A23G 3/28 |

FOREIGN PATENT DOCUMENTS

| | | |
|---|---|---|
| GB | 196885 | 3/1924 |
| GB | 422430 | 1/1935 |
| GB | 543427 | 2/1942 |
| GB | 628886 | 9/1949 |
| GB | 786428 | 11/1957 |
| JP | 59118049 | 7/1984 |
| JP | 60126057 | 7/1985 |
| JP | 2163058 | 6/1990 |
| WO | 95/01735 | 1/1995 |
| WO | 97/27759 | 8/1997 |
| WO | 2004049809 | 6/2004 |
| WO | 2007013061 | 1/2007 |
| WO | 2015003210 | 1/2015 |

OTHER PUBLICATIONS

(56) References Cited

OTHER PUBLICATIONS

Non-Final Office Action issued in U.S. Appl. No. 14/194,000 dated Oct. 25, 2016.
Final Office Action issued in U.S. Appl. No. 14/194,000 dated Mar. 14, 2017.
Non-Final Office Action issued in U.S. Appl. No. 14/194,000 dated Oct. 2, 2017.
Non-Final Office Action issued in U.S. Appl. No. 12/852,988 dated May 18, 2012.
Final Office Action issued in U.S. Appl. No. 12/852,988 dated Feb. 14, 2013.
Non-Final Office Action issued in U.S. Appl. No. 12/852,988 dated Dec. 11, 2014.
Final Office Action issued in U.S. Appl. No. 12/852,988 dated Jun. 24, 2015.
Non-Final Office Action issued in U.S. Appl. No. 12/852,988 dated Jun. 2, 2016.
Non-Final Office Action issued in U.S. Appl. No. 13/287,023 dated Feb. 27, 2015.
Final Office Action issued in U.S. Appl. No. 13/287,023 dated Jun. 3, 2015.
Non-Final Office Action issued in U.S. Appl. No. 13/287,023 dated Oct. 2, 2015.
Final Office Action issued in U.S. Appl. No. 13/287,023 dated Feb. 3, 2016.
Non-Final Office Action issued in U.S. Appl. No. 13/287,023 dated Aug. 31, 2016.
Non-Final Office Action issued in U.S. Appl. No. 14/553,884 dated Mar. 24, 2015.
Final Office Action issued in U.S. Appl. No. 14/553,884 dated Jul. 21, 2015.
Non-Final Office Action issued in U.S. Appl. No. 14/569,042 dated Mar. 27, 2015.
Final Office Action issued in U.S. Appl. No. 14/569,042 dated Jul. 21, 2015.
Non-Final Office Action issued in U.S. Appl. No. 14/569,224 dated Apr. 1, 2015.
Final Office Action issued in U.S. Appl. No. 14/569,224 dated Jul. 21, 2015.
Non-Final Office Action issued in U.S. Appl. No. 15/167,811 dated Dec. 16, 2016.
Non-Final Office Action issued in U.S. Appl. No. 14/492,620 dated Mar. 24, 2017.
Final Office Action issued in U.S. Appl. No. 14/492,620 dated Sep. 29, 2017.
Non-Final Office Action issued in U.S. Appl. No. 14/492,620 dated Apr. 11, 2018.
Final Office Action issued in U.S. Appl. No. 14/492,620 dated Nov. 21, 2018.
Non-Final Office Action issued in U.S. Appl. No. 15/157,142 dated Nov. 13, 2018.
Final Office Action issued in U.S. Appl. No. 15/157,142 dated Apr. 19, 2019.
Non-Final Office Action issued in U.S. Appl. No. 15/164,545 dated Dec. 14, 2016.
Non-Final Office Action issued in U.S. Appl. No. 15/164,545 dated Jul. 20, 2017.
Notice of Allowance issued in U.S. Appl. No. 10/925,459 dated Dec. 16, 2005.
Notice of Allowance issued in U.S. Appl. No. 13/287,023 dated Mar. 20, 2017.
Notice of Allowance issued in U.S. Appl. No. 14/194,000 dated Mar. 19, 2018.
Notice of Allowance issued in U.S. Appl. No. 14/492,620 dated Jun. 12, 2019.
Notice of Allowance issued in U.S. Appl. No. 14/553,884 dated Nov. 18, 2015.
Notice of Allowance issued in U.S. Appl. No. 14/569,042 dated Feb. 12, 2016.
Notice of Allowance issued in U.S. Appl. No. 14/569,224 dated Dec. 2, 2015.
Notice of Allowance issued in U.S. Appl. No. 15/157,142 dated Jul. 16, 2018.
Notice of Allowance issued in U.S. Appl. No. 15/164,545 dated Apr. 12, 2017.
Notice of Allowance issued in U.S. Appl. No. 15/164,545 dated Dec. 7, 2017.
Notice of Allowance issued in U.S. Appl. No. 15/167,811 dated Apr. 25, 2017.
International Search Report and Written Opinion issued in International Application No. PCT/US2011/047096 dated Jan. 5, 2012.
International Preliminary Report on Patentability and Written Opinion issued in International Application No. PCT/US2011/047096 dated Feb. 12, 2013.
International Search Report and Written Opinion issued in International Application No. PCT/US2017/032948 dated Aug. 22, 2017.
International Preliminary Report on Patentability issued in International Application No. PCT/US2017/032948 dated Nov. 20, 2018.
Ferguson Plarre Bakehouses, Birthday Cakes, Celebrations Cakes, Sweets & Savouries Online, Retrieved from the Internet on Mar. 14, 2017 at: https://www.fergusonplarre.com.au/designacake, 2 pages.
"From Phone to Foam—Steam CC Launches the Coffee Ripples App Putting Consumers in Control of "Coffee Art Content" in a Cup" PR Newswire, Jan. 6, 2016, 4 Pages, http://www.prnewswire.com/news-releases/from-phone-to-foam---steam-cc-launches-the-coffee-ripples-app-putting-consumers-in-control-of-coffee-art-content-in-a-cup-300200121.html, 4 pages.
Topperoo, Quick Start Guide, Mar. 7, 2017, 3 pages, http://support.topperoo.com/article/36-quick-start-guide, 3 pages.
Genometri, On-line Design Tools, Retrieved from the Internet on Sep. 5, 2019 at: http://www.genometri.com/, 1 page.
Icing Images, About iPrint Image Printing, Retrieved from the Internet on Sep. 6, 2019 at: http://www.icingimages.com/iprint, 4 pages.
Icing Images, iPrint Image Printing Template Designer, Retrieved from the Internet on Sep. 6, 2019 at: http://www.icingimages.com/iprint-template-designer, 3 pages.
Icing Images, Order an Edible Picture or iDesigns Pattern Print, Retrieved from the Internet on Sep. 6, 2019 at: http://www.icingimages.com/edible-cake-picture, 4 pages.
Supplementary European Search Report issued in EP Patent Application No. 06766166 dated Jun. 19, 2008.

\* cited by examiner

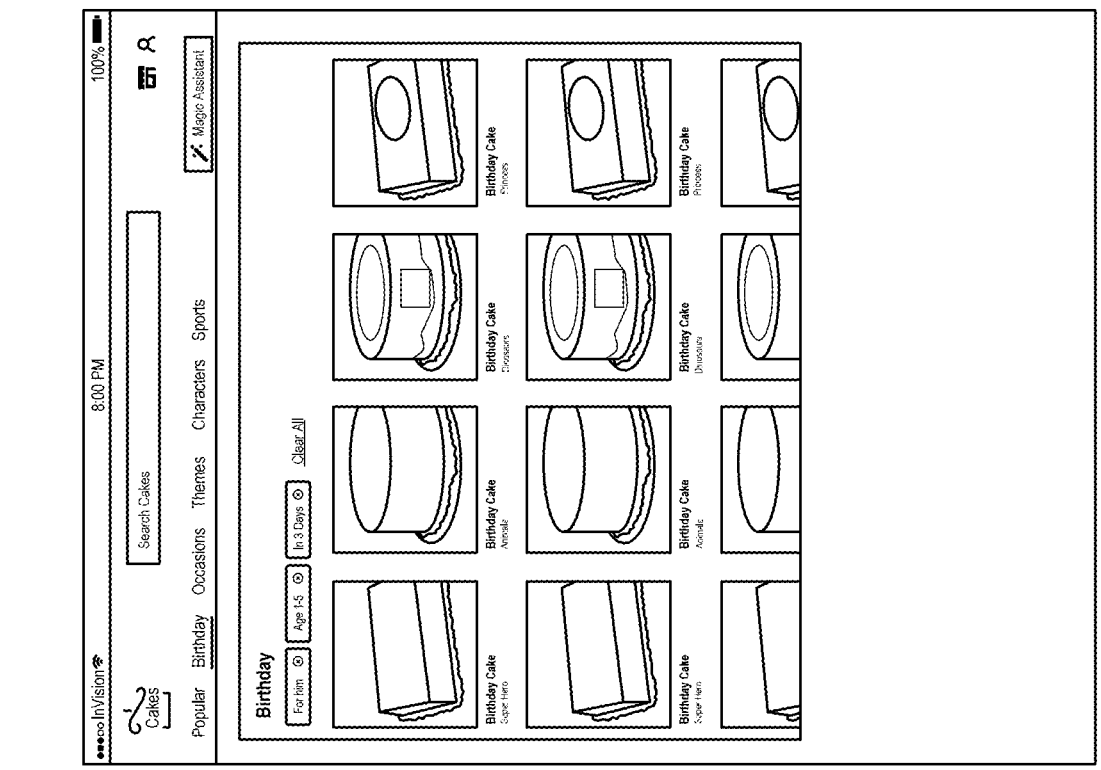
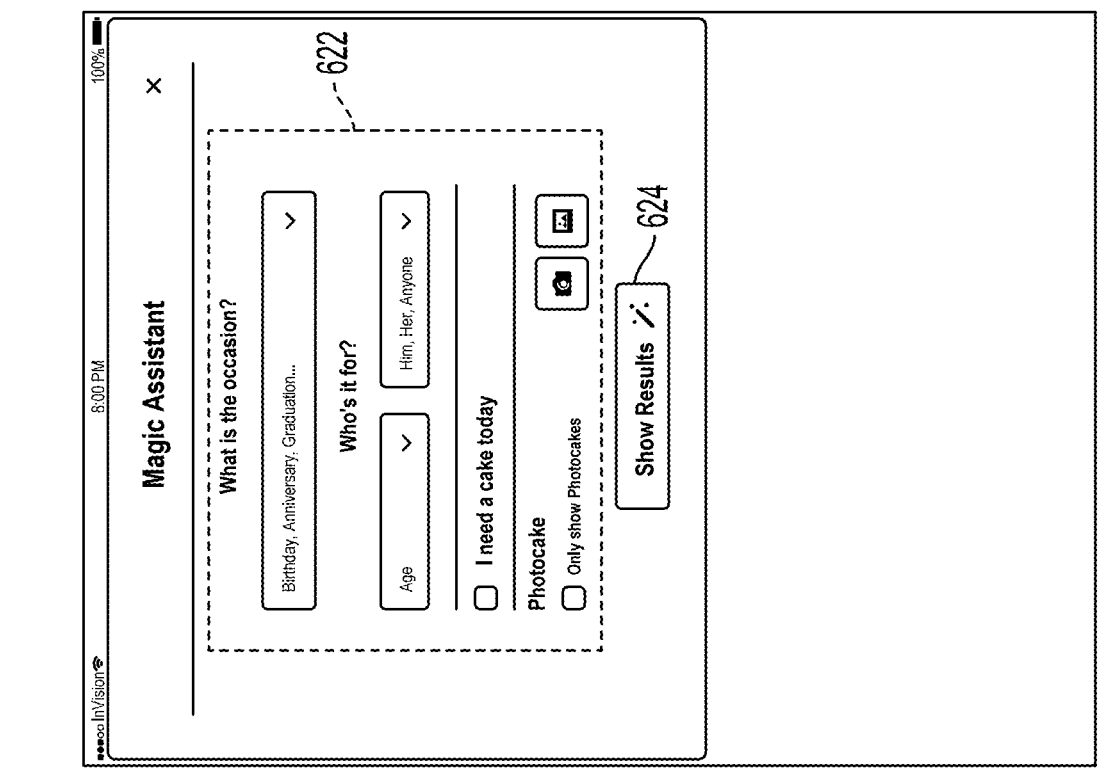
FIG. 6C
FIG. 6D

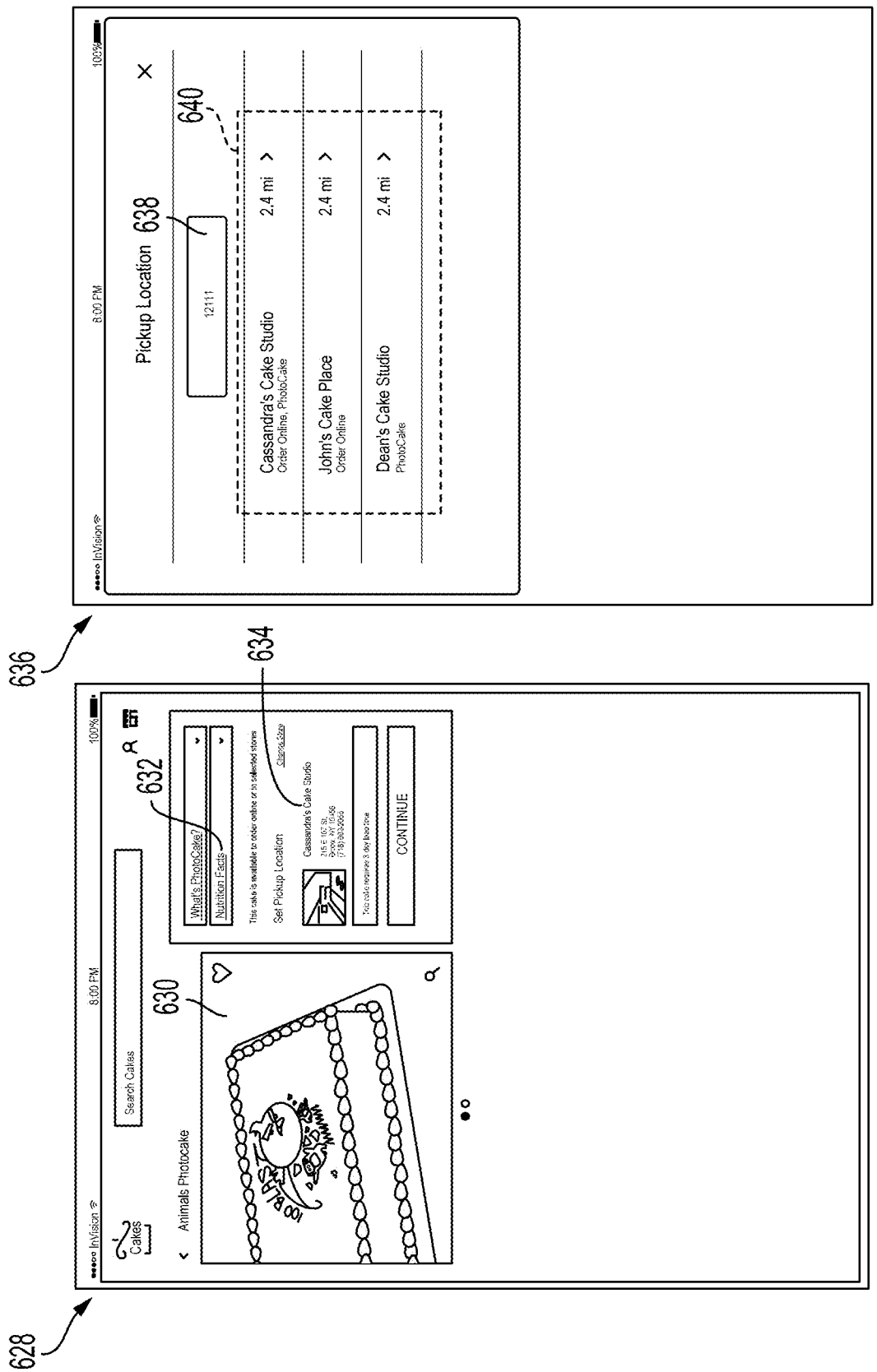

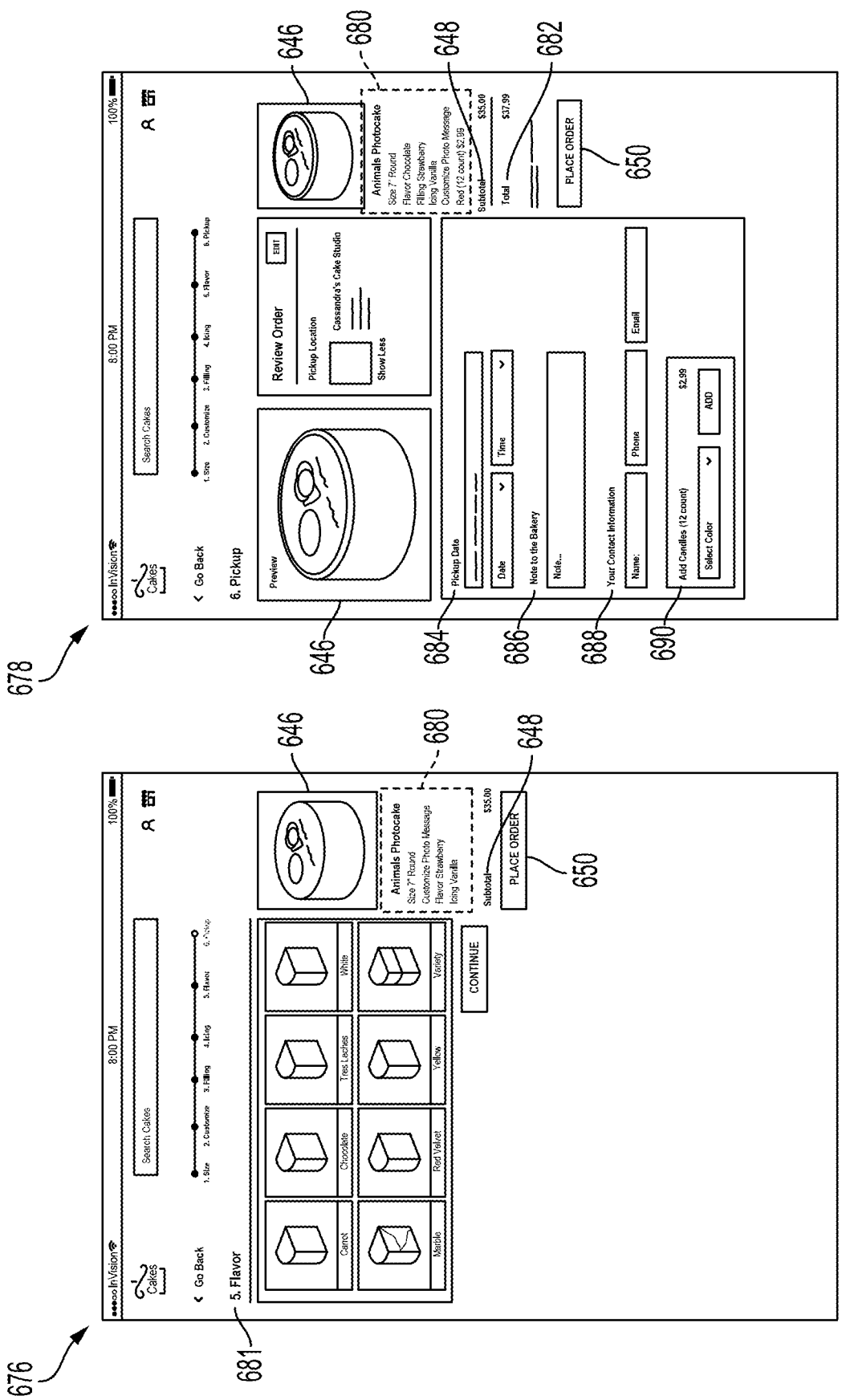

Dashboard

Orders   Cakes   Store   Reports   Bakery Cakes   My Profile

DECO PAC

Summary — 802

| New Orders | Accepted Orders | Cancelled Orders | Completed Orders |
|---|---|---|---|
| 17 | 64 | 4 | 4 |

Most Recent Orders — 804

| Order No. | Pickup Date▾ | Pickup Time | Item Number/Name | Price | Source | Status | Date Accepted | |
|---|---|---|---|---|---|---|---|---|
| 123 | 6/8/18 | 3:30 PM | 58202 Angry Birds Tick, Tick, Boom PhotoCake® Frame Cake | $123.45 | kiosk | ○ New | -- | ˄ |
| 123 | 6/8/18 | 3:30 PM | 38251 Angry Birds Launching Cake Kit Cake | $48.50 | kiosk | ○ New | -- | ˄ |
| 123 | 6/8/18 | 3:30 PM | PC-Custom Cake Personalized PhotoCake Cake | $35.00 | kiosk | ○ New | -- | ˄ |
| 123 | 6/8/18 | 3:30 PM | 58202 Angry Birds Tick, Tick, Boom PhotoCake® Frame Cake | $123.45 | kiosk | ○ New | -- | ˄ |
| 123 | 6/8/18 | 3:30 PM | 58202 Angry Birds Tick, Tick, Boom PhotoCake® Frame Cake | $35.00 | kiosk | ○ New | -- | ˄ |

View All Open Orders➔

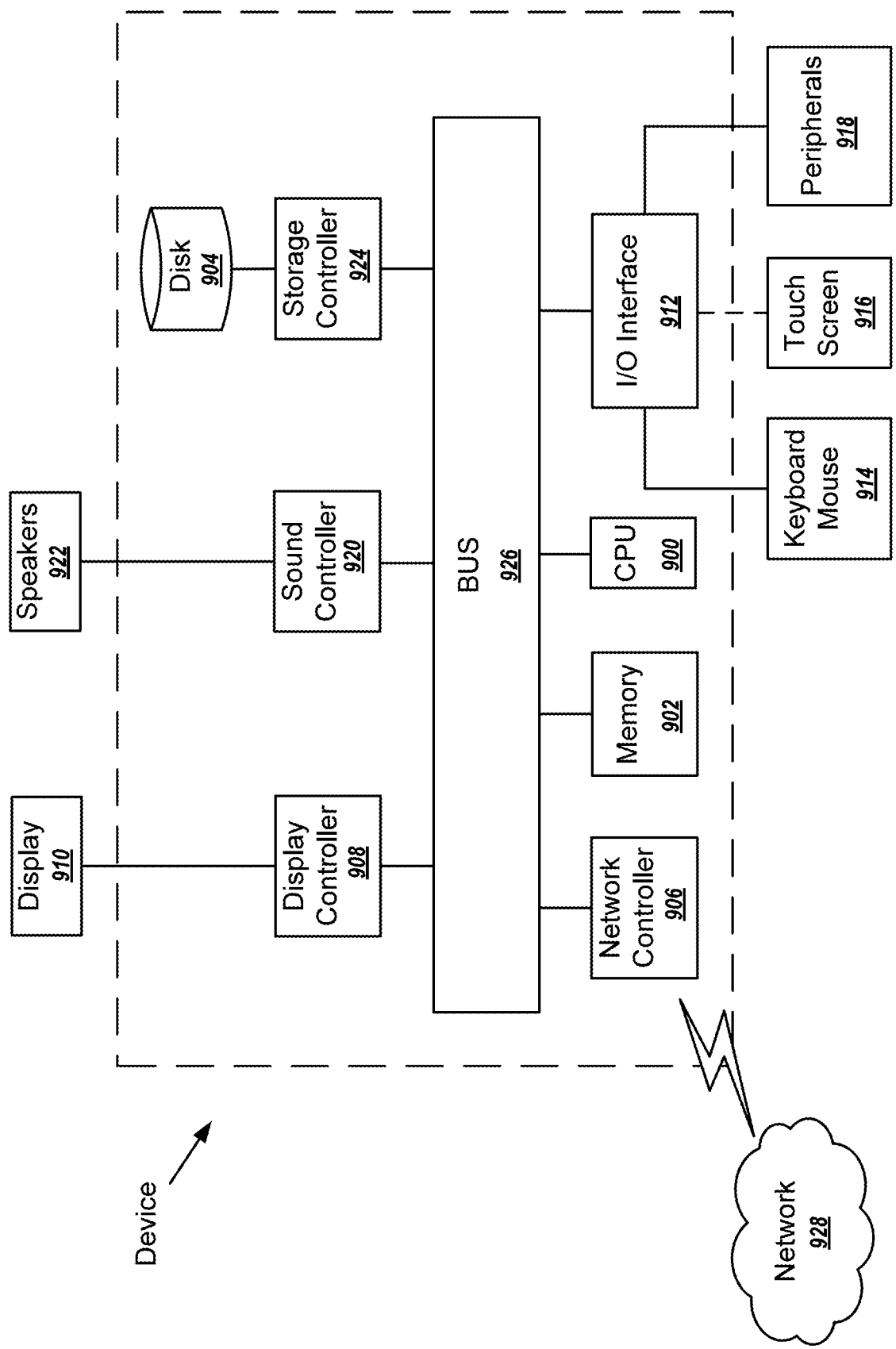

SYSTEMS AND METHODS FOR ORDERING AND PREPARATION OF CUSTOMIZED COMESTIBLES

RELATED APPLICATIONS

This application claims priority to U.S. Provisional Patent Application Ser. No. 62/776,872, entitled "Systems and Methods for Ordering and Preparation of Customized Comestibles," filed Dec. 7, 2018.

This application is related to the following prior patent applications: U.S. Pat. No. 9,743,687, entitled "Decorating System for Edible Items" and filed on May 27, 2016, which is a continuation-in-part of U.S. patent application Ser. No. 13/287,023 entitled "Online Decorating System for Edible Items" and filed on Nov. 1, 2011, now U.S. Pat. No. 9,713,342, which is a continuation-in-part of U.S. patent application Ser. No. 12/852,988, entitled "Decorating System for Edible Products" and filed on Aug. 9, 2010; U.S. patent application Ser. No. 10/925,459, entitled "Decorating System for Edible Items" and filed on Aug. 25, 2004, now U.S. Pat. No. 7,012,712; U.S. patent application Ser. No. 14/553,884, entitled "Online Decorating System for Edible Products" and filed on Nov. 25, 2014, now U.S. Pat. No. 9,282,750 and is a continuation of U.S. patent application Ser. No. 13/287,023, entitled "Online Decorating System for Edible Products" and filed on Nov. 1, 2011, now U.S. Pat. No. 9,713,342; U.S. patent application Ser. No. 14/569,224, entitled "Online Decorating System for Edible Products" and filed on Dec. 12, 2014, now U.S. Pat. No. 9,314,050 and is a continuation of U.S. patent application Ser. No. 13/287,023, entitled "Online Decorating System for Edible Products" and filed on Nov. 1, 2011, now U.S. Pat. No. 9,713,342; U.S. patent application Ser. No. 14/569,042, entitled "Online Decorating System for Edible Products" and filed on Dec. 12, 2014, now U.S. Pat. No. 9,345,264, which is a continuation of U.S. patent application Ser. No. 13/287,023, entitled "Online Decorating System for Edible Products" and filed on Nov. 1, 2011, now U.S. Pat. No. 9,713,342; U.S. patent application Ser. No. 14/194,000, entitled "Decorating System for Edible Products" and filed on Feb. 28, 2014, now U.S. Pat. No. 10,019,842, which is a continuation-in-part of U.S. patent application Ser. No. 12/852,988, entitled "Decorating System for Edible Products" and filed on Aug. 9, 2010; U.S. patent application Ser. No. 14/492,620, entitled "Decorating System for Edible Products" and filed on Sep. 22, 2014, which is Pending and is a continuation-in-part of U.S. patent application Ser. No. 12/852,988, entitled "Decorating System for Edible Products, and filed on Aug. 9, 2010; U.S. patent application Ser. No. 15/157,142, entitled "Three-Dimensional Decorating System for Edible Items" and filed on May 17, 2016 which is Pending and is a continuation-in-part U.S. patent application Ser. No. 13/287,023, entitled "Online Decorating System for Edible Products" and filed on Nov. 1, 2011, now U.S. Pat. No. 9,713,342; and U.S. patent application Ser. No. 15/164,545, entitled "Decorating System for Edible Items" and filed on May 25, 2016, now U.S. Pat. No. 9,907,332, which is a continuation-in-part U.S. patent application Ser. No. 13/287,023, entitled "Online Decorating System for Edible Products" and filed on Nov. 1, 2011, now U.S. Pat. No. 9,713,342; each of which is also incorporated herein by reference.

BACKGROUND

Decorative food products, such as cakes, are popular items, particularly for special occasions, such as birthdays, holidays, weddings, anniversaries and other celebratory events. These items are typically purchased from bakeries since the items generally require some skill and/or apparatus to create. Previously, these items were created from colored frostings applied manually by trained bakery decorators. For example, pre-made decorative items can be placed on a food product. These pre-made items are generally produced in bulk in a factory and inventoried until use. The use of such pre-made decorative items precludes uniquely decorated and/or personalized decorations. Also, these pre-made decorative items are generally pre-ordered, which requires a long lead time, or stored in inventory at the risk of under-ordering or over-ordering, as well as the cost of such inventory.

Another alternative has been to utilize an automated system for decorating cakes. One such system is disclosed in U.S. Pat. No. 5,505,775, issued to Kitos. This system utilizes an integrated work surface controlled with a computer system. A 2-dimensional image is scanned into the computer system. The computer system then uses a motion control system to manipulate a drop-on-demand colorant expulsion system over a cake carried on the work surface to reproduce the scanned image. This system produces the decorations and images directly onto the food product.

An automated system for printing images onto edible media, that can then be applied to a food product or consumed as is, is disclosed in U.S. Pat. No. 7,286,258, issued to Schnoebelen et al., which is incorporated by reference herein. This system discloses a local processing unit and a number of image sources, including a scanner and a database of digital images stored on a local computer memory system. The user selects an image from one of the image sources and prints the image onto an edible media.

A decorating system for edible items is disclosed in U.S. Pat. No. 7,012,712, issued to Spurgeon et al., which is incorporated herein by reference. This system discloses creating a decorative edible item from a selected image. The system includes at least one image source, such as a scanner and/or a library of stored images, a controller unit and a printer for creating a high-quality pictorial rendition of the image. The printed edible media can then be applied onto a product, shipped to a separate location or eaten as is.

Various websites exist for allowing users to customize decorations. One such online website is www.genometri.com which allows users to decorate and purchase customized decorated cakes. Users can choose from pre-designed decorative templates or can choose to customize their cake decoration. Users can upload personal photographs to use in the cake decoration and can add text and clip art to the cake decoration. When the user is finished decorating the cake, the user purchases a cake decorated with the customized decoration. The purchase transaction is processed through the website.

SUMMARY OF ILLUSTRATIVE EMBODIMENTS

The forgoing general description of the illustrative implementations and the following detailed description thereof are merely exemplary aspects of the teachings of this disclosure and are not restrictive.

In some embodiments, systems for designing and producing customized food products include receiving a request to design a customized food product containing a printed edible medium. The systems may calculate, based on product inventory at a preferred bakery, a preparation lead time for the food product where the product inventory includes availability of printed edible media substrates. The systems may present customization user interface screens that provide customization options for the food product. The systems may convert customization option selections made at the customization user interface screens into decorating instructions for the food product and transmit the decorating instructions to the bakery. The systems may determine a position in a preparation queue for the food product based in part on attributes and decorating instructions for pending food product orders in a preparation queue at the bakery.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 8 illustrates an example bakery administrative user interface screen for preparing customized cake products;

FIG. 9 is a block diagram of an example computing system; and

DETAILED DESCRIPTION OF ILLUSTRATIVE EMBODIMENTS

Figure 1A:
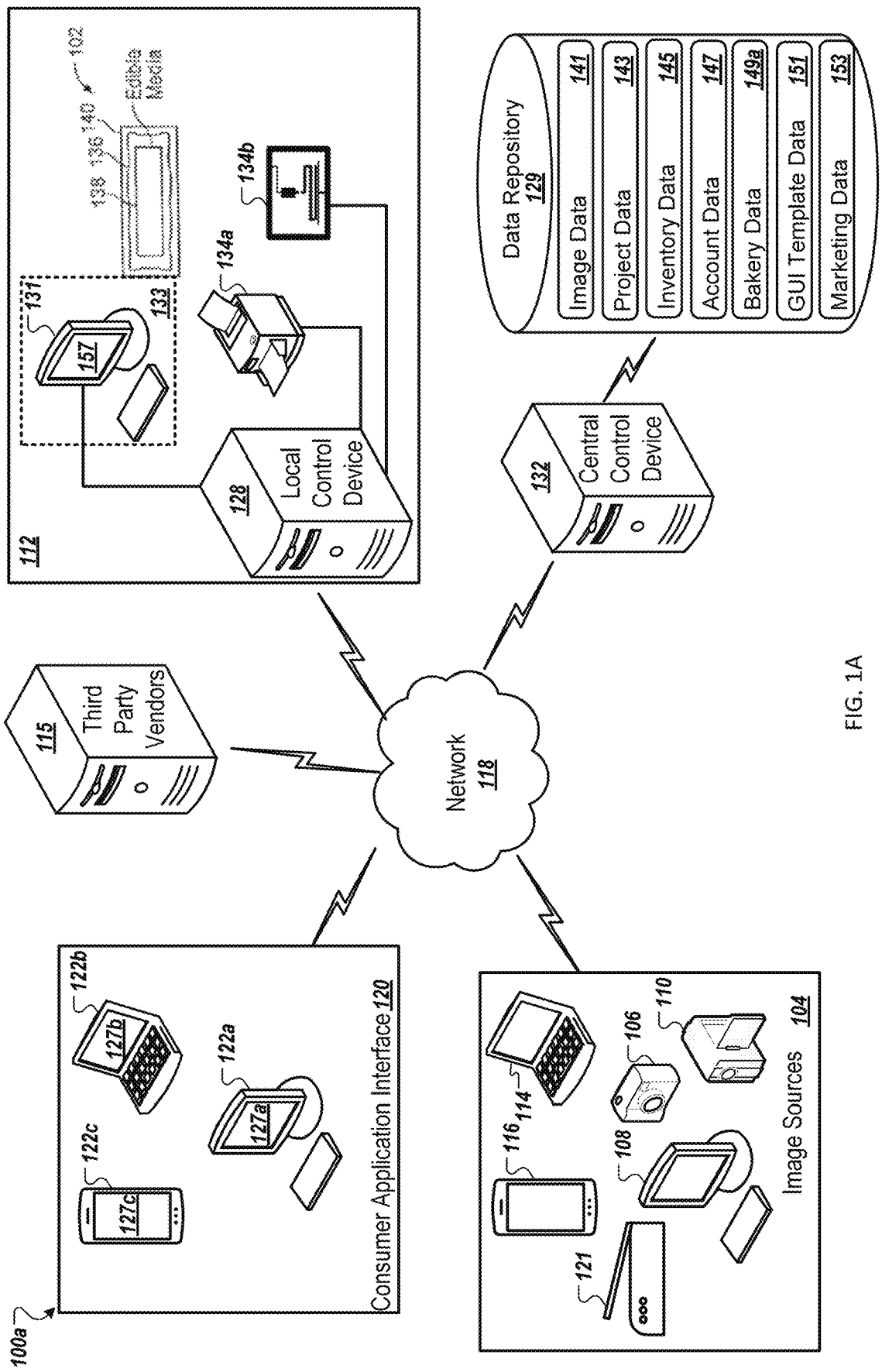
FIG. 1A illustrates an example system for designing and producing customized food products with edible media.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Aspects of the present disclosure are directed to a system for designing and producing customized food products with edible media. In some implementations, the system allows consumers to design a customized food product that include printed edible media, such as a cake, without any or very few interactions with a bakery. For example, the system can present a number of user interface screens at a remote computing device that allow the consumer to identify the size, shape, cake and filling flavor, icing flavor and color, design and placement of decorations as well as upload and edit photos to be printed on edible media for the customized food product. In some embodiments, the system maintains an inventory status for bakeries that interact with the system and is configured to present to consumers designing and producing customized food products only those customization options that are available at a selected bakery based on the inventory status for that bakery. Further, the system can be configured to calculate and update a lead time for preparing the customized food product based upon the customization selections that are made by the consumer, inventory status at the selected bakery, and a current workload at the selected bakery (e.g., other pending custom food product orders).

In some implementations, the system is configured to provide administrative functions to bakeries through a number of administrative user interface screens. For example, upon receiving a submitted order from a consumer, the system can convert the order information into decorating instructions for the customized food product, which are transmitted to a remote computing system for the bakery. Based on a workload at the bakery receiving a customized food product order, the system can determine an order of preparation for the food product orders based on the lead times for each product, inventory status at the bakery, and desired pickup date for each order. In some examples, the system can determine an optimal order for printing edible media for the pending food product orders at a bakery to maximize throughput. By allowing consumers to design customized food products with edible media from start to finish in a closed loop cake ordering ecosystem, the system solves the problem of providing consumers the ability to have knowledge and control over what the completed customized food product will look like without having information lost in translation between the consumer and the bakery. Further, the system also provides the additional benefit of automatically managing inventory and pending order status at bakeries, which improves throughput and efficiency.

In some embodiments, the system for designing and producing customized food products with edible media also allows consumers to design deli food products with customized edible media and designs for products that include deli trays (e.g., cheese and cracker trays, fruit and vegetable trays, chips and dip trays), pizza, sandwiches, hamburgers, and hot dogs. Additionally, customized deli food products can also include fruits or vegetables (e.g., melons, squash) that have customized etching designs applied to an outer skin or surface of the fruits or vegetables with laser etchers/printers that are communicatively coupled to the system. Like the dessert-based food products, consumers can also design customized deli food products from start to finish in a closed loop ordering ecosystem by interacting with a web-based application provided by the system without any additional communication or interactions with the deli and with capability for intervention by deli employees if necessary.

FIG. 1A is an example system 100a for designing and customizing media 102. The system 100 provides an online environment for designing and customizing edible media. In some implementations, the online environment includes one or more web-based applications with which consumers can interact to design customized food products. The system 100a can provide a mechanism to perform online or local searching of images and customization of images as well as a mechanism for receiving images uploaded from a remote image source 104 of a consumer (e.g., laptop, tablet, mobile device, or digital camera). In some examples, the system 100a enables consumers to design and customize an entire food product (e.g., cookies, cakes, pizza, cupcakes, candy bars, edible tattoos, temporary tattoos, cereal boxes, waffles, and pancakes), which may include selecting edible media design and decorative attributes (e.g., cake flavor, icing colors, placement of decorative elements) for the food product. In some implementations, the system 100a converts the decorative attributes for the food product to decorating instructions, which are transmitted with the edible media design to a local control device 128 at a bakery.

As used herein, an image can be any work protected by a copyright, registered copyright and/or a registered trademark including a regular image or photograph, a digital image, a fictional character, a celebrity, an emblem, a logo, a mascot, an illustration, a pictorial, a graphic, as well as works not in image form such as sculptural works, which include two- and three-dimensional works of fine, graphic, and applied art. An image can include an image protected by a commercial license. An image can include a series or collection of two or more images, a schematic, and a computer aided design (CAD) file for deriving or rendering a 2D or 3D form or object. In an example, the 2D or 3D form or object can be a figurine that is based on a copyrighted character or a generic body of a part of a figurine. Further, an image can also include derivatives of the copyrighted works and the trademarked works, as well as any other original work including non-copyright protected images or unpublished work such as personal photographs, digital images, videos, illustrations, clip art, and other original works. In an example, the 2D or 3D form or object can have 2D elements or 3D elements that can be customized, such as size, color, and features that can be merged with user data for a personalized birthday kid (e.g. image of face of kid on the figurine, etc.).

As used herein, edible media can be any two-dimensional or three-dimensional ingestible product. In an example, edible media may be a baked good such as a cake, cupcake, cookie, or pizza crust. In another example, edible media may be temperature-sensitive media such as an ice cream cake, ice form, or gelatin. In a further example, edible media may be a planar printable surface such as edible paper, wafer, or edible media sheet. In an additional example, edible media may be a three-dimensional edible confection such as an off-the-shelf edible decoration (e.g., SugarSoft® Decorations by DecoPac, Inc. of Anoka, Minn.), candy, or chocolate.

As used herein, printable base media can be any two-dimensional or three-dimensional nontoxic product used as a base for printing two-dimensional or three-dimensional edible decorations. In an example the printable base media can be the food product. In an example, the printable base media can include edible media, as described above. In another example, printable base media can include a planar nontoxic material such as a flat plastic base material, a flat metal base material, or a flat paper or cardboard base material (e.g., a cake board), a silicon transfer sheet, or a wax paper transfer sheet. In a further example, printable base media can include a formed nontoxic material such as a ring form (e.g., to be worn on the finger as a ring pop) or a stem form (e.g., popsicle stick with planar printing surface onto which an edible decoration can be printed). In additional examples, a printable base media may be printed prior to printing of an edible item. In a particular example, the printable base media can be a 3D printed flower stem form that can be made from an edible or inedible material unto which the secondary shape, edible or nonedible, may be printed, such as a flower.

The system 100a is operated by consumers and bakery personnel to design customized food products and print and/or customize images for 2D and/or 3D edible media including both licensed and non-licensed digital images associated with the customized food products. The system 100a additionally provides digital rights management, print monitoring functions, user account management, and messaging functions.

The system 100a manages both licensed and non-licensed images for purposes of obeying licensing laws when printing the images on an edible medium. Licensed digital images, such as copyrighted images including fictional characters, celebrities, emblems, logos, mascots, illustrations, or photographs having licensing terms and conditions for usage can be purchased from one or more online sources. In an example, the image can be a grouping of multiple 3D elements such as a set of individual characters (e.g., a feature film character set).

Non-licensed digital images such as personal photographs, illustrations, clip art, or other non-copyright protected images can be uploaded locally to the system 100 from a remote image source 104. In some examples, both licensed and non-licensed digital images can be retrieved from an external device or the Internet, stored locally, and uploaded to the system 100a. In some embodiments, a combination of licensed and non-licensed digital images are retrieved either locally or online and printed in combination on a single printable base media. In some embodiments, the uploaded digital files may be of a scanned three-dimensional shape such as a person or thing.

In some implementations, consumers may access the online environment in system 100a to search, select, and edit images. In some implementations, consumers and/or bakery personnel may also and purchase images for printing onto 2D or 3D edible media. The purchased images can be printed onto the edible media 102 using edible inks. The consumer selects the image, purchases and/or edits the image, and directs the system 100a to print the purchased image onto the edible media 102. In some implementations, bakery personnel at bakery 112 can purchase the images, which are provided to consumers for selection when designing the customized food product. In some examples, the images available to system 100a can be retrieved from any number of sources including local, online, or remote storage repositories. For example, images can be retrieved from remote image sources 104 which are communicably connectable to system 100a. The image sources 104 can include, but are not limited to a digital camera 106, a video device 110, a laptop computer 114, a mobile device 116, a computer 108 available on a local network 118, a scanner 121, a CD-ROM OR DVD, a flash drive, an external hard drive, a netbook, a laptop, a wireless device (e.g., Wi-Fi enabled, Bluetooth enabled, or other wirelessly enabled device), or a handheld device such as a "smart" phone or tablet.

Images can also be retrieved via the network 118 from any number of websites containing digital images or libraries of digital images. Images can additionally be retrieved from other networked or remote storage repositories (not shown). Upon retrieving images, the system 100a provides access to additional features for handling retrieved images, such as photograph editing, social networking content insertion, or augmented reality content insertion.

In some implementations, bakeries 112 can purchase edible media and other food product ingredients using one or more e-commerce sites associated with one or more third-party vendors 115. For example, the bakers 112 can purchase an edible sheet from an e-commerce site incorporated into system 100a. E-commerce sites associated with system 100a, for example, provide a number of selectable options for obtaining 2D and 3D edible media materials. Bakery personnel, in some implementations, can choose standard "off-the-shelf" edible media items or custom edible media items, which may be based in part on selections made by consumers at a user interface 120 of a remote computing device.

In some configurations, the bakery 112 may be provided the option to purchase edible media locally using the system 100a. For example, the bakery 112 may be offered several sizes of edible media for decorating. The bakery 112 can select a desired decoration size and choose an edible media (e.g., an edible sheet of paper) size comparable to the desired decoration size. The selected edible media (e.g., edible media 102) can be purchased through the system 100a by entering an appropriate edible media code or by simply selecting the desired edible media onscreen. The edible media code can, in effect, function as a part number for ordering a specific edible media sheet size. In some implementations, the edible media code is requested by the system 100a to prompt the bakery 112 to select an edible medium available locally in the bakery 112, for example. The selected edible medium can be loaded into the system 100a and images can be printed upon the edible medium.

In certain embodiments, the system 100a may request that the bakery 112 enter a unique code. The unique code may be sent to the bakery 112 with edible media prior to accessing system 100a. The unique code can be entered once by the bakery 112 to enable printing of images a specific number of times. For example, the bakery 112 can enter a code and receive up to twenty-four print sessions for selected images. In operation, once the bakery 112 enters the code, the system 100a verifies that the code is valid and has not been used before. In practice, the bakery 112 may be limited to the specified print sessions.

Once the edible media has traveled through a printer 134 (e.g., a flat printer 134a or three-dimensional (3D) printer 134b) and the image printed thereon with the edible inks, the printed edible media 102 is removed from the printer 134. The printed edible media 102 is then placed on a food product at the point of printing or transported to a separate location for application. In some configurations, the edible media 102 is relatively thin and sturdy allowing for convenient transport and thus minimization of damage to the decorations. In certain embodiments, the edible media 102 may also include an optional release sheet having a silicon coating functioning as a backing material, for example.

User Interface

In the system 100a, user interface controls for a consumer application interface 120 are connected to a consumer computing device 122 that is connected to central control device 132 via the network 118. In some implementations, the user interface controls 120 may include a keyboard, mouse, display device, or touchscreen interface. Other implementations may use other devices, such as a joy stick, remote control, or a voice command system. The user interface controls 120 allow the user to operate the system 100a to decorate edible media 102 or to display edible media-related content on the display device. In one example a virtual headset can be used to display a virtual reality or an augmented reality.

In some implementations, the user (for example, a consumer designing a food product that includes 2D and/or 3D edible medial) is displayed a variety of navigation screens and menus on the display of the consumer computing device 122. The user selects desired options from the navigation screens and menus using the keyboard, the mouse, touchscreen, or other input mechanism. In some examples, the user interface controls 120 relay signals from the consumer computing device 122 to the central control device 132, thereby operating the system 100*a* from the consumer computing device 122. The GUI 127 can also be configured to switch between multiple software applications, including a software web browser and non-web browser software. In some configurations, the GUI 127 is configured to retrieve non-licensed images. In some embodiments, the GUI 127 can be presented within a software web browser.

In some embodiments, the consumer computing device 122 can be configured to display a Graphical User Interface GUI 127 for interacting with the hardware and software components of system 100*a*. The GUI 127 can, for example, include application screens, website content, software controls, and other Graphical User Interface content. In some implementations, the GUI 127 is configured to receive user input for accessing one or more licensed or non-licensed digital images. The GUI 127 can, for example, include graphical elements provided in one or more applications. Consumers can interact with one or more graphical elements to control the behavior and output of system 100*a* components. In some examples, the GUI 127 can also include graphical elements that allow consumers to design and customize the food product from start to finish without interaction with the bakery 112. In one example where the food product being designed is a cake, the consumer can interact with the GUI 127 to upload and edit images for the edible media, select a type of edible media, select size, shape, and flavor for the cake, select icing colors and flavors, select and design 3D edible media, select decorating sets that include a combination of background overlays and decorations for the cake, and identify placement of decorative elements and edible media (see FIGS. 6A-6R and FIGS. 7A-7D).

In some aspects, the GUI 127 is configured to communicate with and control the central control device 132 over network 118 to retrieve at least one licensed digital image from the central control device 132. In an example where the user interface controls 120 at the consumer computing device 122 are part of a tablet or touch screen device, the GUI 127 can be further configured to interpret and communicate through network image manipulation inputs in order to generate decorating instructions for the food product that reflect the received network image manipulation inputs. For example, a network image manipulation input through the GUI 127 can rotate a 3D image in order to change its respective center of mass and effect a base 170 needed, as determined by the decorating instructions.

In some implementations, the GUI 127 is configured to allows consumers to select a preferred bakery 112 for preparing the customized food product. In one example, the GUI 127 provides an interactive calendar for viewing available pickup dates and times for the food product based on the availability of the selected 2D and/or 3D edible media and other ingredients associated with the decorating instructions (for example, 3D objects, frosting ingredients, food coloring, edible ink) for the selected bakery. In some examples, the central control device 132 of the system 110*a* is configured to dynamically adjust the available pickup date/time displayed at the GUI 127 of the consumer computing device based upon the availability of the edible media and other food product ingredients.

The system 100*a* may additionally provide user interface controls for a bakery application interface 133 through local control device 128, which is connected to a customer display device 131 that is connected via the network 118. In some implementations, the customer display device 131 can be configured to display a GUI 157 for interacting with the hardware and software components of system 100*a*. The GUI 157 can, for example, include application screens, website content, software controls, and other Graphical User Interface content. In some implementations, the GUI 157 includes administrative graphical elements associated with filling food product orders, interacting with consumers, obtaining image licenses, and maintaining bakery inventory. In some examples, the GUI 157 is configured to provide food product order information to the bakery 112 associated with a customized food product designed by a consumer. For example, the food product order information may include data files for printing the edible media, decorating instructions for preparing the food product according to a consumer's design, and the date and time that the consumer has indicated for pickup or delivery.

The GUI 157 may also be configured to receive user inputs associated with maintaining product inventory at the bakery 112, which is used by the system 100*a* to determine possible dates and times that the food product will be ready for pickup or delivery based on a lead time for the food product. In some examples, the system 100*a* can output notifications to the bakery 112 at GUI 157 to indicate when a particular ingredient is running low or when there are very few or no verification codes for a particular type of edible media. In some embodiments, the GUI 157 may provide an interface for the bakery 112 to order ingredients or edible media verification codes from one or more third-party vendors 115 in response to receiving a low inventory notification. In some examples where the local control device 128 is configured to automatically initiate an inventory order at the third-party vendors 115 when the inventory for a particular item is less than a predetermined threshold, the GUI 157 may be configured to output an automatic notification to the GUI 157 to alert the bakery 112 that an item purchase has been executed.

In some implementations, the GUI 157 is also configured to cause the local control device 128 to initiate printing of one or more edited images received from the consumer onto the selected edible medium 102 at the printer 134. The GUI 157 can also be configured to switch between multiple software applications, including a software web browser and non-web browser software. In some configurations, the GUI 157 is configured to retrieve non-licensed images. The GUI 157 can be presented within a software web browser. In certain implementations, the bakery 112 may print licensed digital images within a print environment provided internally by a web browser used to navigate a website with at least one image database. In other embodiments, bakery 112 may print licensed digital images in an external printing environment provided separately from the software web browser.

Image Sources

The system 100*a*, in some implementations, includes one or more devices which can be communicably coupled to system 100*a* as image sources 104. In this example, a variety of image sources 104 can be connected to the central control device 132 via the network 118. One such image source 104 is the scanner 121. The scanner 121 can be a flatbed scanner, or any other type of scanner such as a drum scanner or a through feed scanner. The scanner 121 allows an image to be rendered from personal photographs, drawings, books, magazines, etc. In some embodiments, the image sources 104 may include a 3D scanning device resulting in one or more digital image files containing a 3D representation of an object. In certain embodiments, system 100*a* can evaluate acquired images for copyright indicators. In an example the copyright indicators include copyright and trademarks for figurines of fictional characters, celebrities, emblems, logos, mascots, and the like. Based on the detection of copyright indicators, the user (e.g., bakery employee) may be alerted to potential copyright limitations, or usage of the acquired image may be automatically denied.

Other image sources 104 include the digital camera 106, video device 110, mobile device 116, video recorder 110, flash drive, and CD-ROM OR DVD. In certain embodiments, the image source 104 can be a personal electronic device such as a camera phone or PDA. In operation, when a particular image source is connected to a consumer computing device 122, a consumer can retrieve images from the connected image source to use in the system 100a for designing and producing customized food products with edible media 102.

Images retrieved from image sources are uploaded to system 100a and stored. For example, scanned images retrieved from scanner 121 are uploaded into system 100a, stored by the central control device 132 at data repository 129 as image data 141 and provided for use in the system 100a. The stored image data 141 can be retrieved by consumers and/or bakery employees for editing, printing, and so on.

The system 100a, in some implementations, includes one or more video devices 110, which may include any device that is capable of capturing and communicating a digital video signal. In certain embodiments, the video device 110 is a web camera. The video device 110 can be connected to the central control device 132 via the network 118. In other examples, the video device 110 is connected to central control device 132 through the consumer computing device 122. In some implementations, the consumer uses the video device 110 to transmit a digital video signal to the central control device 132 via the network 118. In certain embodiments, a single frame can be extracted from the digital video signal for printing at the GUI 127 of the consumer computing device 122. In other embodiments, a single image for printing can be generated based on a montage of image frames extracted from the digital video signal. In certain embodiments, the video device 110 is a personal electronic device such as a camera phone or PDA. The video device 110 is generally connected to the consumer computing device 122 and/or central control device 132 by a wireless means such as Wi-Fi, Bluetooth, near-field communication, or wireline means such as USB or similar connectors.

Central Control Device

The central control device 132, in some implementations, is connected via the network 118 to each of the other entities of the system 100a (e.g., consumer computing devices 122, image sources 104, local control device 128, and third-party vendors 115). The central control device 132 may include a software web server which allows the consumer computing devices 122 and local control device 128 to communicate with a website on the central control device 132. In some implementations, the web server can be any web server capable of communicating using standard network protocols compatible with consumer computing devices 122 and local control device 128 using a variety of Internet connection types and operating systems. The web server may run on a variety of operating platforms, for example Windows, Linux, MAC OS, or UNIX.

Figure 2:
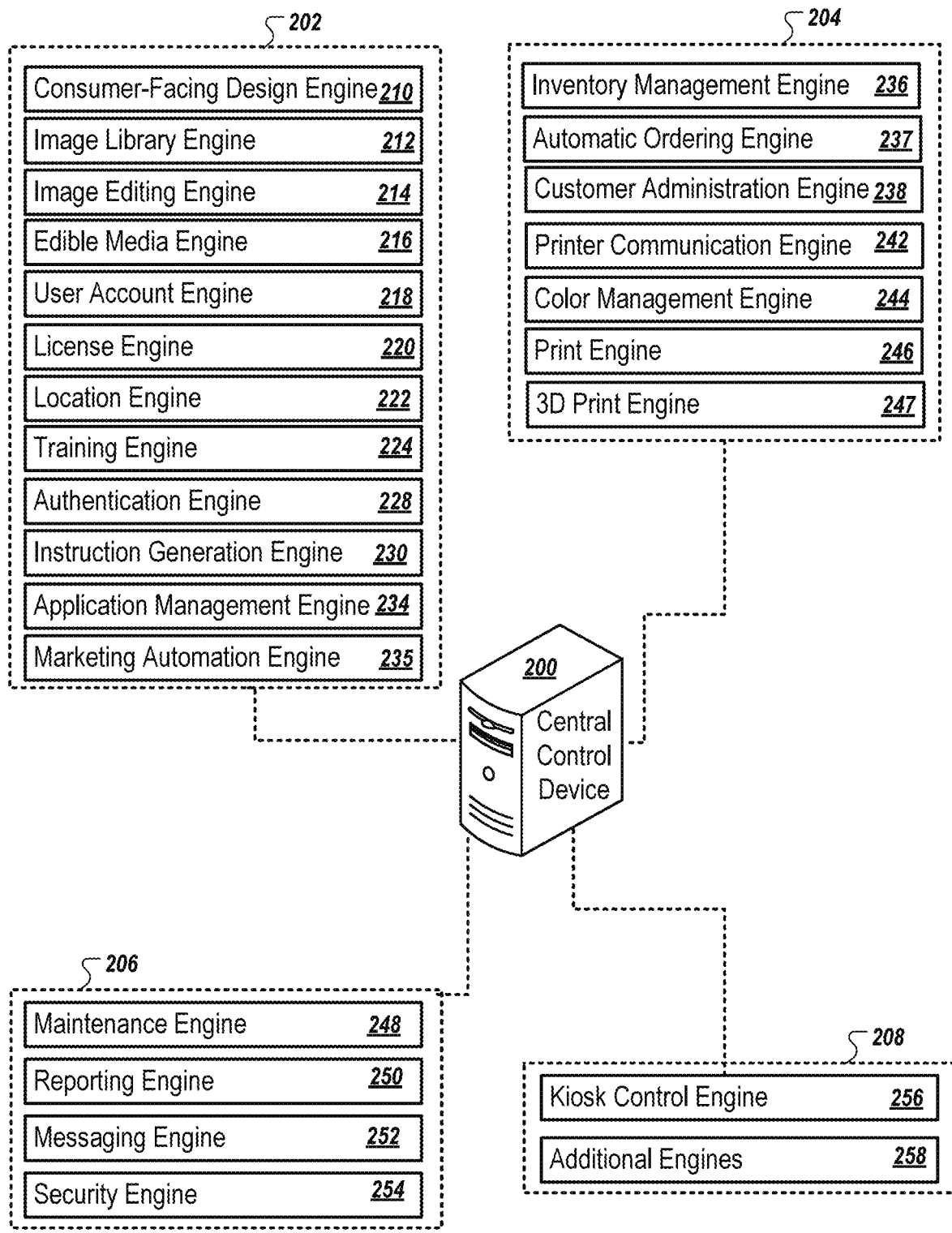
FIG. 2 is an example computing system including software engines in a central control device in a system for designing and producing customized food products with edible media.

In some examples, the website (not shown) hosted on the central control device 132 can include a number of software engines (FIG. 2). The software engines may include, but are not limited to, image library engines, user account engines, edible media engines, photograph editing engines, consumer location recognition engines, training engines, print engines, licensing restriction engines, social networking engines, security engines, and/or messaging engines. The described software engines can be selectively combined to form a multifunctional software engine or split into multiple software engines. In some examples, each software engine is configured to support interactions between at least one of the consumer computing devices 122 and local control device 128 and the system 100a at GUIs 127, 129 that are associated with designing and creating a customized food product. For example, the central control device 132 may include one or more software engines that provide functionality associated with start-to-finish food product design by the consumer.

The central control device 132, in some examples, may also include software engines associated with providing administrative functionalities to the local control device 128 at the bakery 112 associated with managing inventory and accessing consumer order information. The central control device 132 may also include software engines that support interaction between the consumer computing devices 122 and the local control device 128, such a messaging engine that allows the bakery 112 to notify consumers when a food product order is ready for pickup. In some implementations, the central control device 132 is configured to control dissemination of notifications to the system entities responsive to actions taken by other system entities. For example, the central control device 132 may issue notifications to the local control device 128 at the bakery 112 when a particular inventory item is running low. In some implementations, the central control device 132 may automatically initiate orders from one or more of the third-party vendors 115 when an identified inventory item reaches below a predetermined threshold. The central control device 132 may also transmit notifications to a consumer when a respective food product order is ready for pickup.

In some examples, the central control device 132 can manage and control interactions between each of the entities of the system 100a. For example, customized food product order information provided by the consumer at GUI 127 and transmitted to the central control device 132 and converted into decorating instructions that are forwarded to the local control device 128. Additionally, photos may be transmitted to the central control device 132 and stored as image data 141 in data repository 129 for use by an authorized consumer at GUI 127 for a consumer computing device 122.

Consumers at the consumer computing devices 122 and bakery personnel at the customer display device 131 (via local control device 128) can access respective websites and accompanying software engines on the central control device 132 via the network 118, for example. The consumers at the consumer computing devices 122, in some implementations, can search images, purchase images, edit images, print images, order 2D and 3D edible media, design a customized food product, view training content, and access social networking features and augmented reality content stored on the central control device 132. At customer display device 131, bakery personnel can manage and purchase image licenses via local control device 128, view and manage inventory status for bakery 112, view order information for incoming customized food product orders, and transmit notifications to consumers associated with status of orders. Example software engines are discussed below in reference to FIG. 2.

The central control device 132 may include media servers, for example, a FLASH multimedia server, and the local control device 128 and consumer computing devices 122 may include corresponding media players, for example, a FLASH player. FLASH players may be implemented either as a plug-in to the software web browser, or as a stand-alone application.

Data Repository

In some implementations, the central control device 132 controls interaction between system entities (e.g., consumer computing devices 122, image sources 104, local control device 128, and third-party vendors 115) and data repository 129.

One type of data stored in the data repository 129, in some implementations, is image data 141, which includes licensed digital images for decorating edible media by authorized users, which can include bakery personnel and/or consumers. The licensed digital images are protected from unauthorized usage and unauthorized user access. The central control device 132, in some examples, provides a tracking mechanism to authorize or de-authorize usage of licensed digital images. For example, the central control device 132 can authorize the use of particular stored licensed digital images according to user credentials. The user credentials can be stored as consumer account data 147 for consumers and bakery data 149*a* for bakery personnel in the data repository 129, or externally. The user credentials, in some aspects, typically include payment information, location information, and system usage data. The central control device 132, in some embodiments, verifies whether specific users (e.g., bakery personnel or consumers) should be provided access to particular licensed images based on the user credentials. In some implementations, the image data 141 may also include images that have been uploaded by consumers from one or more of the image sources 104. Each of the uploaded images may be associated with a particular consumer account so that only the consumer who has uploaded the image (or someone authorized by the consumer) may access and use the image during design of an edible media project Project data 143 for each of the registered consumers can also be stored in the data repository 129. In some embodiments, project data 143 can include data associated with previously-designed or in-progress food product designs. For example, a consumer may wish to order a birthday cake for different co-workers over the course of a year and can access the project data associated with a previously designed birthday cake, which can then be altered to meet the specifications for a different birthday or event. In some embodiments, the system 100*a* may transmit notifications to consumers to remind consumers that they have an upcoming birthday or event that they ordered a food product for in previous years so that the consumer can have an opportunity to design another custom food product for the same event in a subsequent year. Additionally, consumers may save an unfinished project for a food product and may access the unfinished project during a subsequent food product design session.

The data repository 129, in some implementations, can also store bakery data 149*a* for each bakery that is registered to offer food product design capabilities (e.g., printed edible media design capabilities) to consumers through the system 100*a*. The bakery data 149*a* may include user credentials for each registered bakery 112, location information, licensing information indicating which licensed images a bakery 112 is authorized to print, and product information indicating the types of food products offered at each bakery 112. In some implementations, the bakery data 149*a* may also include a library of application programming interfaces (APIs) for bakery administration interfaces that are customized to preferences of each bakery 112 using the system 100. For example, a bakery 112 may receive customized food product orders through a general website associated with the system 100 but may have product preparation and workflow processes that are unique to the bakery 112. The customized API for the bakery 112 can present the order information and decorating instructions for customized food products in a format that is tailored to the processes of the bakery 112. The APIs for each bakery 112, in some embodiments, provide the flexibility to adapt to changes in preferences at each respective bakery 112 interacting with the system 100 without affecting the interfaces of other bakeries 112 with the system 100. For example, as shown in FIG. 6O, text and photo editing UI screen 601 is presented within a customized API 615 for a specific bakery.

The data repository may also store inventory data 145 for each bakery 112 registered with the system 100*a* that includes a number of product codes for each purchased type of 2D edible media, amounts of 3D edible media printing materials, edible ink quantities, remaining amounts of consumable decorating products such as cake toppers and prepackaged decorating sets, and purchase dates and volumes of each type of ingredient or decorating product maintained in the bakery 112. The central control device 132, in some implementations, may access the inventory data 145 for a particular bakery 112 when determining whether additional edible media sheets, 3D edible media printing materials, edible ink, other ingredients, or decorating products are due to be purchased.

The data repository, in some embodiments, may also store GUI templates 151 that are used by the system 100*a* to generate one or more GUI screens that are presented on the consumer computing devices 122 at GUI 127 or the customer display device 131 at GUI 157. In one example, the GUI templates 151 may include calendar templates, which the system 100*a* populates with possible food product pickup and delivery dates based on preparation lead times that are presented to consumers at the GUI 127. In some examples, the system 100*a* can dynamically adjust the data presented within the calendar template based on the products associated with a consumer-generated food product design and the availability of those products at the selected bakery 112.

In some implementations, data repository 129 can also store marketing data 153 that the system 100*a* can use to generate targeted marketing advertisements for individual consumers as well as different demographic groups of consumers. The marketing data 153, in some examples, may include numbers of each type of ordered customized food product that can be broken down into individual component categories corresponding to selections made by consumers at user interface screens for designing a customized food product (see FIGS. 6A-6R). For example, the marketing data 153 can include numbers of cakes that have been ordered over a period of time that have a particular color or flavor of icing, filling flavor, cake flavor, size and shape, type of 2D and/or 3D edible media product, celebration occasion, type of decoration or topper, and type of prepackaged decorating set. For each of the individual component categories, the marketing data 153 may include demographic information relating to the types of people who order each type of individual cake component (e.g., age, gender, geographical region, marital status, parental status). For example, the marketing data 153 may include a number of Boston Red Sox cake toppers have been sold within the United States as well as within the New England region during baseball season and during any given year.

Similarly, in some examples, the marketing data 153 can also include data analytics for products ordered by bakeries 112 from third-party vendors 115 that can be used to generate targeted marketing materials for bakeries. In some embodiments, the third-party vendors 115, such as decorating product vendors, can market 2D and 3D edible media, cake toppers, prepackaged decorating sets, or any other decorations that can be used to decorate customized food products based on previous orders made by bakery 112 or other bakeries having similar demographic characteristics.

Local Control Device

The local control device 128, in an example, includes at least one computing device that is coupled to the central control device 132 via the network 118. In some implementations, each bakery 112 registered to provide customized food products to consumers through the system 100a includes a local control device 128 for interacting with the system 100a. The local control device 128, in some examples, provides administrative interactions with the system 100a to the bakeries through the GUI 157 at the customer display device 131. For example, the local control device 128 can, responsive to receiving consumer order information from the central control device 132, present the order information within the GUI 157 so the bakery 112 can download and print any edited images on an identified edible medium. In some examples, the local control device 128 may control and manage image licenses that are maintained by the bakery 112.

The local control device 128 can also present decorating instructions corresponding to the consumer's customized food product design so that the bakery can prepare the food product according to the consumer's specifications. In some examples, the local control device 128 can also present inventory information to the bakery 112 via the GUI 157, and, responsive to determining that the inventory for a particular product is low, may present a website for ordering additional products from the third-party vendors 115 at the GUI 157. Additionally, the local control device 128 may transmit messages from the bakery to the consumer regarding pickup times or specific order details to the central control device 132, which in turn forwards the messages to the appropriate consumer.

The local control device 128, in some examples, is configured to print the purchased image onto the edible media 102 and/or print 3D edible media via a wired or wireless connection to edible media printer 134, for example. In some examples, the local control device 128 includes a software web browser that allows the local control device 128 to communicate with the central control device 132 via network 118. In some implementations, the local control device 128 is a web server capable of communicating using standard Internet protocols.

In some embodiments, the local control device 128 is configured to determine an optimal edible media printing order for the printer 134 at the bakery 112. For example, a bakery may receive food product orders for multiple types of printed edible media and food products that have varied preparation lead times. The local control device 128, in some implementations, can determine a print queue order for multiple edible media prints associated with multiple orders that maximizes throughput and efficiency. In instances where an edible media sheet includes multiple edible substrates, the local control device 128 may adjust the order of edible media prints such that the printer 134 prints onto each of the edible media substrates in a single printing session. In other examples, the local control device 128 may process the edible media prints in a first-in, first-out order.

Printing Device

The system 100a, in some implementations, includes printer 134 that is configured to receive and print images upon edible media 102 using edible inks. In some examples, the printer 134 may include a feed path through which the edible media 102 is inserted and conveyed past one or more printheads. The printhead technology can be any type of printhead technology which can be controlled by digital signals including, for example, inkjet, thermal inkjet, piezo inkjet, continuous inkjet, valve jet, electrostatic inkjet, airbrush technology, and computerized numerical control (CNC) machines.

In one example, the printer 134 can be a 3D printer configured to print edible materials and/or edible inks. In an aspect, the 3D printer may be configured to print with an edible material supplied in various colors. In another aspect the edible material can have a base coloring (e.g. white, off-white, etc.) and the 3D printer can be configured to print with a variety of edible ink colors upon the edible material. FIGS. 1B-1E show examples of a 3D edible media 160 on printable base media 150.

Figure 1B:
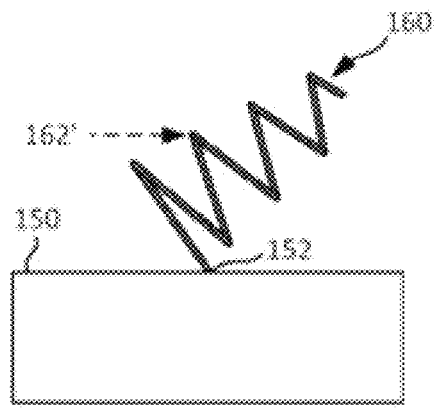
FIGS. 1B-1E show examples of edible media that are 3D printed on a food product.
Figure 1C:
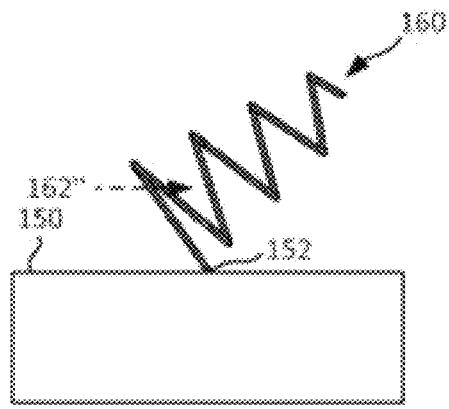
Figure 1D:
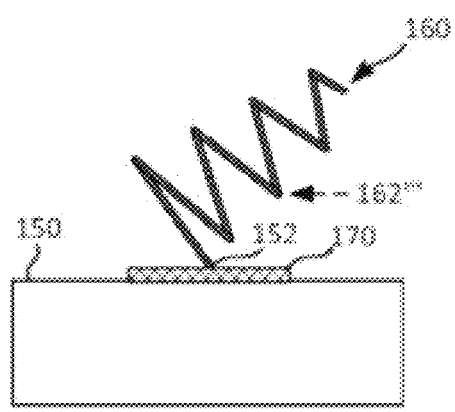
Figure 1E:
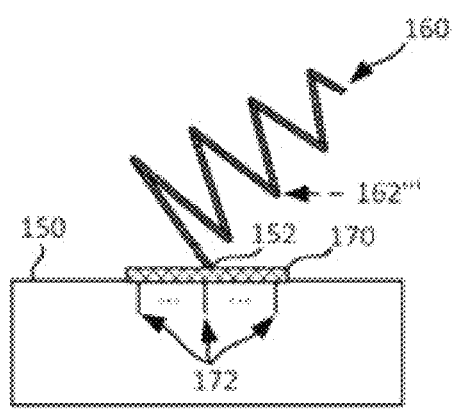
Figure 1F:
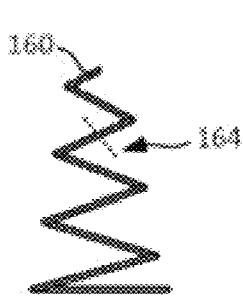
FIGS. 1F-1H show a cross section of a 3D edible media.
Figure 1G:
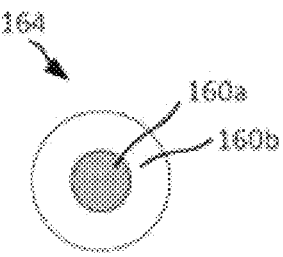
Figure 1H:
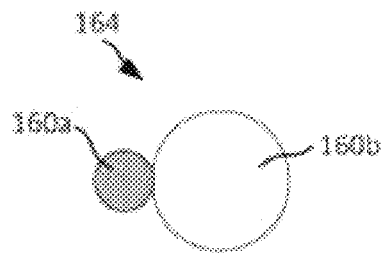
Figure 1I:
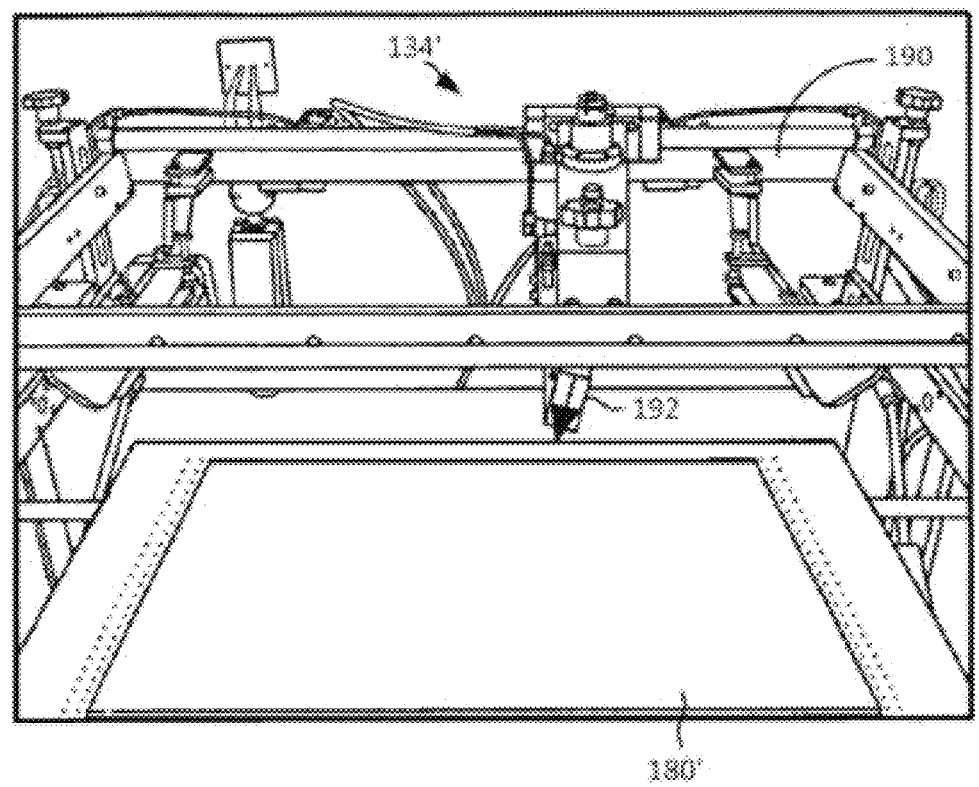
FIG. 1I shows a perspective view of a printer having a printhead connected to a printer frame and a stationary platform.
Figure 1J:
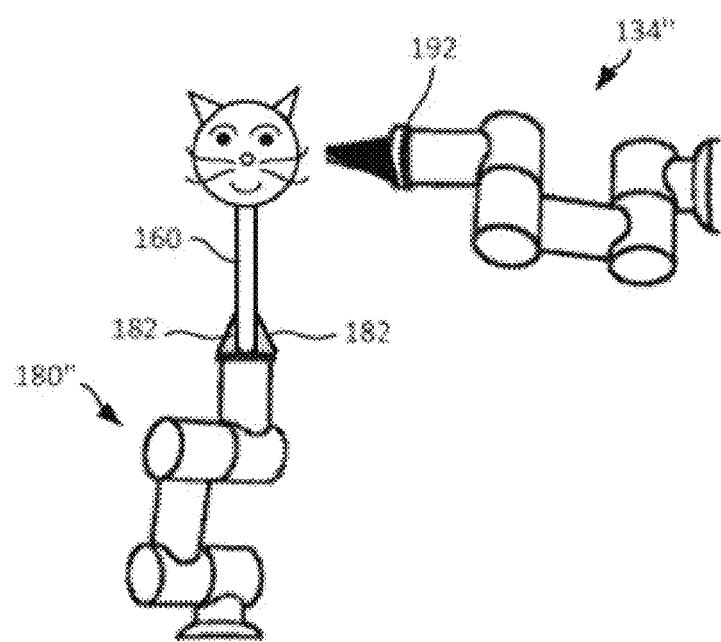
FIG. 1J shows a drawing of a printer having a jointed movable printhead and a maneuverable platform according to an example

FIG. 1I shows a perspective view of a printer 134' having a printhead 192 connected to a printer frame 190 and a stationary platform 180' according to an example. In certain embodiments, the printer 134 can have one or more fixed and/or moveable printheads and/or a maneuverable platform. FIG. 1J shows a drawing of a printer 134" having a jointed movable printhead 192 and a maneuverable platform 180" according to an example. The jointed movable printhead 192 can function similar to a multi-jointed CNC robotic arm. Similarly, the maneuverable platform 180" can function similar to a multi jointed CNC robotic arm. The maneuverable platform can alternatively be a rotating and/or orbiting gimbal platen and/or platform configured to rotate the food product while the printhead is in operation. The maneuverable platform can have a set of securing mechanisms 182 configured to hold or grip the food product or the base 170. In an aspect the printer can coordinate tilting of the edible media and an angle of the printhead, with tracking a set of deposition coordinates to match a secondary treatment.

In an example the printer 134 can print edible materials and edible inks on a large food product having one or more separated levels, sides, and contours such as a tiered cake. In an example, the maneuverable platform can rotate a tiered cake while printing on a side of the tiered cake. In another example the printer 134 can print edible materials and edible inks on a small food product such as a cake pop. The cake pop can be easily rotated in multiple configurations as compared to the larger tiered cake. In another example the printer 134 can print an entire cake pop with edible materials and edible inks, as well as non-edible materials. FIG. 1J shows an example of a cake pop being held in the set of securing mechanisms 182 while being created and/or decorated.

In an example, the printhead can be configured to extrude a first edible material to support a second edible material. For example, referring to FIGS. 1F-1H a combination of two or more edible materials can be printed in a coordinated manner. FIG. 1F shows a location of a cross section 164 of a 3D edible media 160, as shown in FIGS. 1G-1H. FIG. 1G shows the cross section 164 of a first edible material 160a surrounded by a second edible material 160b according to an example. In some examples, the first edible material can have a stiffness, density, and/or consistency to support the second edible material, which may not have been able to support itself. In an example, the first edible material can be a nougat material and the second edible material can be a chocolate coating on the nougat material, where the combined nougat material and chocolate coating material form a three-dimensional object such as a candy bunny.

FIG. 1H shows the cross section 164 of a first edible material 160a and a second edible material 160b adhering to the first edible material 160a according to another example. Either the first edible material or the second edible material can have a surface feature or adhesive property to promote adhesion.

The printhead can have a set of one or more nozzles for extruding the two or more edible materials together according to an example. The nozzles can extrude each edible material separately or simultaneously by having one nozzle embedded in another nozzle.

The printheads can include one or more of an imaging device such as a camera, or a sensor such as a 3D scanner, a force transducer, a temperature detector, and an infrared detector as well as any other sensor related to 3D printing. In an example the imaging device can be configured to index, scan or read an indicator on or the shape of the food product to determine a location of the surface of the food product for printing.

In another example, the imaging device or sensor can be configured to create a digital scan or data on a shape and appearance of a real object such as a food product or printable base media 150, and to create a digital model based on the digital scan or sensor. The digital scan can be used to filter and to suggest different images that can be printed by the printer 134 at different locations on the food product.

In an aspect the 3D printer can include a contour tool or reductive modeling tool (e.g., carver/cutter/suction), a painting tool (e.g., watercolor effect, airbrush, etc.), a curing head, and a set of multi-color printheads. In an example, the contour tool can be configured to shape, to remove, to cut, and to carve the food product or edible materials into a different contour. In an example, the contour tool can carve a fondant or a cake to a different shape. In another example, the contour tool can shape an ice cream cone or other dessert cup. In another example, heads may be interchangeable to provide multiple functionality.

In an example, the printhead can include an in-situ sensor and/or a biopsy probe configured to determine a mechanical or structural property of the food product such that the contour tool removes a portion of the food product without creating unintended instability. In an example, the situ sensor can be an acoustic or ultrasound sensor, a non-penetrating pressure sensor, or any other type of sensor. In an example, the biopsy probe can include a penetrating pressure sensor.

The curing head can be a cooler and/or a heater. In an aspect the 3D printer can use edible materials, as well as inedible materials such as plastic and/or wax (e.g. to print candles). In an example, the curing head can be configured to lead or to follow a second printhead and apply cooling and/or heat. In an example, a first printhead can be configured to extrude an edible material such as cake batter, followed by a second printhead supplying heat to the cake batter such that the cake batter rapidly broils or bakes.

In some embodiments, the printer 134 is configured to function within and/or provide a temperature-controlled environment. For example, when the edible media is a form of ice cream, the temperature-controlled environment can be a freezer or a platform that is chilled. In another example, the printer 134 can include a temperature treatment to apply to the printed edible media. In a particular example, a liquid nitrogen treatment may be deployed by one or more liquid nitrogen applicators of the printer 134 to set chilled decorations such as ice cream embellishments. In another example, a dry ice treatment may be deployed for other freezing as well as visual effects. In an example, the secondary treatment can be a coating for the dry ice treatment to slow, delay, or pattern a fog emanating from the dry ice treatment.

In some embodiments, the printer 134 includes a setting treatment for setting the edible media after decoration. For example, the printer 134 may supply a setting treatment via one or more applicators as a functional layer, such as a hardening or stiffness support layer to promote structural integrity of the 3D edible media. In another example, the printer 134 may supply an aesthetic treatment via one or more applicators, such as adding a sheen, a glitter, or a glossy appearance, that may or may not contribute a functional benefit to the finished product. In particular examples, the printer 134 may be configured to apply one or more of a sugar, a starch, a wax, and a glazing agent to stabilize a decorated edible media.

In some printing systems, the edible inks described above are generally fed from a cartridge reservoir. Such cartridge reservoirs may be refilled as need. In some embodiments, images are printed onto a transfer layer, which in turn is applied onto the edible media 102.

In another example, the printer 134 can be used to dimensionalize a frosting sheet by printing a three-dimensionally textured background or scene for a corresponding non-printed decoration (e.g., DecoSet® Decorations by DecoPac, Inc. of Anoka, Minn.). In a particular example, train tracks and landscaping (e.g., mountains, trees, grass, water, etc.) can be three-dimensionally printed upon edible media, and a toy train may be placed upon the textured scene.

In some implementations, in addition to printing images onto edible media, the printer 134 can include a laser cutter for cutting out figures or shapes, scribing, embossing, or etching the 2D and/or 3D edible media based on customization details provided by the consumer. For example, the printer 134 may cut a circular edible media substrate into the shape of a cat for a cat themed birthday cake. In some examples, the printer 134 can also be configured to cut out figures or shapes of non-edible media to be used as decorations on customized food products. For example, the printer 134 may be configured to cut out plastic or acrylic material into a desired shape, such as the initials of the cake recipient.

Edible Inks

The edible inks used in the system 100 are typically formulated from food grade colors and ingredients to enable high quality, near-photographic images to be printed onto the edible media 102. These inks are edible and have precise color-matching properties, but additionally function in a manner similar to other commercially available inks in printers. Edible inks may include natural inks manufactured from a food grade base.

In some implementations, the edible inks are specifically formulated for use in a particular printer. The user selects to print the image using different color models, according to the requirements of the printer. Providing selectable color models improves the precision of the printed image by enabling adherence to particular color matching systems. The edible inks may be inks designed to be used for decorating numerous different types of food products, including, for example, cookies, cakes, pizza, cupcakes, candy bars, edible tattoos, temporary tattoos, cereal boxes, waffles, and pancakes.

In an example the edible ink can be an edible printing material configured for 3D printing. The edible ink used for 3D printing can include any number of the following: icing, SugarSoft® by DecoPac, Inc. of Anoka, Minn., chocolate, frozen dessert material such as sorbet, yogurt, or ice cream, candy material, Royal icing, fondant, gelatin, and edible materials capable of being deposited by an airbrush style printhead tool.

The edible inks, in some embodiments, are additionally formulated to faithfully render images in accordance with the appropriate color model. Possible color models include, but are not limited to, the Cyan, Magenta, Yellow and Black (CMYK) color model, as well as the RGB, LAB, HSB, Pantone, Hexachrome, and other color models. In some embodiments, the edible inks are formulated to render images in accordance with the CMYK color model. Other examples of edible inks that provide faithful matching to the CMYK color model, as well as other color models, and that function within the constraints of commercially available printing technologies may be used in the system 100. In some configurations, the inks used in system 100 include a combination of edible inks, natural inks, synthetic inks, or other inks.

Edible Media

The system 100 includes edible media 102 on which images are printed. The edible media 102, in this example, includes at least one edible layer 136 and an edible coating 138. The edible medium may be a single layer of edible material. For example, the edible medium may be a single layer of sugar paper, sugar paste, starch paper, fondant, or some other edible form. Examples of options for edible material include but are not limited to standard media with sizes of ½, ¼, and ⅛ sheet, or precut media of sizes 8 inch round, 3 inch round, or 2 inch round, or edible strips.

One embodiment of the edible layer 136 of the edible media 102 includes a mixture of a sugar paste of varying thickness. The edible layer 136 is typically formulated for several key features. First, the edible layer 136 is mixed to depict high-quality pictorial images from particular edible inks disclosed herein. Second, the edible layer 136 travels through a printer (e.g., printer 134) without damaging the edible media 102, the edible layer 136, or the printer. For example, the edible layer 136 is mixed to ensure sufficient strength to be bent and manipulated through the conveying path of the printer 134, withstand the heat of the printing process, and still maintain suitable textural integrity as to not jam in the printer mechanism of printer 134. Third, the edible layer 136 is mixed to ensure there is no detraction from the taste of the food product on which it is to be applied. Other variations of edible layers and edible media may be used as well.

In some implementations, the edible layer 136 is formulated for use in decorating pizza or deli type items. For example, the edible layer 136 may be formulated as savory rather than sweet.

Other examples of edible layers 136 are described in U.S. Pat. No. 5,017,394, assigned to the Lucks Company, and incorporated herein by reference. This type of edible layer 136 is formed from a flour and/or starch base as opposed to the sugar base of a fondant. Another example of an edible layer 136 is disclosed in U.S. Pat. No. 5,334,404, issued to Garcia et al. and incorporated herein by reference. Other types of edible layers 136 can be used including, but not limited to rice paper, wafer paper, and other edible substrates on which an image may be printed.

The edible coating 138 enables the edible media 102 to render a high quality pictorial image on the surface of the edible layer 136. Without this coating 138, the inks tend to run or bead or form an imperfect image. In one example, the coating 138 is a very thin layer of calcium carbonate. This thin layer allows the inks to properly perform to render a high-quality pictorial image. Other coatings may be used in system 100.

In some embodiments, the edible media 102 may also include an optional release sheet 140 having a silicon coating functioning as a backing material, for example. In some implementations, the edible media 102 is a standard size or shape. Example sizes can include 8.5 inches by 11 inches, 9-inch round, and 8-inch round. The size can be a precut size or a selectable size. In some configurations, frosting layers, edible material and/or fondant layers can be malleable and/or stretchable to various sizes and shapes.

FIGS. 1B-1E show examples of 3D edible media 160 on a food product 150, where the 3D edible media 160 has a center of mass 162 and a contact area 152 with the food product 150.

As shown in FIG. 1B, the center of mass 162' of the 3D edible media 160 on the food product 150 can be within the 3D edible media 160. As shown in FIG. 1C, the center of mass 162" of the 3D edible media 160 on the food product 150 can be outside of the 3D edible media 160. As shown in FIGS. 1D-1E, the center of mass 162''' of the 3D edible media 160 on the food product 150 can be unsupported by the contact area 152 and thereby can move or tip due to gravity. In an example, the 3D edible media 160 can be made from a combination of edible materials such that the center of mass 162 can be shifted.

As shown in FIG. 1D, the 3D edible media 160 can include a base 170 that can be configured to support and mechanically compensate for the center of mass 162''' in an example. As shown in FIG. 1E, the base 170 can include one or more attachment features 172 that can be configured to support, couple, and mechanically compensate for the center of mass 162''' according to an example. In one example, the base 170 and attachment features 172 can be made from one or more edible materials. In another example, the base 170 and attachment features 172 can be made from one or more non-edible materials. In another example the base 170 and attachment features 172 can be made from a combination of one or more edible materials and one or more non-edible materials.

In examples where the system 100 for designing and producing customized food products with edible media is configured for designing and producing customized deli food product orders (see FIG. 1L), the edible medium may be made of a savory material, which may be applied to pizza crust, cracker, tortilla, pita, bread, roll, or bun (e.g., hamburger, hot dog), cheese ball or slice, dip or sauce, or vegetable or fruit slice. In some examples, the savory edible media can include soy, potato, corn, sweet potato, plantain, or other starch-based flat, flexible printable media (e.g., tortilla, soy paper, etc.). The savory edible media can also be legume-based flat, flexible printable media (e.g., black bean, pinto bean, chick pea), wheat, rice or other grain-based printable flat, flexible printable media (e.g., tortilla, rice paper, etc.), dehydrated fruit-based printable surfaces (e.g., fruit leather), savory frosting (e.g., cream cheese "fondant," and savory gels/gelatin-based media. Additionally, in some examples where a customized image is etched onto an outer surface of a fruit or vegetable (e.g., melon, squash, pumpkin) the edible medium can be the entire outer surface of the respective food item. A customized image can also be etched into other types of deli products, such as pita, bread, rolls, buns, and cheese.

Third-Party Vendors

In some implementations, third-party vendors 115 may be optionally included as part of the system 100a for designing and producing customized food products with edible media 102 and may include a number of computing devices and databases distributed across a widely-dispersed network that may be distributed across a large, international geographic area. In some examples, the central control device 132 may initiate orders for 2D and 3D edible media, food product ingredients (e.g., edible inks, food coloring such as airbrush colors or gel colors, quins, sprinkles, sugars, confections, etc.), cake toppers, cake overlays, prepackaged decorating sets that include a combination of toppers, decorations, overlays, and 2D or 3D edible media, and food product accessories (e.g., candles for a birthday cake, cake bases, boxes, stands, rings, and decorative pics, etc.) based on receiving an inventory order submission from the local control device 128. In some implementations, the third-party vendors can include commercial food suppliers and suppliers of cake toppers, decorations, edible media, and prepackaged cake decorating sets. In some implementations, the central control device 132 (via the local control device 128) presents one or more web order forms for the third-party vendors 115 within the GUI 157 at the customer display device 128, and bakery employees manually initiate orders with the third-party vendors 115. Additionally, the central control device 132 can also transmit automatic notifications to the local control device 128 to notify the bakery 112 that a particular inventory item is running low. In other examples, the central control device 128 and/or local control device 128 can automatically initiate orders with the third-party vendors 115 when an amount of a particular inventory item is less than a predetermined threshold through a business-to-business e-commerce website.

Kiosk

Figure 1K:
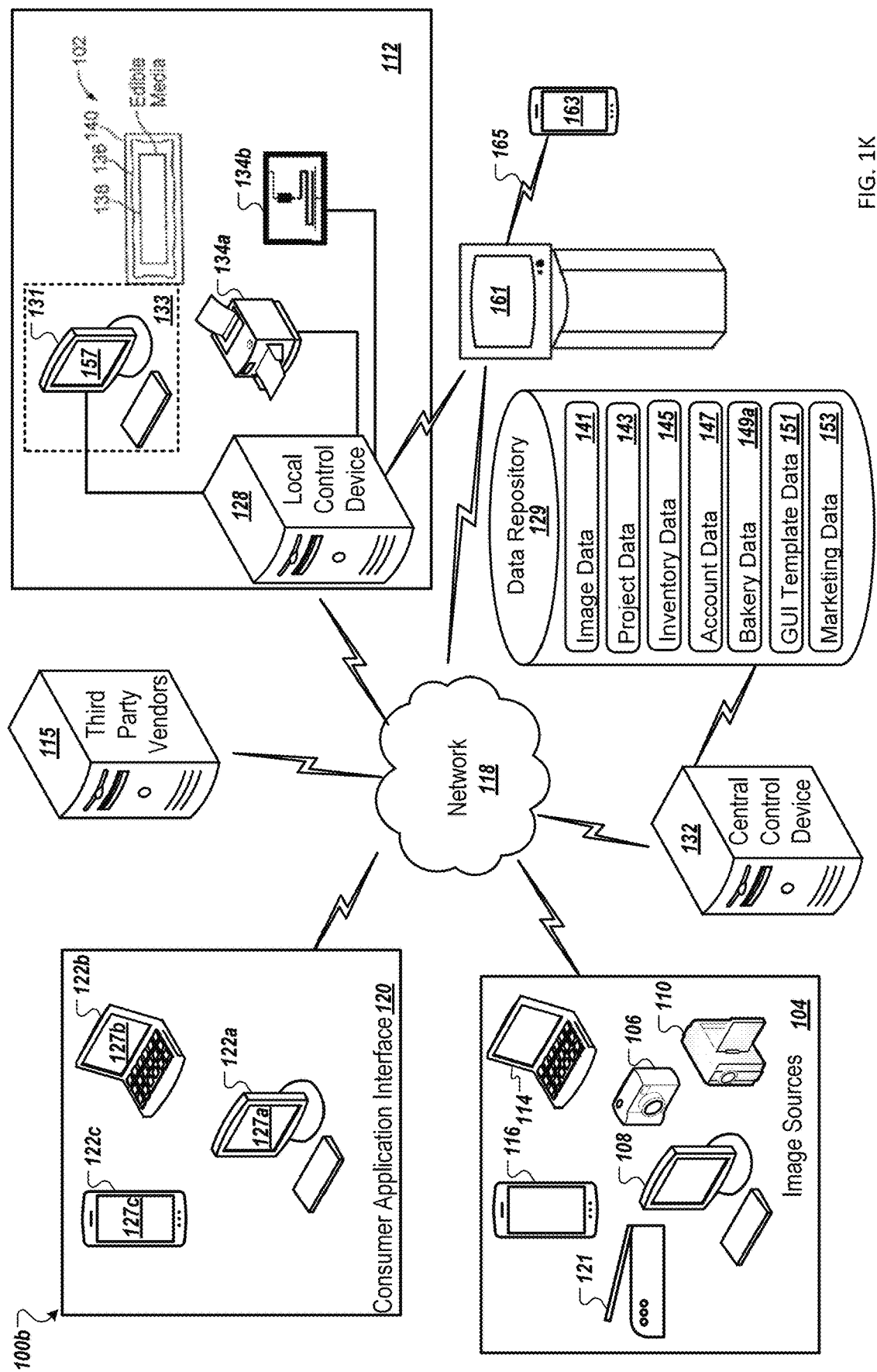
FIG. 1K illustrates an example system for designing and producing customized food products with edible media.

Turning to FIG. 1K, another example of a system 100b for designing and customizing edible media 102 is illustrated. In addition to including all of the elements of system 100a shown in FIG. 1A, the system 100b shown in FIG. 1K includes a kiosk 161 for consumers to input food product orders. In some implementations, the kiosk 161 may be located within the bakery 112, such as in a common area of the bakery 112 where consumers browse for products or in a bakery section of a grocery store. In other examples, the kiosk 161 may be remotely located from the bakery 112 such as in a shopping mall, convenience store, or other store that is not co-located with the bakery 112. In some examples, the kiosk 161 may transmit customized food product orders directly to the local control device 128 for processing and fulfillment via the network 118. In other embodiments, the kiosk 161 may transmit the customized food product orders to the central control device 132 for processing and translation into a set of decorating instructions, which are transmitted with any applicable print data (e.g., data files for printing edited images on edible media) to the local control device 128 at the bakery 112.

In some examples, the kiosk 161 may include a display for presenting food product customization user interface screens to consumers designing their customizable food product. The kiosk 161 may also include a processor and associated circuitry for processing customized food product orders and interacting with other computing devices (e.g., local control device 128 and central control device 132) of the system 100b. In some embodiments, the customization user interface screens correspond to the user interface screens of GUI 127 presented at the consumer computing device 122. In one example, the display includes touchscreen functionality such that a consumer can provide inputs to the user interfaces directly via the touchscreen. For example, the display may be a tablet computing device.

In some implementations, the kiosk 161 can include circuitry configured to host an access point for one or more consumer computing devices 163. For example, the kiosk may include circuitry for generating a short range wireless communication network 165, such as a Bluetooth wireless communication network for connecting to one or more consumer computing devices 161 so that consumers can interact with the kiosk 161 to design customizable food products at their own consumer computing devices 161, which allows greater numbers of consumers to interact with the system 100b simultaneously. In some implementations, the kiosk 161 may search for consumer computing devices 163 within communication range of the kiosk 161. When an in-range consumer computing device 163 is detected, the kiosk may transmit a connection query to the device 163 to determine whether the consumer is interested in connecting the consumer computing device 163 to the kiosk 161 to design a customized food product. In other examples, consumer operating devices 163 may manually search for and establish a communication link with the kiosk 161 via the network 165. In some examples, when a consumer computing device 163 connects to the kiosk 161 via the network 165, the kiosk 161 assumes a role as master in a master-slave relationship with the consumer computing device 163. For example, upon connection to a consumer computing device 163, the kiosk 161 may cause presentation of one or more food product customization user interfaces screens at the device 165 such that the device 165 functions as an input/output device, and the kiosk 161 presents the customization and editing options to the consumer computing device at the user interface screens and also receives and processes inputs that are provided by consumers at the user interface screens.

In other embodiments, instead of a Bluetooth wireless communication network, Ultra Wide Band (UWB) or ZigBee wireless communications may be used. The type of wireless communication technology that is used for the implementations described herein can be based on various factors that can include battery life, data usage, security and/or line-of-sight restrictions, and other concerns. In some embodiments, ZigBee or Bluetooth wireless communications may be used in applications where link security is prioritized. In other embodiments where frequency interference is a concern, Bluetooth or UWB communications may be used since both technologies use adaptive frequency hopping to avoid channel collision. In embodiments where a total of frequency channels is prioritized, Bluetooth wireless communications may be used. In some examples, the kiosk may include multiple access points that use different short range wireless communication technologies.

In some implementations, the consumer computing device 163 may connect directly to a wireless communication network at bakery 112 via kiosk 161 or independent of kiosk 161. In some examples, when connected to the bakery wireless communication network, the consumer computing device 163 accesses a unique URL for the bakery 112 at which the consumer can view and select customization options for a customized food product. For example, when a consumer connects to the bakery wireless communication network and opens a web browser on consumer computing device 163, the consumer is automatically directed to the unique URL for the bakery 112 to design a customized food product.

Figure 6B:
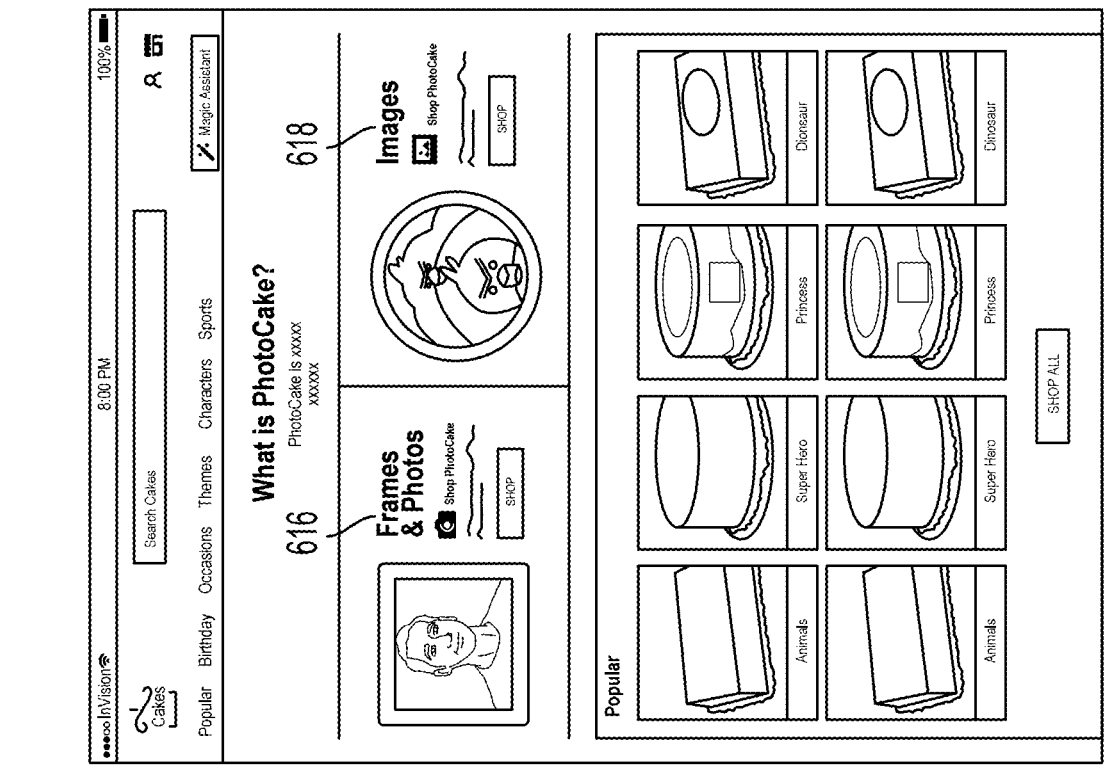
FIGS. 6A-6R illustrate example user interface screens for designing a customized cake product.

In some embodiments, a user can upload a photo to the system 100c via consumer computing device 163 for customization at the kiosk 161. For example, as shown in FIG. 6P, the central control device 132 can provide a user contact information user interface (UI) screen 617 to kiosk 161. At the UI screen 617, a consumer can provide a phone number 619 and/or email address 621 that can be used to interact with the system 100c and kiosk 161. For example, responsive to a consumer providing a phone number 619, the central control device 132 can cause a text message to be transmitted to the consumer computing device 163, as shown in mobile messaging interface 623 in FIG. 6Q. The mobile messaging interface 623 can include a web URL 625 that allows a consumer to access a photo upload interface 627 (FIG. 6R) for uploading one or more photos to the system 100c. In some examples, the photo upload interface 627 enables the consumer to select a photo 629 stored on the consumer computing device 163 for upload to the system 100c and provide a message 629 to the bakery 112 with customized information about the photo. In some examples, upon uploading a selected photo to the system 100c, the consumer can use UI screens at the kiosk 161 to access the uploaded photo, add the photo to a customized food product, and edit the photo within food product customization UI screens. In one example, the interactions between the central control device 132, kiosk 161, and consumer computing device 163 for providing images from the consumer computing device 163 for use at the kiosk 161 can be controlled by a cloud-based messaging platform.

Customized Deli Food Products

Figure 1L:
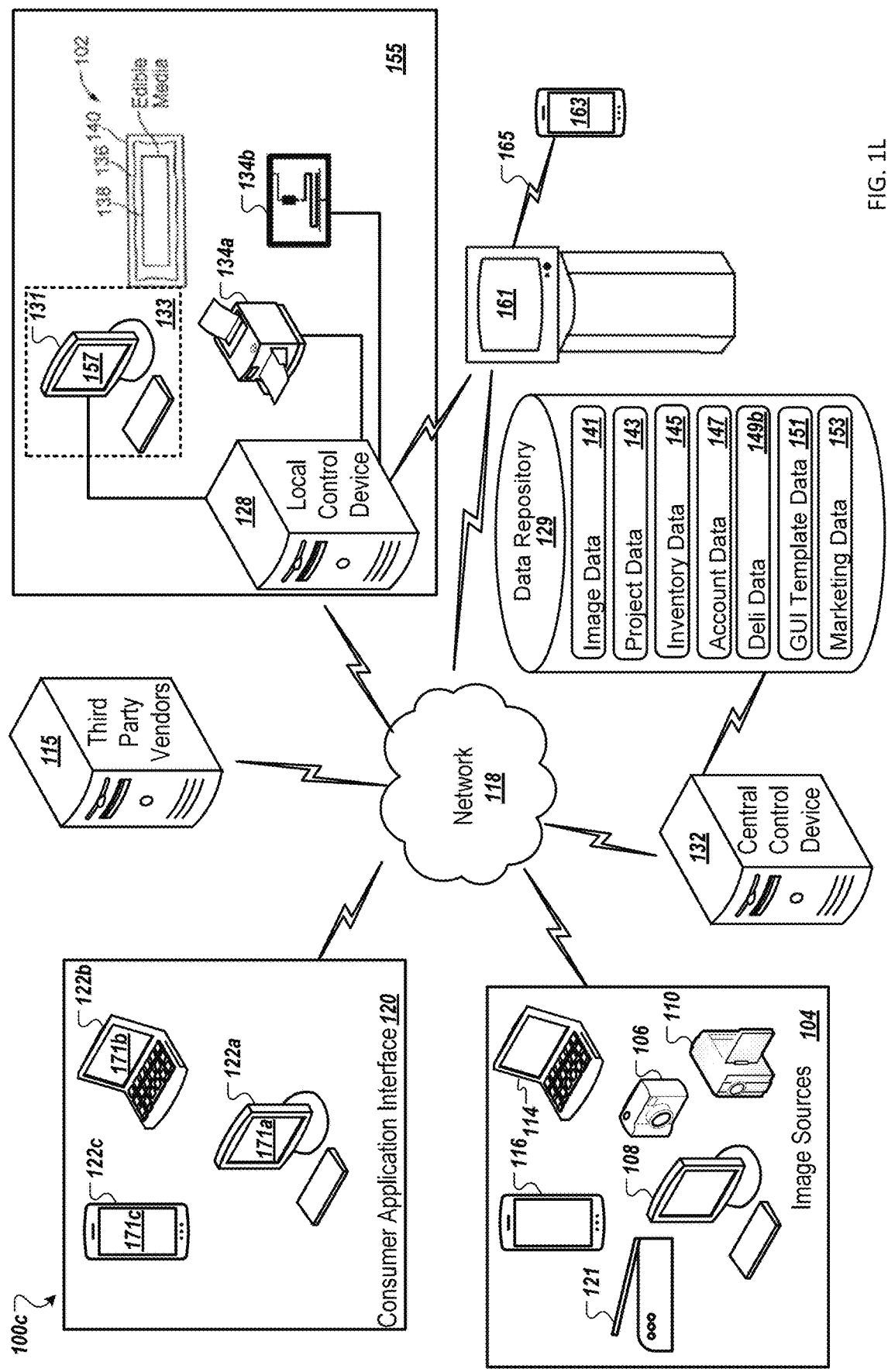
FIG. 1L illustrates an example system for designing and producing customized deli food products with edible media.

Turning to FIG. 1L, another example of a system 100c for designing and producing customized food products with edible media is illustrated. Consumers, in some implementations, interact with the system 100c through a web-based application to design customized deli food products from start to finish without, in some embodiments, needing to have any additional communication or interaction with the deli. In some examples, the customized deli food products can include deli trays (e.g., cheese and cracker trays, fruit and vegetable, chips and dip), pizza, sandwiches, hamburgers, and hot dogs. For example, consumers can select images and design customized messages that can be printed onto savory edible media or etched into the edible media with a laser printer. In one example, a laser printer can etch a customized edible media design into pieces of bread that are used to make a sandwich. In another example, a laser printer can be used to etch customized designs into cheese balls for a cheese and cracker plate. Additionally, customized deli food products can also include fruits or vegetables (e.g., melons, squash) that have customized etching designs applied to an outer skin or surface with laser etchers/printers that are communicatively coupled to the system (e.g., printers 134). In a further example, custom images and/or messages can be printed on the surface of a dip or sauce, such as hummus, salad dressing, or spreadable chocolate.

The system 100c, in some implementations, includes all of the same system components as the systems 100a,b for designing and producing customized food products with edible media 102 except that the local control device 128 is located at a deli 155 instead of a bakery 112, and data repository 129 stores deli data 149b rather than bakery data 149a. Like the bakery data 149a, the deli data 149b may include user credentials for each registered deli 155, location information, licensing information indicating which licensed images a deli 155 is authorized to print, and product information indicating the types of food products offered at each deli 155. In some implementations, the deli data 149b may also include a library of APIs for deli administration interfaces that are customized to preferences of each deli 155 using the system 100. Kiosk 161, in some examples, may optionally be included as part of the system 100c. Throughout the disclosure, references to bakery 112 and bakery personnel are interchangeable with deli 155 and deli personnel. For example, consumers can design customized bakery or deli products that include edible media through interactions with system GUIs, and any system functionality described with respect to bakery 112 can also apply to deli 155, and any functionality described with respect to deli 155 an also apply to bakery 112.

The deli 155, in some implementations, can include multiple printers 134 connected to local control device 128 for printing onto edible media 102. In some embodiments, each of the printers 134 at the deli 155 can be configured to print onto specific types of edible media (e.g., one printer is configured to print onto bread and pizza dough, another printer is configured to print onto cheese slices, and a third printer is configured to deposit decoration on a sauce or dip). In some examples, print data for customized images created by consumers are transmitted to a specific printer 134 at the deli based on food allergies associated with a customized food product order. The system 100c, in some implementations, can present GUI 171 to a consumer computing device 122 that allows the consumer to indicate any food allergies associated with the order. For example, if an order includes an indication of a peanut allergy, the central control device 132 and/or local control device 128 may transmit the print data for the order to a printer 134 in a "peanut free" zone of the deli. The local control devices 128 for systems 100a,b can also be configured to transmit print data to different edible media printers at a bakery 112 based on food allergies associated with an incoming order.

In some embodiments, the GUI 171 for designing and producing customized deli products allows consumers to design a layout of food products on a deli tray (e.g., cheese and cracker trays, fruit and vegetable trays, chips and dip trays) and a relative placement of printed edible media 102 on the tray. For example, the consumer can identify sections of a deli tray within the GUI 127 that will hold each type of vegetable and dip as well as a location of the printed edible medium. In one example, the printed edible medium may cover a section of the tray that holds a dipping sauce. The consumer can also indicate at the GUI 127 where to place other types of decorations and toppers on the deli tray.

Additionally, the GUI 171 for designing and producing customized deli products can include all of the features of the GUI 127 described above for designing and producing customized bakery products in systems 100a,b (FIGS. 1A, 1K). For example, consumers can interact with GUI 171 to upload and edit images for edible media, select licensed and/or unlicensed images for printing onto edible media, select a type of edible media, select and design 3D edible media, select decorating sets that include a combination of background overlays and decorations, select customized options for the deli products (e.g., sandwich options, deli tray options) and identify placement of decorative elements and edible media on the customized deli food product. In one example, a three dimensional sweet or savory decoration may be printed on an arrangement of crackers. In another example, a background and/or framing arrangement can be deposited in two dimensional or three dimensional material upon a platter. The background and/or framing arrangement may be deposited in edible and/or non-edible material, such as an inedible platform structure (e.g., such as a pick or spike to maintain a decoration in a selected position) topped with an edible decoration.

In some implementations, the GUI 171 is configured to allows consumers to select a preferred deli 155 for preparing the customized food product. In one example, the GUI 171 provides an interactive calendar for viewing available pickup dates and times for the food product based on the availability of the selected 2D and/or 3D edible media and other ingredients associated with the decorating instructions (for example, 3D objects, food coloring, edible ink) for the selected deli. In some examples, the central control device 132 of the system 110c is configured to dynamically adjust the available pickup date/time displayed at the GUI 171 of the consumer computing device based upon the availability of the edible media and other food product ingredients. In some examples, the central control device 132 can also adjust the pick-up time based on pending orders in a preparation queue for a particular bakery 112/deli 155 and an optimized printing order for edible media associated with the pending orders.

Additionally, the GUI 157 for interactions of deli personnel with the system 100c for designing and producing customized deli food products includes all of the features of the GUI 157 for interactions of bakery personnel with the systems 100a,b. In some implementations, the GUI 157 includes administrative graphical elements associated with filling food product orders, interacting with consumers, obtaining image licenses, and maintaining deli inventory. In some examples, the GUI 157 is configured to provide food product order information to the deli 155 associated with a customized deli food product designed by a consumer. For example, the food product order information may include data files for printing the edible media, decorating and preparation instructions for preparing the food product according to a consumer's design, and the date and time that the consumer has indicated for pickup or delivery.

The GUI 157 may also be configured to receive user inputs associated with maintaining product inventory at the deli 155, which is used by the system 100c to determine possible dates and times that the food product will be ready for pickup or delivery based on a lead time for the food product. In some examples, the system 100c can output notifications to the deli 155 at GUI 157 to indicate when a particular ingredient is running low or when there are very few or no verification codes for a particular type of edible media. In some examples where the local control device 128 is configured to automatically initiate an inventory order at the third-party vendors 115 when the inventory for a particular item is less than a predetermined threshold, the GUI 157 may be configured to output an automatic notification to the GUI 157 to alert the bakery 112 that an item purchase has been executed. In some embodiments, in determining the possible dates and times, the system 100c includes algorithms and project data 143 related to staged preparation of particular arrangements including, in some examples, times to deposit and set a number of printed elements of the food product order. In illustration, the system 100c may identify multiple stages of preparation such as a deposition of background and/or framing design stage, printing and/or etching of designs upon one or more food items stage(s), and a manual layout of food items upon the tray or other design stage. Time estimates associated with each stage, and availability of equipment for performing the steps of each stage, may be computed to estimate availability of the finalized product.

In addition to the third-party vendors 115 for the systems 100a,b, the system 100c for designing and customizing deli food products, in some embodiments, can communicate with third-party vendors 115 that sell deli-related food items (e.g., meat, cheese, produce, and bread product distributors) and consumable material products (e.g., disposable deli trays). The system 100c, in some implementations, maintains a status of all inventory items for the deli 155 and automatically initiates orders to transmits notifications to deli personnel when a particular inventory item is less than a predetermined threshold.

System Software Engines

FIG. 2 illustrates an example computing system 200 including software engines used in a system for designing and producing customized food products with edible media. The system 200 can, for example, be analogous to central control device 132 or a combination of the central control device 132 and local control device 128 (FIGS. 1A, 1K, 1L). A user of the system 200 (e.g., a consumer at consumer computing device 122 or bakery/deli personnel at customer display device 131), in some implementations, accesses a website on the central control device 132 to gain access to one or more software engines 210-252. In some implementations, the system 200 includes a first set of software engines 202 that provide the customization and design functionality to the consumer computing device 122 via the GUI 127, 171 and processing the food product customization inputs received at the GUI 127, 171. In some examples, the second set of software engines 204 may be hosted entirely by the central control device 132 or at a combination of both the central control device 132 and consumer computing device 122. The system 200, in some examples, also includes a second set of software engines 204 that provide administrative functions of the system 200 to the bakery 112 and/or deli 155 via the local control device 128. In some examples, the second set of software engines 204 may be hosted entirely by the central control device 132, entirely by the local control device 128, or at a combination of both control devices 132, 128. The system 200 may also include a third set of software engines 206 that provide functionality for interactions between consumer computing devices 122 and the local control device 128 at the bakery 112 and/or deli 155. The system 200 may also include a fourth set of software engines 208 that provide functionality for the kiosk 161 as well as any other system operations.

For example, the first set of software engines 202 may include a consumer-facing design engine 210, an image library engine 212, an image editing engine 214, an edible media engine 216, a user account engine 218, a license engine 220, a location engine 222, a training engine 224, an ordering engine 226, an authentication engine 228, an instruction generation engine 230, an application management engine 234, and a marketing automation engine 235. The described software engines can be selectively combined to form a multifunctional software engine or split into multiple software engines.

Consumer-facing design engine 210, in some implementations, is a software engine that provides consumers the ability to design customized food products from start to finish. In some examples, the consumer-facing design engine 210 manages the interactions between other customization engines (e.g., image library engine 212, image editing engine 214, and edible media engine 216). Additionally, the consumer-facing design engine 210 causes presentation of user interface screens (GUIs 127, 171) at the consumer computing device 122 that allow the consumer to provide inputs for cake flavor, filling flavor, icing color and design, upper and lower icing border colors, edible media layout, cake theme, and any other type of selection related to a cake's decorative design (See FIGS. 6A-6R and 7A-7D). For customized deli food products, the customized user interface screens also allow consumers to select customized options for the deli products (e.g., sandwich options, deli tray options) and identify placement of decorative elements and edible media on the customized deli food product. In some implementations, the consumer-facing design engine 210 only presents design selections that are available at the bakery 112/deli 155 selected by the consumer. The consumer-facing design engine 210 can, in some examples, present the unavailable design selections at the user interface screen with an indication that a particular design selection is unavailable at the selected bakery 112/deli 155 (for example, through an adjustment in hue of the unavailable selection or with the words "unavailable at the selected bakery" below the selection). If the consumer wishes to select the unavailable selection, the consumer can choose another bakery that offers the desired design selection.

With each design selection made at the user interface screens, the consumer-facing design engine 210 can calculate an updated price for the order in-real time. In some implementations, based on inventory information at the selected bakery, the consumer-facing design engine 210 can be configured to recalculate the preparation lead time for the customized food product in real-time responsive to each design selection made by the consumer.

The image library engine 212, in some implementations, is a software engine including digital images that can be printed onto an edible media. The image library engine 212 includes both images available for purchase and free images. The images may be licensed or unlicensed images, and may include clip art, illustrations, photographs, text, three-dimensional images or other 2D and/or 3D file content. The image library engine 212 generally contains different formats of the same image each of which are configured for printers that use differing color models.

In some examples, the image library engine 212 allows users (e.g., consumers or bakery/deli personnel) to browse or search through the images using keyword criteria such as "Sports" or "Princess" or "Birthday." The image library engine 212 may be updated with new images and new image formats. In certain embodiments, image library engine 212 may be updated with an image acquired through a remote image source, such as a USB WebCam or a mobile device. In another illustrative embodiment, image library engine 212 may be updated by a reference to Web content, such as a photograph posted on a social media network. In another implementation, image library engine 212 may be updated based on changes in agreements with image suppliers, and/or alterations in files supported by the system 100.

In some embodiments, the image library engine 212 interacts with the license engine 220 and the location engine 222 to allow or restrict users (e.g., consumers or bakery/deli personnel) when finding and/or purchasing particular images. In some implementations, consumers are able to search for and select images that have been purchased by a selected bakery 112/deli 155. In other examples, individual consumers can search for and purchase licenses to their own images for their own use in designing and producing customized food products. For example, the license engine 220 may restrict access to a user based on a number of factors. One example factor may include barring image purchases based on a geographic location and/or an authorized list for the user. In this example, when a user selects to view images available from the image library engine 212, the location engine 222 can automatically identify the geographic location of the user. The user's geographic location can then be used by the license engine 220 to identify whether any of the images in the image library engine 212 are restricted from being sold in the user's location. If a restriction is found, the license engine 220 sends to the image library engine 212 information on which images are unavailable to the user. The image library engine 212 removes the restricted or unavailable images from the image library made available to the user. In certain embodiments, restriction of images based on the user's geographic location can be in addition to or in substitute for an authorized list of images containing available images for the user.

The image library engine 212 also interacts with the user account engine 218 to allow a secondary user to only search and purchase images that have been authorized by a principal user. In some implementations, the principal user, such as a bakery or deli employee, searches through the image library engine 212 and purchases and/or identifies images that can be selected by secondary users designing a customized food product for pick-up at the respective bakery 112/deli 155. The principal user, in some examples, can designate different images for secondary users (consumers) in different geographic locations. When a secondary user accesses the website and selects to search the images in the image library engine 212, the secondary user is only shown the images available at the secondary user's geographic location, and/or on the secondary user's authorized list, which is made of images previously authorized by the principal user.

The image library engine 212 interacts with the print engine 246 to ensure that the version of the image that is compatible with the color model of the printer 134 is sent to the printer at bakery 134. When a bakery/deli employee selects to print an image, the print engine 246 or 3D print engine 247 sends to the image library engine 212 the color model of the printer 134 at bakery 112/deli 155. The image library engine 212 sends to the printer 134 the correct format of the image. In certain embodiments, the print engine 246 or 3D print engine 247 prompts or allows bakery/deli personnel to identify the printer 134 connected to local control device 128. In other illustrative embodiments, the print engine 246 or 3D print engine 247 auto detects the identity of printer 134.

In some implementations, the image library engine 212 also interacts with the edible media engine 216 to enable the consumer to identify images suitable for the particular edible media selected for decoration. The consumer enters into the edible media engine 216 the specific type of edible media being decorated. The edible media engine 216 contains characteristics of the edible media and sends to the image library engine 212 specific criteria for compatible images, such as image size. The image library engine 212 removes the images which are not compatible with the edible media the consumer selected.

The image editing engine 214, in some embodiment, is a software engine that allows consumers to edit selected images. Example editing functions may include cropping, moving, rotating, re-touching, brightening, darkening, and adding text to images, as well as other image editing operations. The image editing engine 214 interacts with the license engine 220 to prevent consumers from editing images on which there are editing restrictions imposed by a license. The license engine 220 informs the image editing engine 214 if there are any restrictions on editing the selected image, and if so, how. The image editing engine 214 then prevents the consumer from editing any images in violation of a license.

The edible media engine 216, in some examples, is a software engine that includes a list of 2D and 3D edible media materials available to be used in the system 100 and which are available for purchase by the bakery 112/deli 155. Bakery/deli personnel, in some implementations, can search or browse through the edible media engine 216 using various keyword criteria, such as "cupcakes" or "cake." The edible media engine 216 may also contain information about the cost and availability of edible media. Furthermore, the edible media engine 216 also may contain a database of unique codes that are associated with particular edible media. The unique codes may function as part numbers, printing data, cost data, retrieval data, or other data. The edible media engine 216, in some examples, interacts with the user account engine 218 to allow the bakery/deli employee to purchase edible media via a third-party vendor 115. Once the bakery/deli employee selects an edible media for purchase, the user account engine 218 processes the financial transaction. In some implementations, if a licensed image is selected, the user account engine 218 may require the bakery/deli employee to checkout before proceeding to print the image on the edible media.

In some implementations, the edible media engine 216 interacts with the image library engine 212 to allow the bakery/deli employee to identify images that are compatible with particular 2D or 3D edible media. The edible media engine 216 contains information about edible media compatible with the system 100. The bakery 112 and/or deli 155, in some implementations, chooses a specific type of edible media and the edible media engine 216 sends information about this edible media to the image library engine 212. The image library engine 212 then isolates specific images that are compatible with the particular type of edible media.

The edible media engine 216 includes at least one data repository (e.g., inventory data 145 of data repository 129 in FIG. 1) of unique codes that are associated with particular edible media. The edible media engine 216 tracks whether or not a code has been used to authorize a print. In some examples, the edible media engine 216 interacts with the print engine 246 and 3D print engine 247 to verify that the bakery 112 is using authorized edible media using the codes. The print engine 246 or 3D print engine 247 notifies the edible media engine 216 upon receiving a purchase request, which prompts the bakery 112/deli 155 to enter the code from the edible media. The edible media engine 216 verifies that the code is valid and that the code has not been previously used. If the code is valid, then the print engine 246 or 3D print engine 247 proceeds with the print of the image. If the code is not valid, then the print engine 246 or 3D print engine 247 notifies the bakery 112/deli 155 of the invalidity without printing the image. In some implementations, the edible media engine 216 can be implemented as part of inventory management engine 236. In some examples, when a number of unique codes associated with a particular type of edible media is less than a predetermined threshold, the edible media engine 216 can transmit edible media ordering information to the inventory management engine 236 so that new edible media and associated codes can be ordered from an edible media vendor.

In some embodiments, the user account engine 218 is a software engine that maintains profiles of individual users in user accounts. In some examples, the user accounts may include accounts for both consumers and bakery/deli personnel at bakery 112/deli 155, which can be stored in data repository 129 as account data 147 and bakery/deli data 149, respectively. The user account engine 218 can process financial transactions, for example, for consumers to purchase customized food products and also provides a tracking mechanism for customized food products that have been ordered by consumers. In some examples, the user account engine 218 can store purchase and order histories for consumers including selected images, designs, text content printed, notifications configured, and edible media purchased. The user account engine 218 can also store consumer profiles, address data, financial data, image restrictions as account data 147, and previous order information for each consumer, in data repository 129.

The user account engine 218, in some examples, also manages accounts for bakery/deli personnel, which can include information pertaining to a number of personnel who have access to the system 100, address data, financial data, authorized edible media codes, purchased images, information for consumers that have ordered products from each respective bakery, and approved image licenses for customized food products. The bakery account information can be stored in the data repository 129 as bakery/deli data 149. In some embodiments, the user account engine 218 maintains a list of usernames and passwords for bakery/deli personnel that provide or limit access to particular user accounts.

In some configurations, the user account engine 218 can provide an option for bakery/deli personnel and/or consumers to purchase credits that can be used to purchase images. The credits, in some embodiments, can be incremented when purchased and decremented when the bakery 112/deli 155 purchases images using system 100. For example, if a bakery 112/deli 155 chooses to download and print a digital image, the user account engine 218 can decrement the bakery's or deli's credits thereby providing payment and print the requested images onto a requested edible medium.

Licensed digital images, in some examples, can be charged on a per use basis. Thus, if the bakery 112 or deli 155 prints the same licensed digital image on six cupcakes, the bakery 112 may be charged six credits for using the licensed digital image six times. In some implementations, the system 100 can allow printing of a licensed image multiple times on one sheet of edible media, for example, at the cost of one usage (e.g., one credit). The system 100 may allow a variable relationship between an image and the number of credits required to use the image. In the event that the bakery 112 or deli 155 is short on credits, the bakery/deli personnel may be prompted to purchase additional credits by using a credit card, for example. If, however, the bakery 112 or deli 155 wishes to print non-licensed digital images, no credit charge will be transacted. Rather, the bakery 112 simply purchases any materials utilized.

In some embodiments, a selected licensed digital image can be instantaneously purchased from the central control device 132 by bakery/deli personnel (via local control device 128), for example, upon receiving (i) entered payment information and (ii) a request for purchase of the selected licensed digital image. The payment information can, for example, allow access to an e-commerce system (e.g., within system 100) for purchasing licensed digital images using decrementable credits for printing licensed digital images. The e-commerce system can be adjustable for multiple currencies such as the U.S. Dollar, the Pound, and the Euro, just to name a few examples.

In some configurations, bakeries or delis can pre-purchase credits that enable a print function to be selectable within the GUI 157, for example. The pre-purchased credits allow for bakeries/delis to easily access licensed content as part of a custom design and print the design in an accelerated fashion. For example, if the bakery 112/deli 155 pre-purchased credits, the bakery 112/deli 155 may have been asked to sign a licensing/usage agreement at the time of purchasing the credits. Thus, when the bakery 112/deli 155 performs a transaction with such credits, additional forms and/or steps are not required of the bakery 112/deli 155 to print the image on edible media. In some implementations, the payment information includes credit card data rather than previously purchased credits. In some embodiments, the payment information includes credit card data presented for purchasing decrementable credits.

In some embodiments, the user account engine 218 interacts with the image library engine 212 to allow the bakery 112 to purchase an image from the image library engine 212. Once the bakery/deli employee selects the desired image and chooses to complete the purchase, the user account engine 218 completes the purchase. For example, the user account engine 218 can verify whether the bakery 112 or deli 155 has any available credits. If the bakery 112/deli 155 does have available credits, then one or more credits are debited from the bakery's credits and the user account engine 218 authorizes the use of the image. If the bakery 112/deli 155 does not already have available credits, the user account engine 218 may prompt the bakery/deli personnel for credit card information or bank account information for direct debit. Alternatively, the user account engine 218 may already have this information and use previously stored financial information. The user account engine 218 will charge the bakery 112/deli 155 the designated amount and authorize the use of the image to complete the purchase.

The license engine 220, in some implementations, is a software engine that includes information regarding the user's (e.g., a consumer's or bakery/deli employee's) license to certain images. The license engine 220 interacts with the image library engine 212 and the location engine 222 to ensure that the user may only search and select for purchase authorized licensed images. The location engine 222 informs the license engine 220 of the consumer's and/or bakery's/deli's geographic location. The license engine 220 determines whether restrictions exist on the sales of particular images in the consumer's and/or bakery's/deli's location. If restrictions exist, the license engine 220 requests that the image library engine 212 remove the unauthorized images from the images available to the consumer. In some configurations, authorized lists or pre-filtered searching options can be applied to the available licensed content such that a consumer or bakery/deli is pre-approved for finding and/or downloading particular content. In some examples, the license engine 220 allows only those licensed images purchased by a bakery 112/deli 155 to be presented for selection to a consumer who has selected the bakery 112/deli 155 for producing the customized food product.

The license engine 220, in some examples, interacts with the image editing engine 214 to ensure that any licensing restrictions on images are followed. Once the user selects a particular image, the license engine 220 informs the image editing engine 214 if any licensing restrictions exist that prevent the user from editing the selected image. If restrictions exist, the license engine 220 presents the restrictions to the user.

The location engine 222, in some embodiments, is a software engine that identifies consumers', bakeries', and delis' geographic locations. In certain implementations, this may be accomplished by comparing the IP addresses of the consumer computing device 122 and local control device 128 against publicly available databases. In other embodiments, the location engine 222 determines a consumer's geographic location from an address list stored as account data 147 in data repository 129 and a bakery's/deli's geographic location from an address list stored as bakery/deli data 149. For example, the location engine 222 accesses one or more user address lists to determine which users reside in a particular location. The address lists typically include a number of users with corresponding physical mailing addresses, zip codes, or city and state designations. The location engine 222, in some examples, accesses the address lists to determine which geographic location is relevant for a particular consumer or bakery 112/deli 155 and provides a catalog of images having proper licensing for the determined geographic location. In some examples, address lists can be generated by a vendor or third-party and sent to individual systems (such as system 100). The secondary user (e.g., consumer) address lists can be uploaded by a primary user (e.g., a bakery/deli manager) using storage media or uploaded automatically over the Internet.

In some examples, the location engine 222 interacts with the license engine 220 and the image library engine 212 to ensure that the consumer and/or bakery/deli can only select and purchase images that are licensed in the geographical area. For example, if an image is licensed to be sold or used in Canada, the same image may have requirements for use in the United States. As such, the location engine 222 can use license engine 220 and image library engine 212 to ensure image licensing agreements are obeyed.

The location engine 222, in one example, interacts with the user account engine 218 to ensure that a secondary user (e.g., a consumer) can only search and select for purchase images that have been authorized by a principal user (e.g., a bakery or deli). When a user (consumer or bakery/deli) selects to search for an image from the image library engine 212, in some implementations, the location engine 222 identifies the user's location. The location engine 222 informs the user account engine 218 of the user's location, so the user account engine 218 can identify whether the user is a secondary user with geographic restrictions on the authorized images available to the user. In some configurations, authorized lists or pre-filtered searching options can be applied to the available licensed content such that a user is pre-approved for finding and/or downloading particular content, despite the user location falling within a geographic restriction.

In another example, the location engine 222 determines a consumer's location based upon address information (e.g., a city and state or zip code) provided by the consumer at the GUI 127, 171 as shown in FIGS. 6E-F. In some implementations, as shown in FIG. 6F, the location engine 222 uses the address information determined from the address information inputs, IP address, or stored address lists to identify bakery/deli locations that are located in closest proximity to a consumer, and the consumer selects a bakery/deli from the identified bakery/deli locations.

In some implementations, the training engine 224 is a software engine that includes training content which instructs consumers on how to use the user interfaces of the GUI 127, 171 to design and customize food products. In some examples, the training engine 224 includes videos, lists of common questions and answers, diagrams, or training tutorials.

An instruction generation engine 230, in some implementations, is a software engine that converts the customized food product designed by a consumer into decorating instructions that a bakery/deli employee can follow to produce the food product according to the consumer's design. In some examples where the food product is a customized cake, the decorating instructions produced by the instruction generating engine 230 can include recipes and ingredient amounts for the cake and icing (e.g., amounts or ratios of food coloring to icing to obtain a desired icing colors), cake dimensions (e.g., size and shape), edible media placement for both two-dimensional (2D) and three-dimensional (3D) edible media, placement of cake toppers or other decorations, assembly instructions for 3D edible media, and print data for image files to be printed on edible media. In some examples, the instruction generation engine 230 can dynamically adjust the ingredient amounts for a customized food product based on the selected dimensions and attributes of the food product. Further, the decorating instructions can include edible media printing instructions that can be generated by the instruction generation engine 230 based on a type of edible media, type of printer and/or printheads at the bakery 112, and/or attributes of the assembled 3D edible media. In some examples where at least one cake topper and background overlay are sold together in a set that may also include 2D and/or 3D edible media, the decorating instructions can include assembly instructions for all of the components in the purchased set. For customized deli products, in some implementations, the instruction generation engine 230 determines ingredient amounts and preparation instructions for deli products designed by consumers. For example, the instruction generation engine 230 can determine amounts of each ingredient for preparing a customized fruit and vegetable tray with an edible media decoration based on the size and layout of items selected by the consumer at GUI 171.

In some embodiments, the instruction generation engine 230 can perform computations for modeling and printing 3D edible media. In some examples where a consumer provides customized dimensions for customized printed 3D edible media, the instruction generation engine 230 performs the computations, modeling, and printing instruction generation based on the features of the customized 3D edible media. In this way, the instruction generation engine 230 is able to customize generated decorating instructions to the unique specifications provided by the consumer. Therefore, the ability of the instruction generation engine 230 provides a technical solution to the technical problem of automating the creation of 3D edible media by dynamically customizing decorating instructions for 3D edible media to the unique preferences of the consumer. In an example, the instruction generation engine 230 can compute a finite element model and/or structural mechanics to determine a center of mass and stability of 3D edible media. In an example, the instruction generation engine 230 can compute a set of equations based on mechanical statics and dynamics in order to determine an interoperability of a 3D edible media divided into multiple parts or two or more 3D edible media. In an aspect, the 3D edible media can be configured to divide into multiple parts, or the one or more 3D edible media can be configured to interact, based on an event such as melting, cutting, or breaking, of a part of the 3D edible media. In one example, a candle can be configured to melt a part of the 3D edible media and create an event.

In an aspect each edible media material has a known density. In an aspect the instruction generation engine 230 can determine the center of mass of the 3D edible media based on the density of the edible media material. In an aspect the instruction generation engine 230 can determine a suitable base and attachment features for the 3D edible media to prevent from dislocation or tipping. In an example, the instruction generation engine 230 can determine a base with a set of attachment features to compensate for the center of mass. In an aspect the instruction generation engine 230 can determine one or more edible media materials to print the 3D edible media such that it can have a center of mass to prevent tipping or other unplanned movement. In an aspect the instruction generation engine 230 can determine one or more edible media materials to print the 3D edible media such that it can have a center of mass to result in a planned movement.

In some implementations, the instruction generation engine 230 can use a 3D scan or digital data of the shape and appearance of the food product 150 or other two or 3D element presented upon an edible media (e.g., frosting sheet, cake top, etc.) to determine a feature of the 3D edible media. In some embodiments, the instruction generation engine 230 identifies the location of a 3D element and decorating instructions for the three-dimensional element. In a first example, the 3D printer may first print a 3D element (e.g., a frosting fish) and then later add decorative elements to the 3D element (e.g., airbrush edible ink onto the frosting fish). In a second example, the instruction generation engine 230 may identify placement of an off-the-shelf 3D element positioned on the edible substrate and alter the appearance of the off-the shelf-three-dimensional element using one or more printheads and/or other features of the 3D printer (e.g., airbrush tool, reductive modeling tool, etc.) to customize the appearance of the off-the-shelf three-dimensional element. In a particular illustration, the instruction generation engine 230 may identify the position of a 3D edible figurine and modify the figurine to conform to image data by matching or mimicking the supplied image data (e.g. by adding facial features, hair, etc. a figurine of the birthday girl created from an off-the-shelf avatar). In some examples, the instruction generation engine 230 may identify the off-the-shelf 3D element based in part upon one or more of a three-dimensional shape, a color, or a marking (e.g., barcode, QR code) on the off-the-shelf 3D element.

In some implementations, a consumer accesses a website on the central control device 132 to gain access to the first set of software engines 202. In some examples, the interact with the system 100 through a web-based application at the consumer computing devices 122. An authentication engine 228, in some embodiments, interacts with an application management engine 234 to ensure that only authorized consumers gain access to the system. Upon successful verification of an authenticated session between the software web browser on consumer computing device 122 and central control device 132 via network 118, the authentication engine 228 causes application management engine 234 to establish a second connection to central control device 132 in parallel to the connection used by the software web browser on consumer computing device 122. In some implementations, the parallel connection is established automatically after authentication of a secure connection for the software web browser by authentication engine 228. In other embodiments, the second connection is established upon user (consumer or bakery/deli) request. The application management engine 234 connects with security engine 254. In certain implementations, application management engine 234 may utilize the connection created by the software web browser for communication with central control device 132.

In certain configurations, the second connection occurs over the network 118 used by the software web browser. In other implementations, the second connection occurs over a network different from network 118. The connection established by the application management engine 234 can use identical networking protocols or encryption protocols to the connection utilized by the software web browser or can use a different networking and/or encryption protocols. In some embodiments, the second connection persists despite the initial connection between the software web browser on consumer computing device 122 and central control device 132 being terminated. In other configurations, the second connection terminates concurrently with termination of the first connection between the software web browser on local control device 128 and the central control device 132.

In some implementations, the application management engine 234 utilizes the secure socket connection with central control device 132 over the second connection. Access to software engines on central control device 132, including the image library engine 212, are accessible to the application management engine 234 concurrently with accessibility from the software web browser on consumer computing device 122. In certain implementations, the software web browser on consumer computing device 122 is a generic web browser. The software web browser on central control device 132 can be implemented as 3.sup.rd party software, with closed, proprietary, or undocumented application programming interfaces, and/or security profiles that deny access to system functions including local file system access. In other embodiments, the software web browser on consumer computing device 122 provides a documented application programming interface (API) for the software web browser to interact with other software installed on consumer computing device. Application management engine 234 can co-exist on consumer computing device 122 with either implementation of software web browser on consumer computing device.

In certain configurations, application management engine 234 provides a streamlined user interface for accessing software engines residing on central control device 132. The application management engine 234 can be implemented in a variety of programming languages or development environments. In certain implementations, the application management engine 234 can be implemented as an Adobe Integrated Runtime (AIR) application. In the AIR application, the application management engine 234 acts as a cross-platform, browser-based runtime application. In other embodiments, application management engine 234 can be implemented in C++ using Qt libraries. In the C++/Qt framework implementation, the application management engine 234 acts as a web-enabled cross-platform application and UI framework with access to system functions, such as the local file system.

The application management engine 234 can be implemented as a Rich Internet Application, providing both local file system access and remote web content access. For example, remote web content including but not limited to thumbnail representations of licensed images from image library engine 212 can be downloaded by application management engine 234 and stored in a local cache residing on the local file system of consumer computing device 122, providing low latency rendering of images during image manipulation events including browsing and editing. In other embodiments, the application management engine 234 is implemented in a software package complying with security policies that permit remote web content access, but not local file system access, or vice versa. Local cache contents are in a custom format that prevents system users (consumers or bakery/deli personnel) from extracting local cache contents for unauthorized editing and/or printing of cached licensed images.

The application management engine 234 on consumer computing device 122 exchanges data with central control device 132 over the same network connection established by the software web browser. In select implementations, the software web browser utilized an unsecured connection such as HTTP (Hypertext Transfer Protocol). The software web browser utilizes a secured connection such as HTTPS (HTTP with secure socket layer (SSL)/transport layer security (TLS)), performing security procedures including but not limited to server authentication, client authentication, and secure encryption key exchange.

The application management engine 234 on consumer computing device 122 exchanges data with central control device 132 over a network connection different than the network connection established by the software web browser. The separate connection established by the application management engine 234 can either be secured or unsecured, independent of if the software web browser connection is secured or unsecured.

The application management engine 234 is capable of sending and receiving separate classes of data on different connections and/or different connection security profiles. For example, image data from image library engine 212 may be received by the application management engine 234 over an unsecure HTTP connection between the application management engine 234 and the central control device 132, while financial data may be sent from the consumer computing device 122 to central control device 132 over a secure connection established by the software web browser. In another example embodiment, both image data and financial data may be sent over a secure connection established by either the software web browser or the application management engine 234.

In some implementations, application management engine 234 is associated with network address identification information. In certain embodiments, network address identification information allows engines residing on the consumer computing device 122 and central control device 132 to interact with one another without networks external to the consumer computing device 122 and central control device 132, such as a LAN, MAN, or the Internet. In other embodiments, network address identification information only allows engines residing on the consumer computing device 122 and central control device 132 to interact with one another through an external network connection, with or without messages passing through the central control device 132.

Application management engine 234 and the software web browser on the consumer computing device 122 communicate with a pre-defined message format and message exchange patterns. In an illustrative embodiment, the Simple Open Access Protocol (SOAP) is utilized. Alternatives communication schemes for exchanging complex data structures include but are not limited to Extensible Markup Language-Remote Procedure Call (XML-RPC) and JavaScript Object Notation (JSON).

Marketing automation engine 235, in some implementations, is a software engine that controls generation and transmission of targeted marketing materials to individual consumers as well as different demographic groups of consumers. In some examples, the marketing automation engine 235 extracts, organizes, and saves marketing data 153 in data repository 129. The marketing data 153, in some examples, may include numbers of each type of ordered customized food product that can be broken down into individual component categories corresponding to selections made by consumers at user interface screens for designing a customized food product (see FIGS. 6A-6R). For example, the marketing data 153 can include numbers of cakes that have been ordered over a period of time that have a particular color or flavor of icing, filling flavor, cake flavor, size and shape, type of 2D and/or 3D edible media, celebration occasion, type of decoration or topper, and type of prepackaged decorating set. For customized deli products, the marketing data 153 can include numbers of each type of deli product that have been ordered over a period of time that with particular ingredient, size, and edible media selections. For each of the individual component categories, the marketing data 153 may include demographic information relating to the types of people who order each type of individual cake component or type of deli product (e.g., age, gender, geographical region, marital status, parental status). In some examples, the marketing data 153 may be organized by market associated with each bakery 112/deli 155 that interacts with the system 100.

The marketing automation engine 235, in some embodiments, uses the marketing data 153 to generate targeted marketing materials that can be sent from bakery 112/deli 155 to consumers at consumer computing devices 122. In some implementations, the marketing automation engine 235, on behalf of a bakery 112/deli 155, transmits marketing materials via email or social to consumers. In other examples, the marketing materials may be presented to consumers logging in to their respective user accounts at a website and/or API for the system 100. In some aspects, the marketing materials presented to a consumer may be based on previous customized food product orders submitted by the consumer or a demographic category of the consumer. For example, if the consumer is the parent of a five-year-old girl, the marketing automation engine 235 may present marketing materials to the consumer related to unicorn cakes or princess cakes. If, in another example, a consumer has previously ordered sports-themed cakes, the marketing automation engine 235 may present marketing materials to the consumer related to other sports-themed cakes.

The marketing automation engine 235, in some embodiments, may also generate marketing materials for third-party vendors 115 marketing to bakeries 112 and consumers. In some implementations, the marketing automation engine 235, on behalf of a third-party vendor 115, transmits marketing materials via email or social media to bakeries 112/delis 155. In other examples, the marketing materials may be presented to bakery/deli personnel logging in to their respective user accounts at a website and/or API for the system 100. In some embodiments, the third-party vendors 115, such as decorating product vendors, can market 2D and 3D edible media, cake toppers, prepackaged decorating sets, or any other decorations that can be used to decorate customized food products.

In some implementations, the second set of software engines 204 may include an inventory management engine 236, a customer administration engine 238, a printer communication engine 242, a color management engine 244, a print engine 246, and a 3D print engine 247. The described software engines can be selectively combined to form a multifunctional software engine or split into multiple software engines.

The inventory management engine 236, in some embodiments, is a software engine that manages inventory for bakery 112/deli 155 to monitor inventory status and provide for reordering edible media, edible ink, replacement parts, printheads, consumable decorating products (e.g., cake toppers, decorating kits, decoration sheets, candles) and food product ingredients (e.g., icing, food coloring, flour, eggs, milk). For customized deli food products, in some embodiments, inventory items may also include deli-related food items (e.g., meat, cheese, produce, and bread product distributors) and consumable material products (e.g., disposable deli trays). In some examples, bakery/deli employees can scan an inventory item with a scanner connected to the local control device 128 or manually input the inventory item information at the customer display device 131 as the inventory item is consumed. Additionally, the bakery/deli employee may input the unique code associated with an edible media item. In some implementations, the inventory management engine 236 is configured to automatically and dynamically adjust amounts of one or more inventory items upon receiving a signal from local control device 128 that preparation of a respective customized food product is complete. For example, the inventory management engine 236 can automatically determine the amounts of each inventory item that have been used based on the dimensions, flavors, and other customization selections for the respective customized food product and adjust the quantities of the inventory items accordingly. The current status of the inventory items at the bakery is stored as inventory data 145 of data repository 129. In some examples, the inventory data 145 may also include a consumption rate of inventory items, which allows the inventory management engine 236 to predict when an inventory item may run out.

In some examples, the inventory management engine 236 may initiate orders for 2D and 3D edible media and associated printing materials, food product ingredients (e.g., quins, sprinkles, sugars, food colors such as airbrush colors and gel colors, confections, etc.), decorating products such as cake toppers and prepackaged decorating sets, and any other food product accessories (for example, candles for a birthday cake) based on receiving an inventory order submission from the local control device 128. In some implementations, the inventory management engine 236 presents one or more web order forms for the third-party vendors 115 within the GUI 157 at the customer display device 128, and bakery/deli employees manually initiate orders with the third-party vendors 115. Additionally, the inventory management engine 236 can also transmit automatic notifications to the local control device 128 to notify the bakery 112 that a particular inventory item is running low.

Automatic ordering engine 237, in some implementations is a software engine that controls automatic ordering of inventory items for bakeries. In some embodiments, when an amount of a particular inventory item is less than a predetermined threshold, the inventory management engine 236 transmits the inventory item information to the automatic ordering engine 237 with an automatic order request. In response to receiving the automatic order request, the automatic ordering engine 237 establishes a connection with web ordering systems of corresponding third-party vendors 115 and completes a transaction for the particular inventory item. For example, the system 100 may communicate with the third-party vendors 115 through a business-to-business e-commerce website. In other examples, the system 100 may communicate with the third-party vendors 115 via any other type of electronic communication methods, which can include electronic data interchange (EDI), phone, facsimile, or website communications. Additionally, the automatic ordering engine 237, in some examples, updates the status of the ordered items (e.g., estimated shipping date, amount ordered, estimated delivery date), which is stored as part of inventory data 145 in data repository 129. In some examples, the system can use the status of the automatically ordered items to compute the lead time for a customized food product order at bakery 112/deli 155. In some implementations, automatic ordering engine 237 may automatically initiate orders for any type of inventory item based on a consumption rate detected by the inventory management engine 236. Further, the automatic ordering engine 237 can dynamically adjust an ordering date and/or automatically initiate orders for inventory items based on a number of currently pending orders at the bakery 112/deli 155 as well as historical ordering information for the bakery 112/deli 155.

The system 200, in some examples, includes a customer administration engine 238 that manages the interactions that the bakery 112/deli 155 has with the system 100. In some implementations, the customer administration engine 238 receives decorating instructions and edible media print data for customized food product orders and displays order summary information on a bakery administrative user interface screen (for example, user interface 800 in FIG. 8). For example, the order summary information may include an order identification number, a pickup date, a descriptive name for the food product, a price, an order source (e.g., consumer computing device, kiosk), and a current status.

In some examples, the customer administration engine 238 determines a processing order for the received orders at the bakery 112/deli 155 based on a number of factors that may include pickup date, order reception date, type of edible media for the order, inventory at the bakery 112/deli 155, preparation lead time for the order, and details for other orders that are in progress at the bakery 112/deli 155. In some embodiments, customer administration engine 238 is configured to determine an optimal edible media printing order for the printer 134 at the bakery 112/deli 155. For example, a bakery or deli may receive food product orders for multiple types of printed 2D and 3D edible media and food products that have varied preparation lead times. The customer administration engine 238, in some implementations, can determine a print queue order for multiple edible media prints associated with multiple orders that maximizes throughput and efficiency.

In some examples, the customer administration engine 238 can dynamically adjust the print queue order based on attributes, decorating instructions, and pick-up times for incoming customized food product orders. For example, when the local control device 128 receives an incoming customized food product order, the customer administration engine 238 can assign the associated edible media print to be printed with other orders that are printed on the same type or size of edible media. In some implementations, the customer administration engine 238 may dynamically adjust a print queue order based on edible ink levels in the printer 134 at the bakery 112/deli 155 so that the ink levels of each of the ink colors in the printheads of the printer 134 are used at a substantially similar rate. For example, the printer 134 may transmit a status signal to the local control device 128 and/or central control device 132 with current levels or amounts of ink remaining in each of the installed printer cartridges. Determining the print order based on ink levels reduces the number of times that bakery employees have to stop production to change out and/or refill ink cartridges because multiple cartridges are at replacement ink levels around the same time. In some implementations, the print queue order may correspond to the preparation queue order for the pending customized food product orders at the bakery 112/deli 155. In other examples, such as when multiple customized food product orders are prepared within a short period of time such as a few hours or within a work day, the print queue order may vary from the preparation order to ensure maximum printing throughput and efficiency without compromising food product quality at pick-up time. For example, the customer administration engine 238 may determine the print queue order to ensure that the printed edible medium for the order is printed within a predetermined time period of when preparation of its respective customized food product order is projected to be completed based on its position in the preparation queue. In some examples where a bakery 112/deli 155 has more than one printer 134, the customer administration engine 132 may select a particular printer 134 for printing the printed edible medium based on a type of printhead attached to the selected printer 134. In instances where an edible media sheet includes multiple edible substrates of the same type, size, and shape, the customer administration engine 238 may adjust the order of edible media prints such that the printer 134 prints onto each of the edible media substrates on the sheet in a single printing session, which even further reduces the number of human interactions with the printer and thereby increases printer throughput. In this way, the system 100 provides a technical solution to the technical problem of automating edible media printing in an efficient and cost-effective manner that reduces processing times and improves system throughputs. Specifically, dynamically and automatically adjusting the print queue order removes many manual human interactions with the system 100. In other examples, the printer 134 may print onto the edible media in a first-in, first-out order.

In some implementations, the customer administration engine 238 may adjust an edible media printing order based on allergy restrictions associated with an incoming customized food product order. In some examples, the customer administration engine 238 can transmit print data for customized images created by consumers to a specific printer 134 at the deli based on food allergies associated with a customized food product order. For example, if an order includes an indication of a peanut allergy, the customer administration engine 238 may transmit the print data for the order to a printer 134 in a "peanut free" zone of the bakery or deli and/or adjust the order of edible media printing to accommodate the incoming order with allergy restrictions.

In some implementations, the customer administration engine 238 may present the orders at the bakery 112/deli 155 in a user interface screen having a calendar format. In some examples, the calendar user interface screen may display an event that corresponds to when an order is scheduled to be picked up as well as an event for when the bakery 112/deli 155 needs to commence order production to have the order ready on time. In some embodiments, the customer administration engine 238 can adjust the placement of events on the calendar user interface screen in real-time based on adjustments to the processing order due to other incoming orders or inventory status.

In some implementations, the customer administration engine 238 is configured to calculate and/or adjust preparation lead times for customized food products based on dynamically changing conditions at the bakery 112/deli 155. For example, the customer administration engine 238 can increase or decrease preparation lead times based on numbers of employees that are projected to work each day or are currently working. The preparation lead times can also be updated based on the dynamically changing quantities of inventory items at the bakery 112/deli 155 as other customized food product orders are being prepared. In some examples, if the preparation lead time for a customized food product order increases to a date or time that is later than the requested pick-up time, then the customer administration engine 238 communicates the updated preparation lead time information to the messaging engine 252 to automatically transmit a message to the consumer regarding the status of the customized food order. Similarly, consumers may also be notified if the customized food product order is projected to be ready for pick-up ahead of schedule.

In some implementations, the customer administration engine 238 controls the operation and presentation of customized APIs for each bakery 112/deli 155 interacting with the system 100. In some examples, data repository 129 stores customized API data for each bakery 112/deli 155 as bakery/deli data 149. For example, a bakery 112/deli 155 may receive customized food product orders through a general website associated with the system 100 but may have product preparation and workflow processes that are unique to the bakery 112/deli 155. The customized API for the bakery 112/deli 155 can present the order information and decorating instructions for customized food products in a format that is tailored to the processes of the bakery 112/deli 155. The APIs for each bakery 112/deli 155, in some embodiments, provide the flexibility to adapt to changes in preferences at each respective bakery 112/deli 155 interacting with the system 100 without affecting the interfaces of other bakeries 112/delis 155 with the system 100.

In some implementations, the customer administration engine 238 includes the functionality of the application management engine 234 described above for interactions between the central control device 132 and the local control device 128. Additionally, the customer administration engine 238 can be configured to bypass existing print drivers provided by the operating system when printing. When bypassing operating system print drivers, customer administration engine 238 interacts with a color management engine 244. The color management engine 244 provides color matching and correction to print data provided by print engine 246 or 3D print engine 247 on central control device 132. Color encoding on print data propagating from print engine 246 or 3D print engine 247 may be indexed by a color representation scheme as known in the art.

In certain configurations, the color representation scheme is as described by the International Color Consortium (ICC). The ICC specification uses the CIE color profile and is widely used and is referred to in many International and other de-facto standards, and was approved as an International Standard, ISO 15076-1, which is incorporated herein by reference. A standardized color representation scheme such as the ISO 15076-1 ensures color rendition accuracy despite variations in color detection and production across image capture devices (e.g., scanners), image display devices (e.g., monitors), and image reproduction devices (e.g., printers). Color management engine 244 provides a color managed workflow from source image to printer output, applying color representation transformations that ensure accurate color representation in each color domain. The general principles of color managed workflows using the ICC Color Management Model have been described variously, for example in U.S. Pat. No. 7,161,710 to MacLoed, et al, assigned to Adobe Systems Incorporated, which is incorporated herein by reference.

In some implementations, color profile information is embedded in the image provided by the print engine 246 or 3D print engine 247. In other embodiments, color profile information is retrieved separately from the image data provided by the print engine 246 or 3D print engine 247. In certain configurations, a separate image color profile for the customer display device 131 or consumer computing device 122 is applied to the retrieved image. In other implementations, the customer display device 131 or consumer computing device 122 is not color corrected using any color profile. Application of color correction to print devices is independent of application of color correction to display devices. In certain embodiments, bakery 112 can automatically retrieve the corresponding color profile for a printing device (e.g., printer 134) connected to local control device 128 based on hardware model information for printer 134. In other cases, the bakery 112 can provide its own color profile based on color spectrography measurements performed on printed outputs of printer 134.

The color management engine 244, in some implementations, interacts with a printer communication engine 242. The printer communication engine 242 provides communication to a printer device connected to local control device 128 without utilizing printer drivers installed on the operating system on local control device 128. In certain configurations, printer communication engine 242 automatically detects the model number of the attached printer 134, and downloads corresponding software through the second connection established by the customer administration engine 238. In other implementations, printer communication engine 242 includes pre-installed software for several different print hardware manufacturers and/or vendors. In further embodiments, printer communication capabilities provided by the printer communication engine 242 are not dependent on specific cartridge reservoirs utilized by the printer.

The print engine 246 is a software engine that allows bakery/deli employees to print images onto 2D and 3D edible media using the system 100. Once the bakery 112/deli 155 receives the image data to be printed onto edible media for the customized food product designed by the consumer, in some examples, the bakery 112/deli 155 selects to print the image. In some implementations, the print engine 246 and/or 3D print engine 247 can automatically initiate printing onto edible media at the printer 134 in accordance with the print queue order determined by the customer administration engine 238. The print engine 246 allows the bakery 112/deli 155 to preselect default printer model information, which can be stored within the print engine 246. In some implementations, the print engine 246 selects a color profile based on printer model information stored within print engine 246. Alternatively, print engine 246 can perform hardware communication with the printer to determine printer model information for the purposes of selecting a color profile. In another illustrative embodiment, print engine 246 allows the bakery 112/deli 155 to select a color profile.

The print engine 246, in some examples, provides data from the central control device 132 to the local control device 128 for printing on a 2D or 3D edible media printer attached to the local control device 128. In certain embodiments, the local control device 128 may print data provided by the print engine 246 within a print environment provided internally by a software web browser used to navigate the website with at least one image database. In other configurations, a local control device 128 may print data provided by the print engine 246 in an external printing environment provided separately from the software web browser used to navigate the website with at least one image database.

Print engine 246 interacts with the edible media engine 216 to verify that the bakery 112/deli 155 inputs a code, such as an edible media code, that corresponds to an authorized edible media. In some examples, the inventory management engine 236 verifies that the code is valid and unused before the print engine 246 proceeds with sending data to the local control device 128 for printing.

In some implementations, the print engine 246 manages printing onto both 2D and 3D edible media. In other examples, a 3D print engine 247 controls printing of 3D edible media, which can include monitoring the printing and assembly of each component of 3D edible media based on the decorating instructions received from the instruction generation engine 230.

The maintenance engine 248 is a software engine that includes maintenance menus for updating software, hardware, or inventory. The maintenance engine 248 can additionally provide troubleshooting instructions, printer maintenance features, testing functions, and cleaning functions.

In some implementations, the third set of software engines 206 may include a maintenance engine 248, a reporting engine 250, a messaging engine 252, and a security engine 254. The described software engines can be selectively combined to form a multifunctional software engine or split into multiple software engines.

The reporting engine 250 is a software engine that includes mechanisms for reporting on sales, inventory, consumers, errors, malfunctions, and other events occurring in system 200a. In some embodiments, reporting data can be exported to comma delimited files, Excel files, or exported to particular reporting software. The reporting engine 250 can additionally provide site metric reporting via site metric reporting software.

The messaging engine 252 is a software engine that includes mechanisms for generating and sending electronic messages to users (consumers at consumer computing devices 122 and bakeries at local control devices 128). For example, the messaging engine 252 may send an electronic message to specific consumer accounts or groups of consumer accounts based on previous purchases. The messaging engine 252 may send system receipts or other billing information in the form of a message. In some configurations, the messaging engine 252 sends messages to bakeries 112/delis 155 regarding system updates or image updates. In some implementations, the messaging engine 252 provides for message exchange between the bakery 112/deli 155 and consumers. For example, a bakery/deli employee transmits a message to a consumer computing device 122 if an unexpected delay occurs during preparation of the customized food product. Additionally, consumers can notify the bakery if they have any adjustments to a previously submitted order.

Security engine 254 is a software engine that handles secure socket connections from local control device 128. For example, following authentication through login procedures through a software web browser, central control device 132 can establish additional secure connections to the consumer computing device 122 or local control device 128 with software engines separate from the software web browser. Functionality not incorporated into the software web browser on consumer computing device 122 or local control device 128 can interact with the software engines on central control device 132 through security engine 254. Interaction with software engines on central control device 132 can proceed through multiple software applications on consumer computing device 122 or local control device 128. In certain implementations, security engine 254 handles secure transmission of both licensed image data and financial data for purchases of licensed images. In other illustrative implementations, security engine 254 handles secure transmission of financial data for purchases of licensed images but does not apply security policies to licensed image data. In certain embodiments, HTTP (hypertext transfer protocol) can be used for transmitting payment and/or image data, such as in the form of unsecured HTTPS or secured HTTPS. In other embodiments, FTP (file transfer protocol) can be used for transmitting payment and/or image data. Alternatively, SMTP (simple mail transfer protocol) can be used for data transfer.

In some implementations, the fourth set of software engines 208 may include a kiosk control engine 256 and additional system engines 258. The described software engines can be selectively combined to form a multifunctional software engine or split into multiple software engines.

Kiosk control engine 256, in some implementations, is a software engine that controls operation of kiosk 161 in the system 100b. In some examples, the kiosk control engine 256 manages the presenting of user interface screens at the kiosk 161 and processing food product customization orders received at the kiosk or at a device 163 connected to the kiosk 161. In some implementations, the kiosk control engine 256 controls operation of at least one short range communication access point at the kiosk 161 that enables devices 163 to connect to the kiosk 161 to increase the number of orders that can be processed and received by the kiosk 161. In some implementations, the kiosk control engine 256 may search for consumer computing devices 163 within communication range of the kiosk 161. When an in-range consumer computing device 163 is detected, the kiosk control engine 256 may initiate a connection query transmission to the device 163 to determine whether the consumer is interested in connecting the consumer computing device 163 to the kiosk 161 to design a customized food product. In other examples, consumer operating devices 163 may manually search for and establish a communication link with the kiosk 161 via the network 165.

In one example, the kiosk control engine 256 monitors the number of connected devices 163 and determines whether there is a channel slot available for a newly detected device 163. In some examples, if there are no channel slots available for the newly detected device 163, the kiosk control engine 256 calculates an estimated time of availability (ETA) for the device based on an in-progress order status for consumers at the other connected devices. In one example, the kiosk control engine 256 can determine the ETA based upon which user interface screen a consumer is currently viewing. For example, a consumer who is currently viewing an order review user interface screen is closer to completing the process of designing a customized food product than a consumer who is editing a photo to print on an edible medium. In some examples, when a consumer computing device 163 connects to the kiosk 161 via the network 165, the kiosk control engine 256 establishes a master-slave relationship between the kiosk 161 and the consumer computing device 163 where the kiosk 161 is the master. For example, upon connection to a consumer computing device 163, the kiosk 161 may cause presentation of one or more food product customization user interfaces screens at the device 165 such that the device 165 functions as an input/output device, and the kiosk 161 presents the customization and editing options to the connected device 163 at the user interface screens and also receives and processes inputs that are provided by consumers at the user interface screens. In some examples, when the device 163 is connected to the kiosk 161, the kiosk control engine 256 disables most or all other functionality of device 163 so that the consumer can only interact with the system 100b via the kiosk 161.

In some embodiments, the kiosk control engine 256 can also control interactions between consumer computing device 163, central control device 132, and kiosk 161 that allow a consumer to directly upload images for use at the kiosk 161 via a system-supplied URL link. For example, as shown in FIG. 6P, the kiosk control engine 256 can provide a user contact information user interface (UI) screen 617 to kiosk 161. At the UI screen 617, a consumer can provide a phone number 619 and/or email address 621 that can be used to interact with the system 100c and kiosk 161. For example, responsive to a consumer providing a phone number 619, the kiosk control engine 256 can cause a text message to be transmitted to the consumer computing device 163, as shown in mobile messaging interface 623 in FIG. 6Q. The mobile messaging interface 623 can include a web URL 625 that allows a consumer to access a photo upload interface 627 (FIG. 6R) for uploading one or more photos to the system 100c. In some examples, the photo upload interface 627 enables the consumer to select a photo 629 stored on the consumer computing device 163 for upload to the system 100c and provide a message 629 to the bakery 112/deli 155 with customized information about the photo. In some examples, upon uploading a selected photo to the system 100c, the consumer can use UI screens at the kiosk 161 to access the uploaded photo, add the photo to a customized food product, and edit the photo within food product customization UI screens. In one example, the interactions between the central control device 132, kiosk 161, and consumer computing device 163 for providing images from the consumer computing device 163 for use at the kiosk 161 can be controlled by a cloud-based messaging platform.

Additional engines 258 can be included in system 200. For example, service oriented third-party applications can be merged or supplied as add-ins as appropriate. Similarly, online advertising content, Internet access, FLASH applications, database management, online shopping, and other services may be offered in system 200. Additionally, media players, advertising displays, and other services may be offered in system 200.

System Processes

Figure 3A:
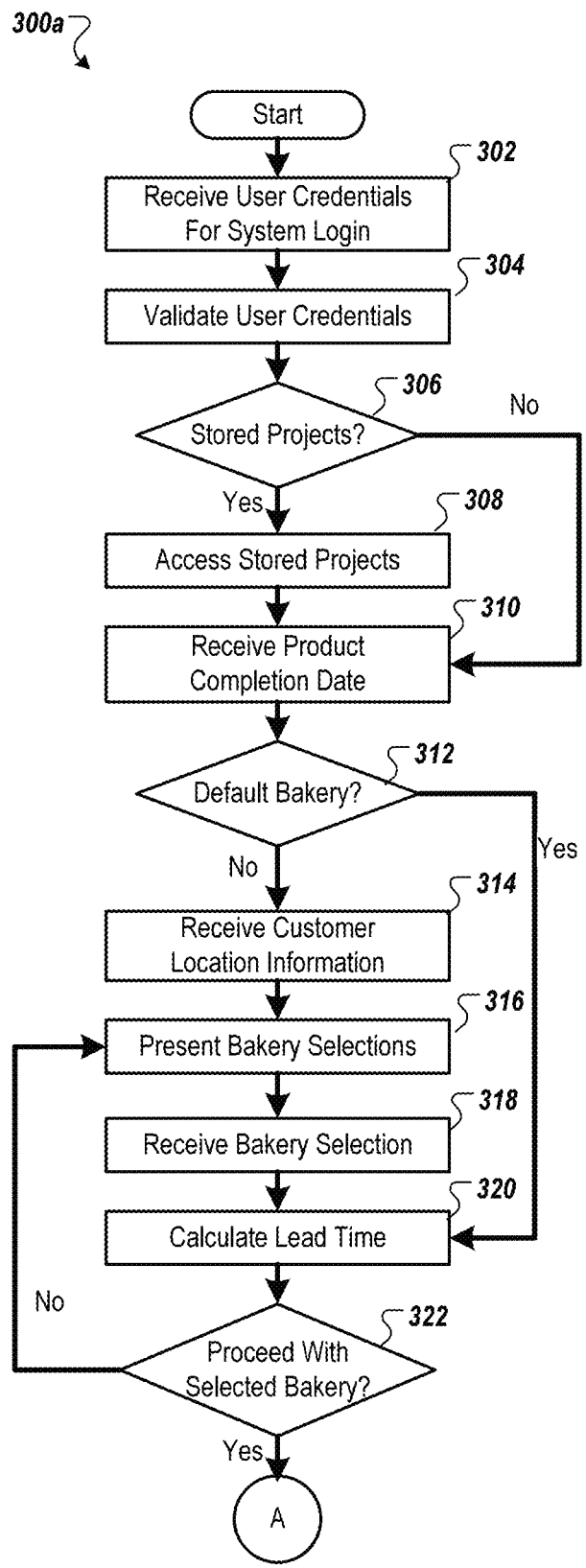
FIGS. 3A-3C illustrate a flow chart for a method of designing a customized food product.
Figure 3B:
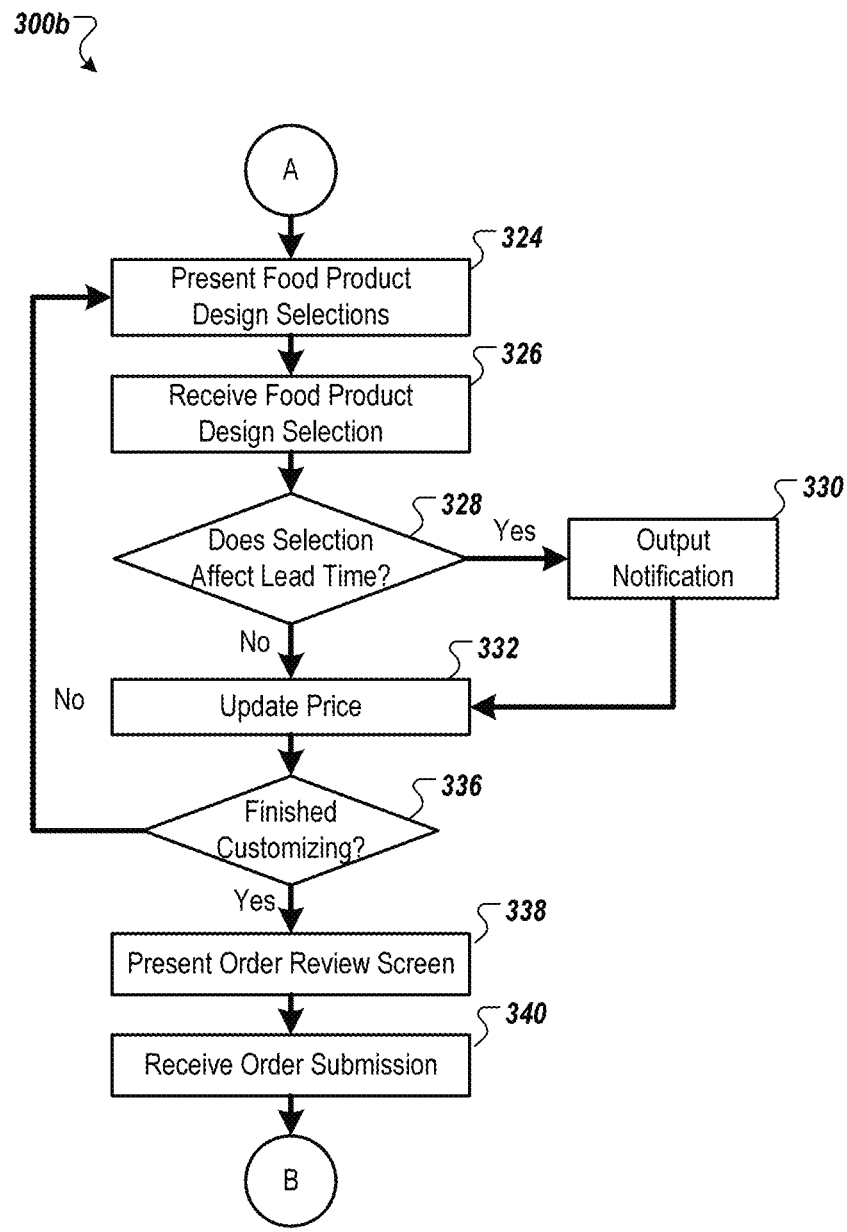
Figure 3C:
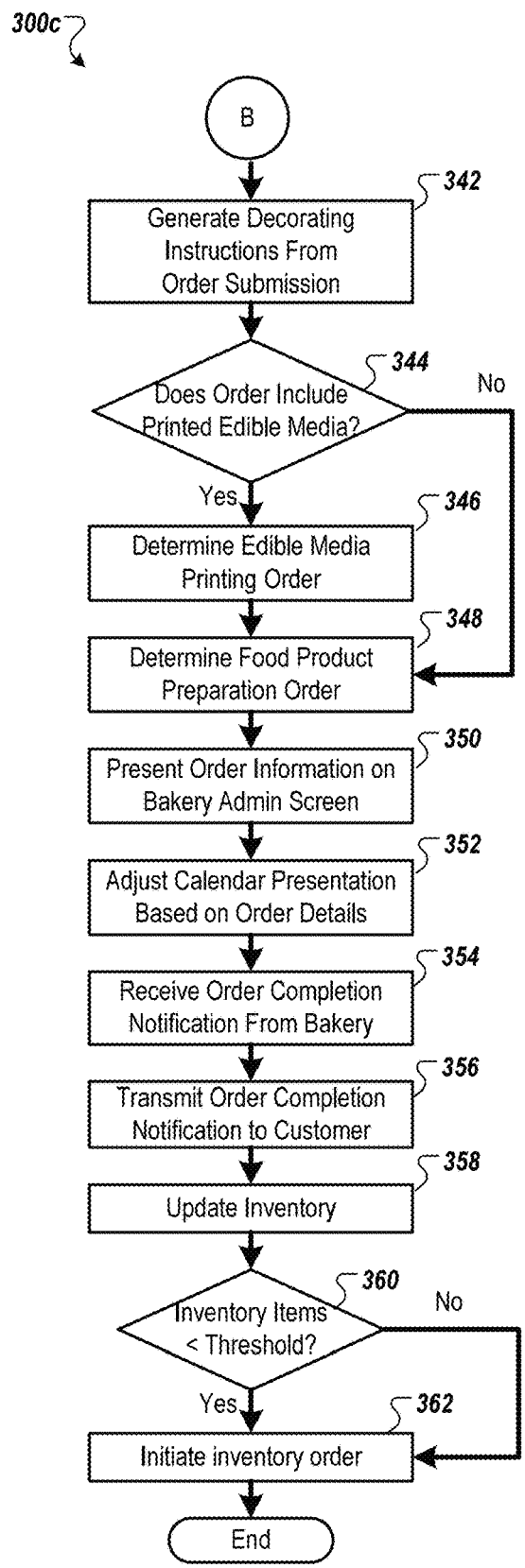

Turning to FIGS. 3A-3C, a method 300 of designing a customized food product is illustrated. While the method 300 is described herein with respect to customizing bakery food products with edible media at GUI 127 (FIGS. 1A, 1K), the method 300 can also be applied to customizing deli food products at GUI 171 (FIG. 1L). In certain embodiments, the method 300 may commence when the system 100 receives login credentials from a consumer at GUI 127 (302), and user account engine 218 validates the login credentials (304). If a user does not have a registered account with the system 100, in some examples, user account engine 218 may present an account registration user interface screen where the consumer can create login credentials for logging into the system (for example, FIG. 6N).

If there are any previously completed or in-progress projects associated with the consumer stored as project data 143 in data repository 129 (306), then the user account engine 218, in some examples, accesses any stored projects so that the consumer can continue editing an in-progress project or design another food product based on a previously completed project (308).

In some examples, the system 100 receives a project completion date for the project from the consumer at GUI 127 (310). In some embodiment, the GUI 127 includes a selection where the consumer can indicate a desire for a same-day order pickup (input field 602 in FIG. 6A.) If a consumer does not have a default bakery associated with the consumer's login credentials (312), then in some examples, location engine 220 receives location information for the consumer (314), either from location information input fields (for example, input field 638 of user interface screen 636 of FIG. 6F, positional data (e.g., GPS data) or IP address data for consumer computing device 122, or stored address data for the consumer. In some embodiments, the GUI 127 provides the consumer with an option to check out as a guest without providing login credentials.

In some embodiments, the location engine 220 presents one or more bakery selections to the consumer (316) (for example, bakery selections 640 at user interface screen 636 of FIG. 6F) based on the consumer location information, and in some aspects, the consumer selects one of the presented bakery selections (318). In some implementations, the consumer-facing design engine 210 calculates a lead time for preparing the food product based on an inventory status and current workload of the selected bakery (320). If the consumer is unsatisfied with the lead time of the selected bakery (322), the consumer can select another bakery that has a lead time that is acceptable to the consumer (316, 318).

The consumer-facing design engine 210, in some implementations, presents one or more user interfaces (for example, FIGS. 6H-6K and FIGS. 7A-7D), to the consumer at the GUI 127 on the consumer computing device 122 that allow the consumer to make design selections for a customized food product (for example, a cake) from start to finish without interacting with personnel at the bakery 112 (324). In some examples, the design selections include photo selection and editing, licensed and unlicensed image selection, cake size and shape selection, text placement and editing, cake filling selection, icing color and flavor, cake topper selection, and selection of additional accessories (e.g., birthday candles). In some implementations, the consumer-facing design engine 210 only presents design selections that are available at the bakery 112 selected by the consumer. The consumer-facing design engine can, in some examples, present the unavailable design selections at the user interface screen with an indication that a particular design selection is unavailable at the selected bakery (for example, through an adjustment in hue of the unavailable selection or with the words "unavailable at the selected bakery" below the selection). If the consumer wishes to select the unavailable selection, the consumer can choose another bakery that offers the desired design selection.

In one example, the consumer-facing design engine 210 is configured to recalculate the lead time for the selected bakery after each food product design selection that is made at the GUI 127. If the design selection affects the previously presented lead time and/or the adjusted lead time is after the consumer's desired pickup date (328), the consumer-facing design engine 210 may output a notification to the GUI 127 at the consumer computing device 122 indicating that the lead time is affected (330) so that the consumer has an opportunity to make another design selection or select another bakery.

In some implementations, with each design selection that is made by the consumer, the consumer-facing design engine 210 updates a price sub-total for the customized food product in real-time (332) such that the price indicated on the user interface screen includes all of the design selections made by the consumer up to that point. In some examples, when the consumer has made all of the design selections for the customized food product (336), the consumer-facing design engine 210 presents an order review user interface screen (for example, user interface screen 678 in FIG. 6L) that includes all of the selections made by the consumer, the pickup date, bakery location, and price total (338). Once the consumer submits the order and the order is received by the system 100, in some examples, the consumer-facing design engine 210 presents an order confirmation user interface screen at the consumer computing device (for example, FIG. 6M) (340).

In some examples, once the customized food product order is received by the system 100, instruction generation engine 230 converts the design selections for the food product into a set of decorating instructions for a bakery/deli employee to follow to produce the food product (342). In some examples where the food product is a customized cake, the decorating instructions produced by the instruction generating engine 230 can include recipes and ingredient amounts for the cake and icing (e.g., amounts or ratios of food coloring to icing to obtain a desired icing colors), cake dimensions (e.g., size and shape), edible media placement for both two-dimensional (2D) and three-dimensional (3D) edible media, assembly instructions for 3D edible media, and print data for image files to be printed on edible media.

If the food product order includes printed 2D or 3D edible media (344), then in some examples, customer administration engine 238 determines a printing order for the edible media based on other pending food product projects that include printed edible media (346). The customer administration engine 238, in some implementations, can determine a print queue order for multiple 2D or 3D edible media prints that maximizes throughput and efficiency. The customer administration engine 238, in some embodiments, may also determine a food product preparation order for the incoming project based on a number of factors that may include pickup date, order reception date, type of edible media for the order, inventory at the bakery 112, preparation lead time for the order, and details for other orders that are in progress at the bakery 112 (348).

In some implementations, the customer administration engine 238 displays order summary information on a bakery administrative user interface screen (for example, user interface 800 in FIG. 8) (350). For example, the order summary information may include an order identification number, a pickup date, a descriptive name for the food product, a price, an order source (e.g., consumer computing device, kiosk), and a current status. The customer administration engine 238, in some examples, can also adjust the placement of events on the calendar user interface screen in real-time based on adjustments to the processing order due to other incoming orders or inventory status (352).

When the bakery 112 has completed preparing a customized food product order, in some embodiments, a bakery/deli employee can transmit an order completion notification from local control device 128 to central control device 132 through an interaction with the bakery administrative user interface screen (354). Upon receiving the notification, in some examples, the central control device 132 forwards the order completion notification to the consumer computing device 122 to notify the consumer that the order is ready for pickup (356).

Upon completion of preparing the customized food product order, in some implementations, inventory management engine 236 updates amounts of inventory items to reflect the consumption of the inventory items (e.g., ingredients, decorations, toppers, prepackaged decorating sets, 2D and 3D edible media) for the customized food product order (358). For example, for an 8-inch round chocolate cake with vanilla icing decorated with a princess decorating set, the inventory management engine 236 decrements the amounts of ingredients that correspond to the recipe for an 8-inch chocolate cake and decrements the inventory amount of princess decorating sets.

If an amount of any of the inventory items managed by the system 100 is less than a predetermined threshold (360), then in some implementations, the inventory management engine 236 triggers an automatic ordering engine 237 to initiate an inventory item order at an applicable with an applicable third-party vendor 115 (362). In response to receiving the automatic order request, the automatic ordering engine 237 establishes a connection with web ordering systems of corresponding third-party vendors 115 and completes a transaction for the particular inventory item. For example, the system 100 may communicate with the third-party vendors 115 through a business-to-business e-commerce website. In other examples, the system 100 may communicate with the third-party vendors 115 via any other type of electronic communication methods, which can include electronic data interchange (EDI), phone, facsimile, or website communications. In other examples where the system is configured for manual inventory ordering, the inventory management engine 236 may transmit a notification to local control device 128 at bakery 112 to notify bakery/deli personnel that they are running low on at least one inventory item and should initiate a product order for the at least one item.

While the flow charts described with respect to FIGS. 3A-3C illustrate an ordering of one or more blocks or steps, it can be understood that that steps can be performed in any order, in series, or in parallel. In some implementations, multiple steps may be performed simultaneously by different processing engines. For example, determining an edible media printing order (346) may be executed simultaneously with determining a food product preparation order (348). In other examples, presenting and receiving the bakery selections (316, 318) may be performed before or simultaneously with receiving the project completion date (308).

Figure 4:
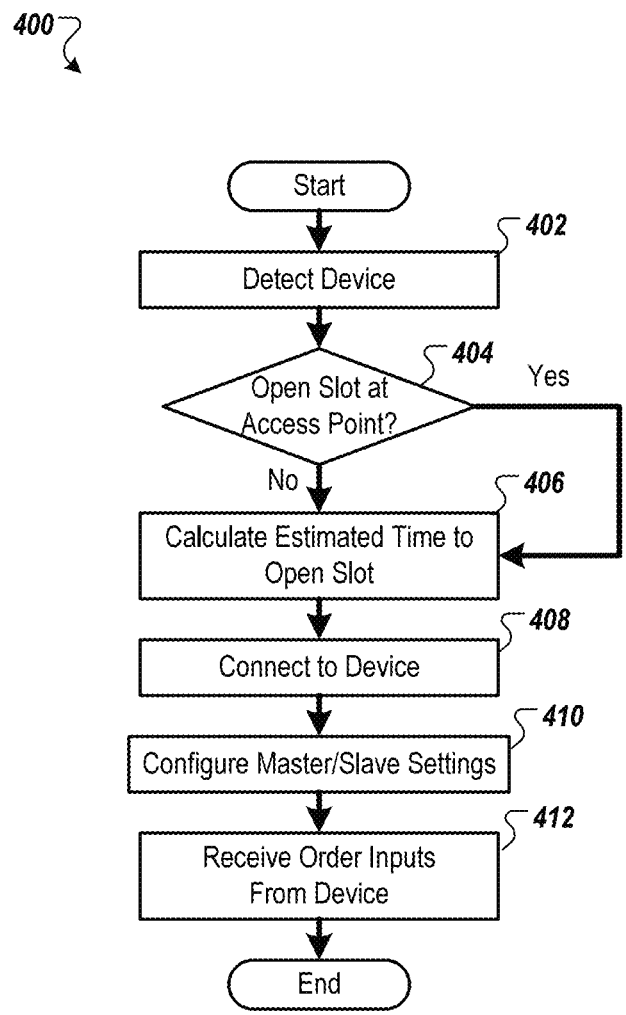
FIG. 4 illustrates a flow chart for a method of interacting with a system for designing and producing customized food products with edible media through a kiosk.

Turning to FIG. 4, a method 400 of interacting with a system for designing and producing customized bakery and/or deli food products with edible media through a kiosk, such as kiosk 161 (FIG. 1K, 1L) is illustrated. In certain embodiments, the method 400 may commence when the kiosk 161, which includes circuitry for providing a short range communication access point, detects a device 163 within communication range of short range communication network 165 (402). When an in-range consumer computing device 163 is detected, the kiosk control engine 256 may initiate a connection query transmission to the device 163 to determine whether the consumer is interested in connecting the consumer computing device 163 to the kiosk 161 to design a customized food product. In other examples, consumer operating devices 163 may manually search for and establish a communication link with the kiosk 161 via the network 165.

If there are currently no open channel slots for the detected device (404), then in some examples, the kiosk control engine 256 calculates an estimated time of availability (ETA) for the device 163 based on an in-progress order status for consumers at the other connected devices (406). In one example, the kiosk control engine 256 can determine the ETA based upon which user interface screen a consumer is currently viewing. For example, a consumer who is currently viewing an order review user interface screen is closer to completing the process of designing a customized food product than a consumer who is editing a photo to print on an edible medium. When a channel slot becomes available, in some examples, the kiosk access point establishes a communication link on the network 165 connecting the device 163 to the kiosk 161 (408).

When the device 161 connects to the kiosk 161 via the network 165, in some implementations, the kiosk control engine 256 configures master-slave settings between the kiosk 161 and the consumer computing device 163 where the kiosk 161 is the master (410). In one example, upon connection to a consumer computing device 163, the kiosk 161 may cause presentation of one or more food product customization user interfaces screens at the device 165 such that the device 165 functions as an input/output device, and the kiosk 161 presents the customization and editing options to the connected device 163 at the user interface screens and also receives and processes inputs that are provided by consumers at the user interface screens (412). In some examples, when the device 163 is connected to the kiosk 161, the kiosk control engine 256 disables most or all other functionality of device 163 so that the consumer can only interact with the system 100b via the kiosk 161.

While the flow charts described with respect to FIG. 4 illustrate an ordering of one or more blocks or steps, it can be understood that that steps can be performed in any order, in series, or in parallel. In some implementations, multiple steps may be performed simultaneously by different processing engines. For example, determining whether an open channel slot is available for a detected device (404) may be executed simultaneously with or subsequent to calculating an ETA for an open slot (406).

System User Interfaces

Figure 5A:
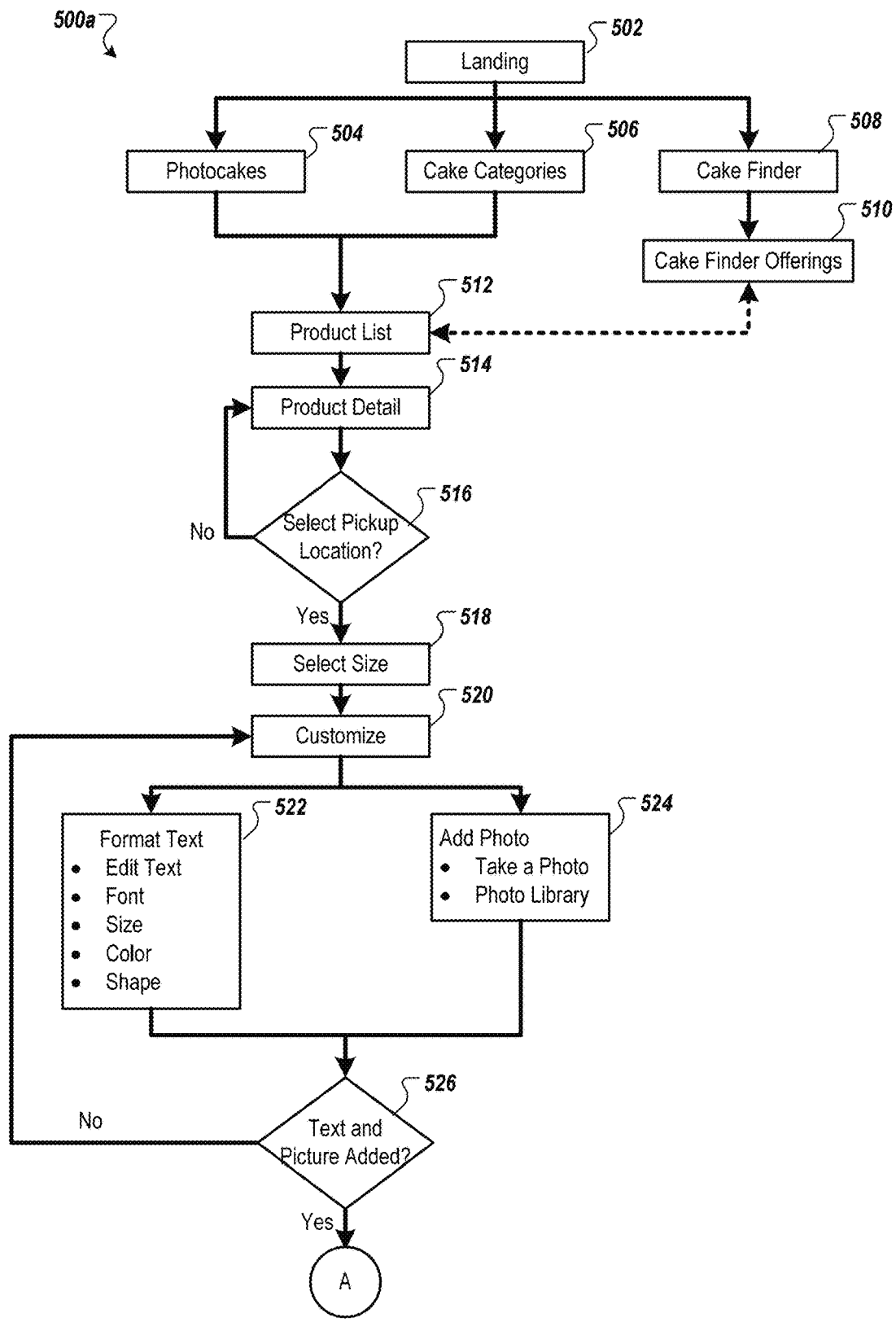
FIGS. 5A-5B illustrates a work flow for presenting cake customization user interface screens at a computing device.
Figure 5B:
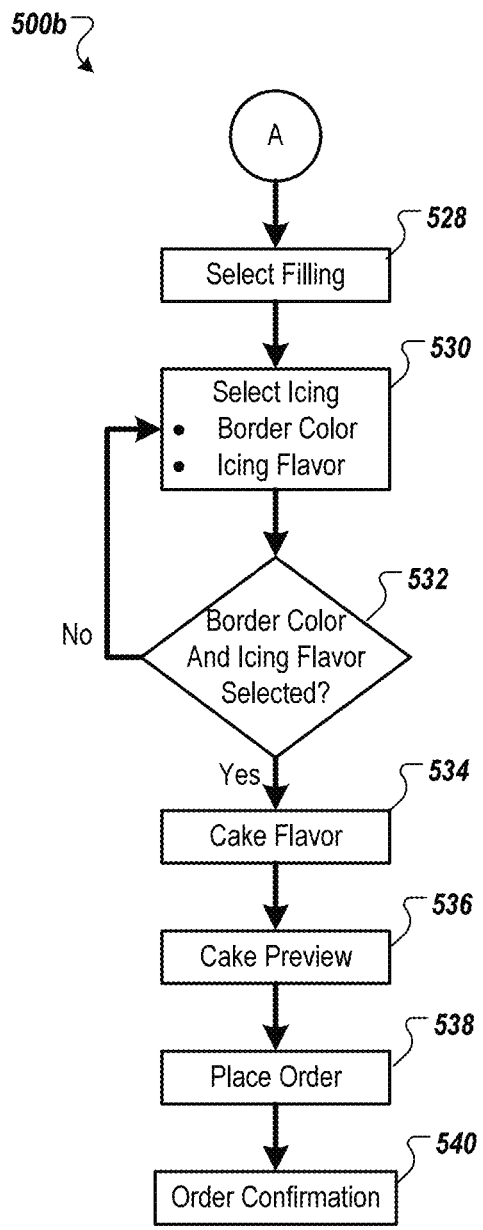

Turning to FIGS. 5A-B, a workflow 500 for presentation of cake customization user interface (UI) screens at a consumer computing device or kiosk is illustrated. In some implementations, the cake customization UI screens (FIGS. 6A-6R and 7A-7D) can be presented by consumer-facing design engine 210 to a consumer computing device 122 or kiosk 161 connected directly to the system 100b via network 118 or to a consumer computing device 163 connected to the system 100b through the kiosk.

Figure 6A:
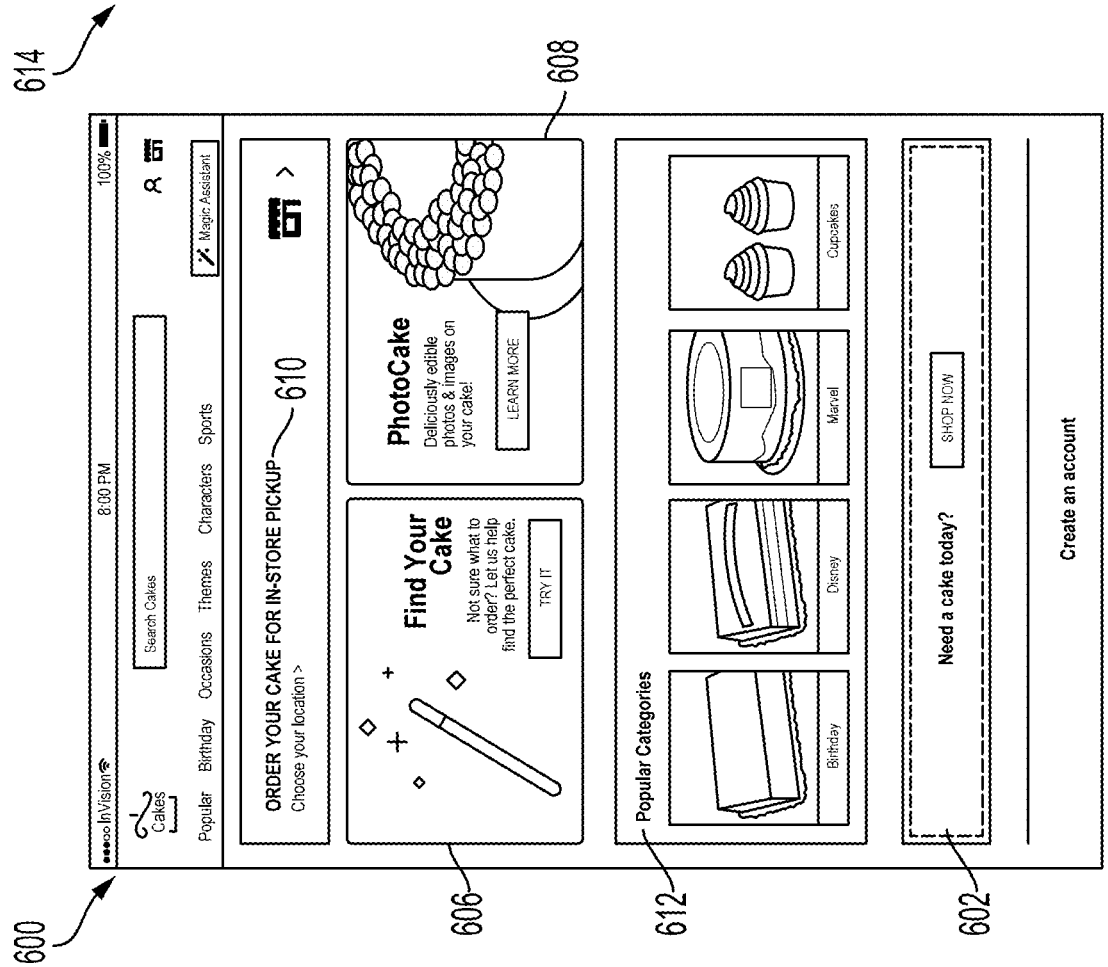

In some implementations, upon logging in to the system 100, a consumer is presented with a landing page 502, such as UI screen 600 shown in FIG. 6A. The UI screen 600, in some examples, includes buttons or links that allow a consumer to select how to search for a type of cake to order. In some examples, the selections include a photocake selection link 608 that allows the consumer to commence designing a cake that incorporates a photo printed on a printed edible medium, a cake category link 612 that presents possible cake selections in categories (e.g., birthday, anniversary, movie theme) that make it easier for the consumer to find a desired type of cake, and a cake finder link 606 that allows the consumer to input filter criteria that are used to present a customized set of cake selections to the consumer based on consumer preferences. Additionally, the UI screen 600 includes a bakery selection link 610 and a rapid order link 602 that allows consumers to view the types of cakes that are available for same-day pickup.

Returning to FIGS. 5A-B, based upon the selection made at the landing page 502, the consumer-facing design engine 210 presents a cake search screen that allows the consumer to more efficiently search for and identify a desired cake product. The cake search screens, in some examples, include a photocake selection screen 504, a cake category search screen 506, and a customized cake finder search screen 508. In some implementations, the consumer-facing design engine presents a product list 512 that for photocakes or a particular cake category. If, in some embodiments, the consumer uses the customized cake finder search, the consumer-facing design engine 210 returns a set of customized cake offerings 510 that correspond to the filter inputs provided by the consumer. Once the consumer selects a desired cake product from those presented in the product list 512 or customized cake offerings 510, the consumer-facing design engine 210 displays a product detail 514 of the selected cake product, which may include a product photo, customization options, price, and nutrition information.

For example, FIG. 6B shows a photocake selection UI screen 614 that is displayed when photocake selection 608 is made at UI screen 600 (FIG. 6A). The photocake selection UI screen 614 can include a link 616 for creating a cake that includes an uploaded photo and frame as well as a link 618 for incorporating an uploaded photo into a design that includes one or more image files. FIG. 6C shows a customized cake finder search UI screen 620 that the consumer-facing design engine 210 presents in response to selection of cake finder link 606 in UI screen 600 (FIG. 6A). In some examples, the cake finder UI screen 620 includes filter inputs 622 that allow the consumer to specify an occasion for ordering the cake (e.g., birthday, anniversary), an age or gender of the cake recipient, same-day pickup ordering, or photocake ordering. When the "show results" link 624 is selected, the cake products that correspond to the filter inputs are displayed. For example, FIG. 6D shows a customized cake offering UI screen 626 with results that correspond to the filter criteria submitted at UI screen 620. Once the consumer selects a desired cake product from those presented in UI screen 626, the consumer-facing design engine 210 displays product details for the selected cake product in a product details UI screen 628 as shown in FIG. 6E. The UI screen 628 may include a product photo 630, nutrition information 632, and the selected bakery 634 for pickup.

In some examples, if a bakery pickup location has not been selected, the location engine 222 presents a location selection UI screen, such as UI screen 636 shown in FIG. 6F. The location selection UI screen 636 includes a location information input field 638 where the consumer inputs a city and state or zip code, and the location engine 222 produces a set of bakery results 640 that correspond to the location information provided in the input field 638. In some examples, the bakery results 640 may be further refined to reflect the consumer's desired pickup date and cake product selections.

Returning to FIGS. 5A-B, if the consumer has selected the bakery pickup location 516, in some implementations, the consumer-facing design engine presents a series of UI screens that allow the consumer to select a cake size 518 and further customize the cake 520 by formatting text 522 and adding/editing at least one photo 524 to be added to the cake. In some examples, if the text and picture have been added 526, then the consumer-facing design engine presents UI screens that allow the consumer to select a filling flavor 528 and customize an icing border color and icing flavor 530. If, in some examples, the filling and icing have been selected, the consumer-facing design engine 210 presents UI screens that allow the consumer to select the cake flavor 534, preview the customized cake 536, submit the cake product order 538, and receive order confirmation 538.

While the UI screen work flow described with respect to FIGS. 5A-B illustrate an ordering of one or more blocks or steps, it can be understood that that steps can be performed in any order, in series, or in parallel. For example, the customization UI screens may be presented in any order. In one example, the consumer selects the cake flavor prior to selecting the filling or editing the text or photo. Further, in some embodiments, the bakery pickup location may be selected after the cake product customization has been performed.

FIGS. 6G-6K and FIGS. 7A-7D illustrate cake product customization UI screens. As shown in FIGS. 6G-6K, as the consumer makes each selection for customizing the cake product, the consumer-facing design engine 210 updates a visual representation of the cake product 646, a listing of all of the customization selections that have been made up to that point 680, a price sub-total 648 that reflect all of the selections that have been made up to that point, and a "place order" link 650. In some examples, the "place order" link is unavailable for selection until all of the customizable selections have been made (for example, as shown in FIG. 6L).

Figures 6G, 6H:
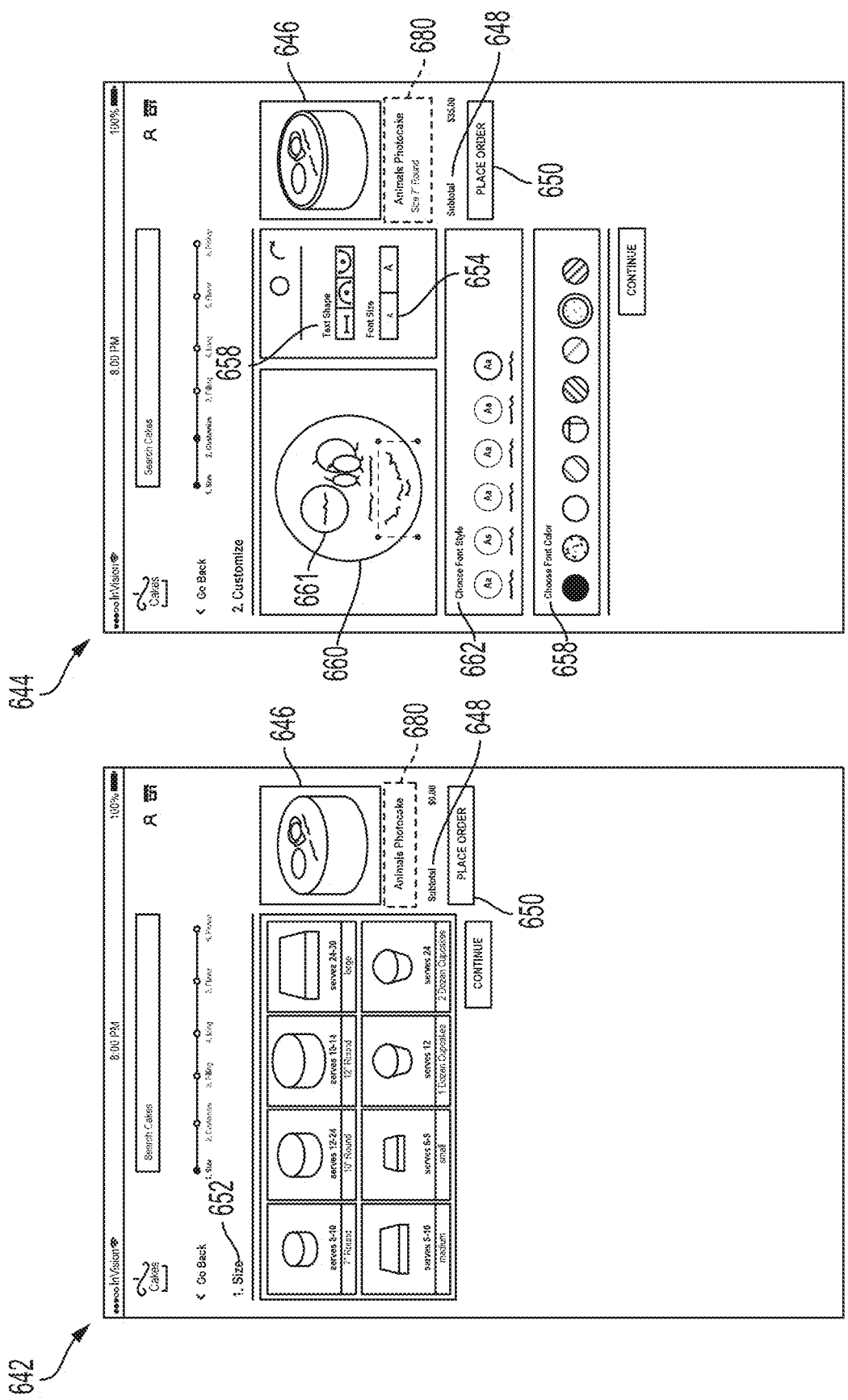
Figures 6I, 6J:
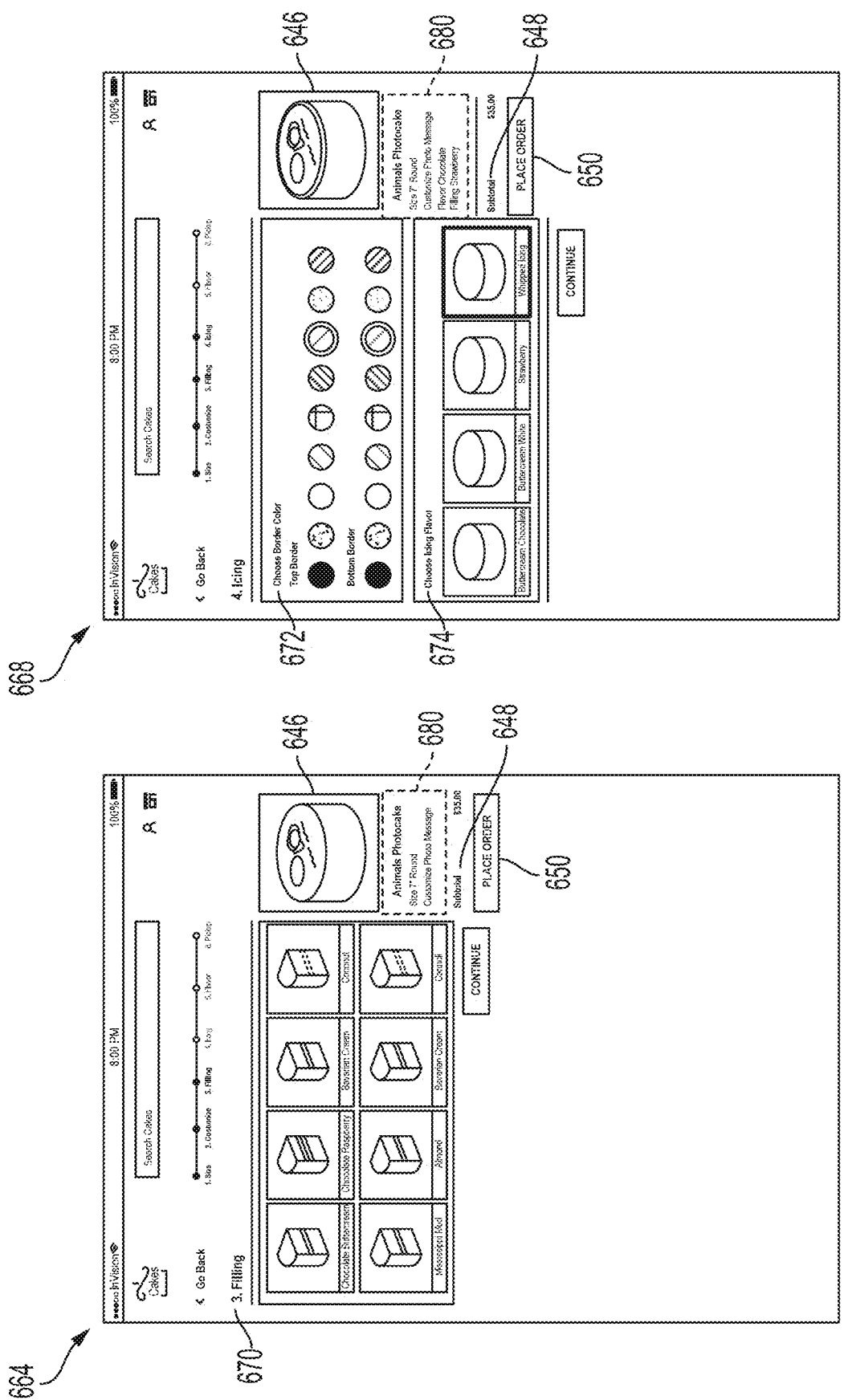

FIG. 6G illustrates a size selection UI screen 642 that includes selectable cake sizes 652. In some examples, each of the displayed cake sizes includes a number of people that the corresponding cake size is designed to serve. FIG. 6H illustrates a text and photo editing UI screen 644 that provides the consumer the ability to add and edit text to be applied to the cake. For example, the UI screen 644 provides the ability to add a photo to the cake design 661, edit font style 662, font size 654, color 656, and shape 658. As the consumer makes each text editing selection and/or photo selection, a mock-up 660 of the text and/or photograph presented on the cake is adjusted in real-time to reflect each edit that is made. FIG. 6O illustrates a portion of an example text and photo editing UI screen 601 that provides additional features 603-611 related to photo editing. In some examples, the additional features 603-611 are integrated into the UI screen 644 of FIG. 6H. In some implementations, responsive to clicking on photo location 611 of a cake mock-up 316 or an "add photo" selection 603, image editing engine 214 provides the user UI screens to upload a photo for placement within the photo location 611. Upon receiving a selection of "remove photo" 605, the image editing engine 214 removes a previously selected image from the photo location 611. In some embodiments, responsive to receiving user inputs at resizing selectors 607, 609, the image editing engine 214 increases or decreases a size of the photo location 611 on the cake mock-up 613. For example, responsive to receiving selection of a size reduction selector 607, the image editing engine 214 reduces the size of the photo location 611. In contrast, when the size enlarging selector 609 is selected, the size of the photo location 611 is increased. FIG. 6I illustrates a cake filling selection UI screen 664 that includes selectable cake filling flavors 670. FIG. 6J illustrates an icing border color and icing flavor selection UI screen 668 that includes selectable icing border colors 672 and icing flavors 674. FIG. 6K illustrates a cake flavor selection UI screen 676 that includes selectable cake flavors 681.

Figure 7B:
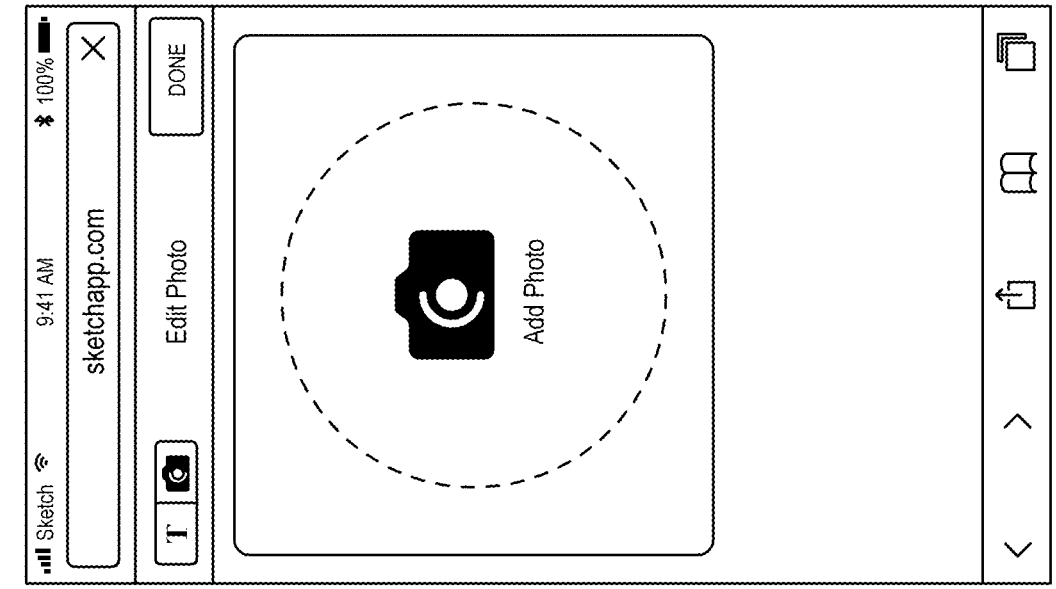
FIGS. 7A-7D illustrate example user interface screens for supplying a photo for a customized cake product.
Figure 7A:
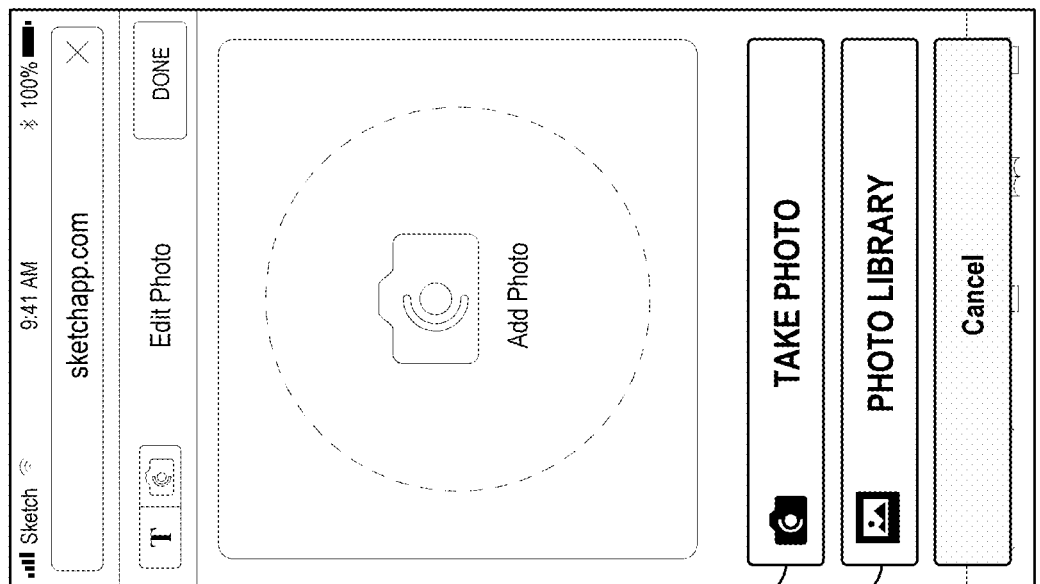
Figure 7D:
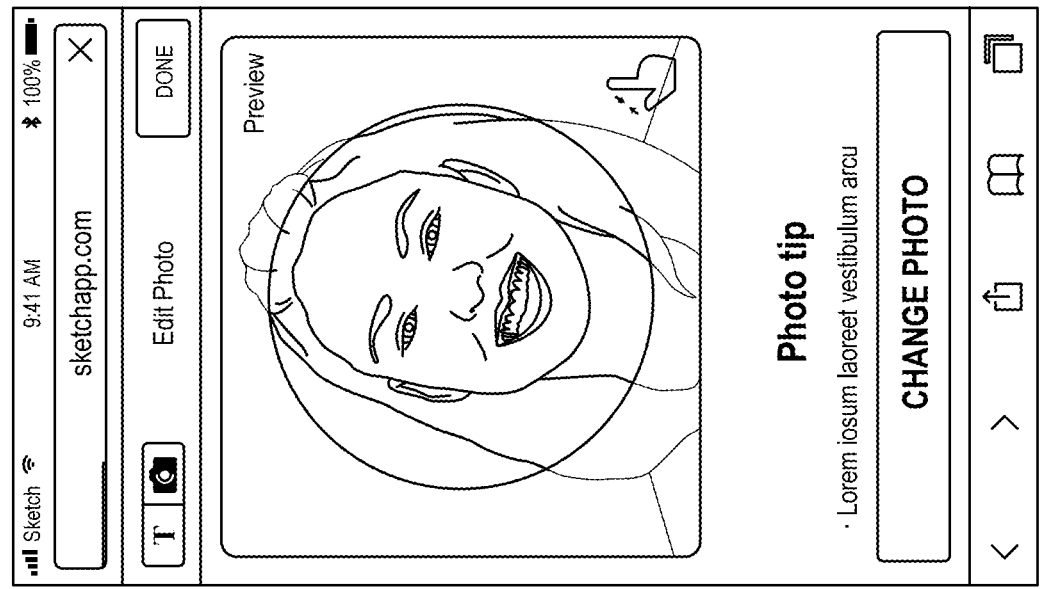
Figure 7C:
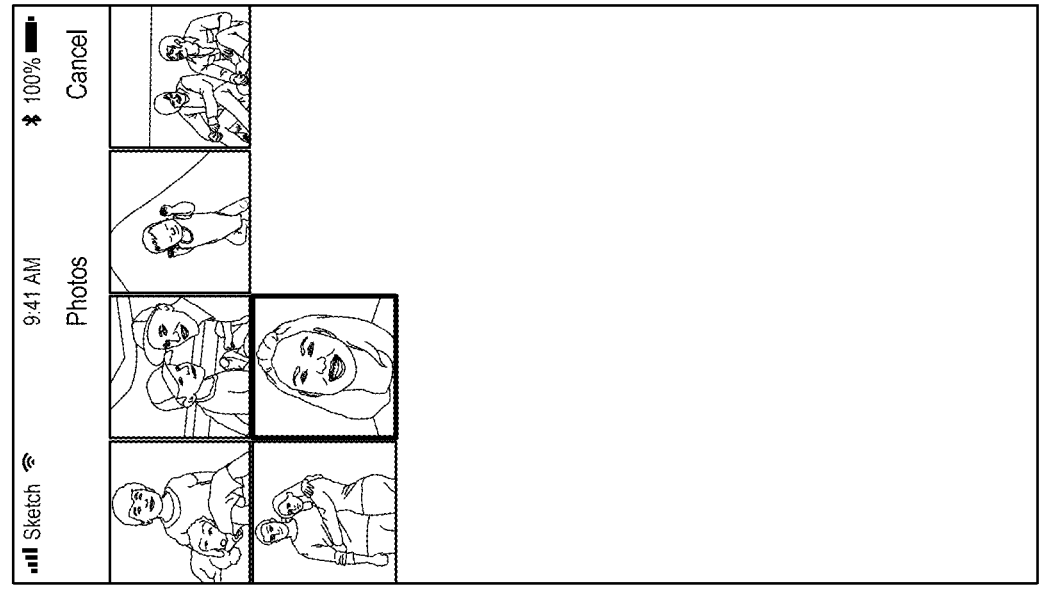

FIGS. 7A-7D illustrate photo editing UI screens 700-706 that allow consumers to take or upload a photo to be applied to an edible medium for the cake product. For example, photo editing UI screen 700 shown in FIG. 7A includes links for selecting whether to take a photo 708 with the built-in or connected camera on the device or search for a photo in a photo library 710. If the take a photo link 708 is selected, then UI screen 702 shown in FIG. 7B is presented, which allows the consumer to obtain a photo with the device camera to be printed on the edible media. If the photo library link 710 is selected in the photo editing UI screen 700 of FIG. 7A, then a photo library UI screen 704 is presented, which allows the consumer to select a photo that is stored in memory of the device. Once the desired photo is obtained, then the consumer-facing design engine 210 presents photo editing UI screen 706 as shown in FIG. 7D, which allows the consumer to crop the selected photo to fit within boundaries set by the edible medium associated with the selected cake product.

FIG. 6L illustrates an order review UI screen 678 that allows the consumer to view a visual representation of the completed cake product 646, a listing of all of the customization selections that have been made for the completed cake product 680, a price sub-total 648 for the cake, a price total 682 that reflects the price of the cake product and any additional accessory items 690 selected by the consumer (e.g., birthday candles), and a "place order" link 650. In some implementations, the order review UI screen 678 also includes input fields for selecting a pickup date 684, providing a note to the bakery 686, providing contact information for the consumer 688, and selecting accessory items 690. In one example, the input field for selecting the pickup date 684 can be provided to the consumer earlier in the customization process, such as at the UI screen 600 (FIG. 6A). When the place order link 650 is selected, in some embodiments, the customized cake order is submitted to the system 100, and the consumer-facing design engine 210 presents an order confirmation UI screen 692 as shown in FIG. 6M. The order confirmation UI screen 692 provides a notification to the consumer that the customized cake product order has been submitted to the selected bakery.

Figure 6N:
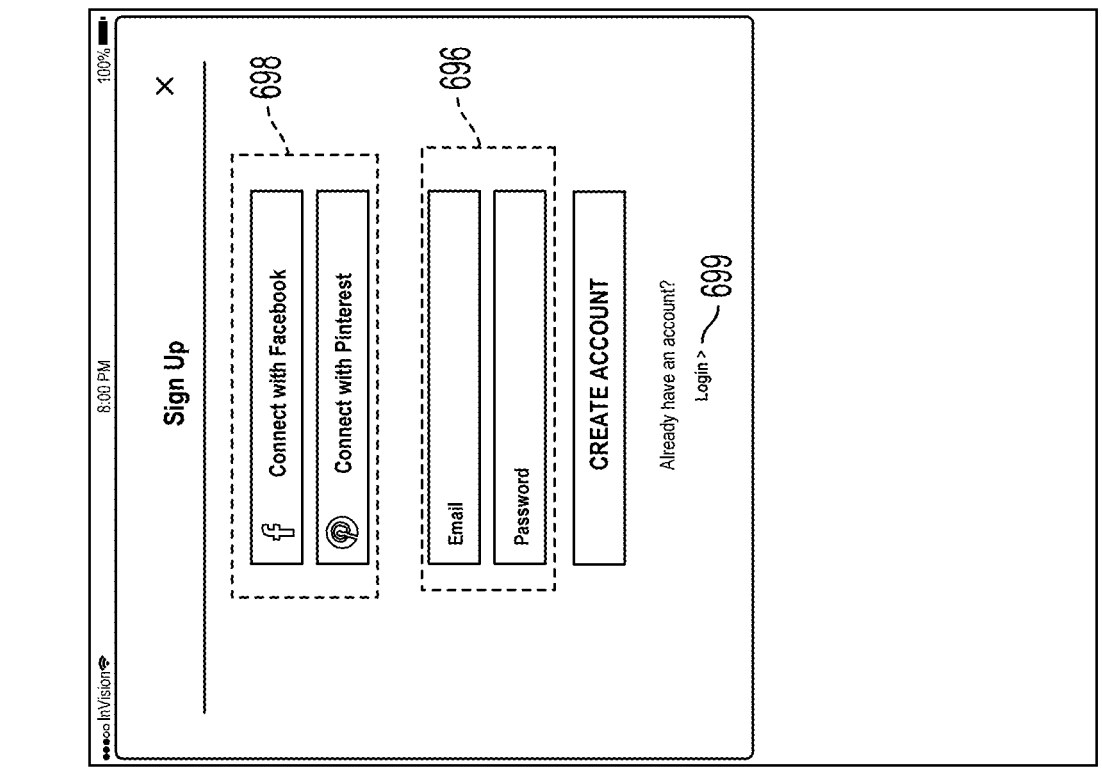
Figure 6M:
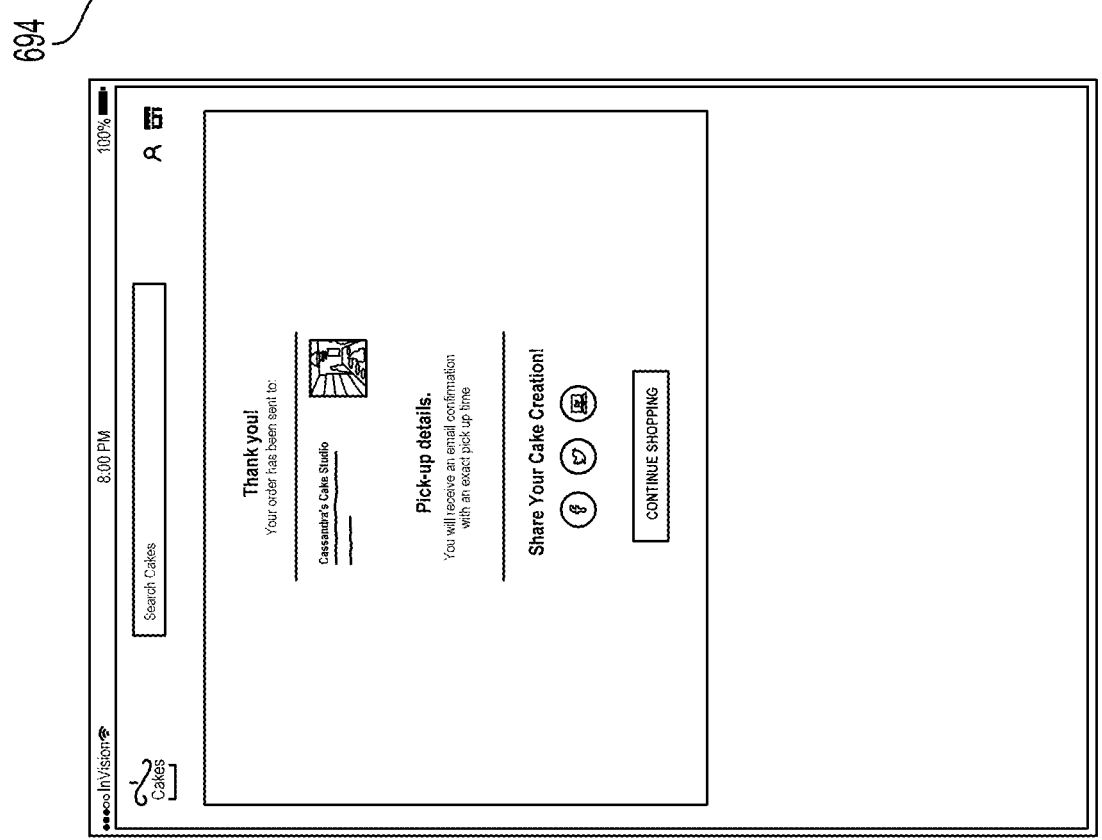
Figure 60:
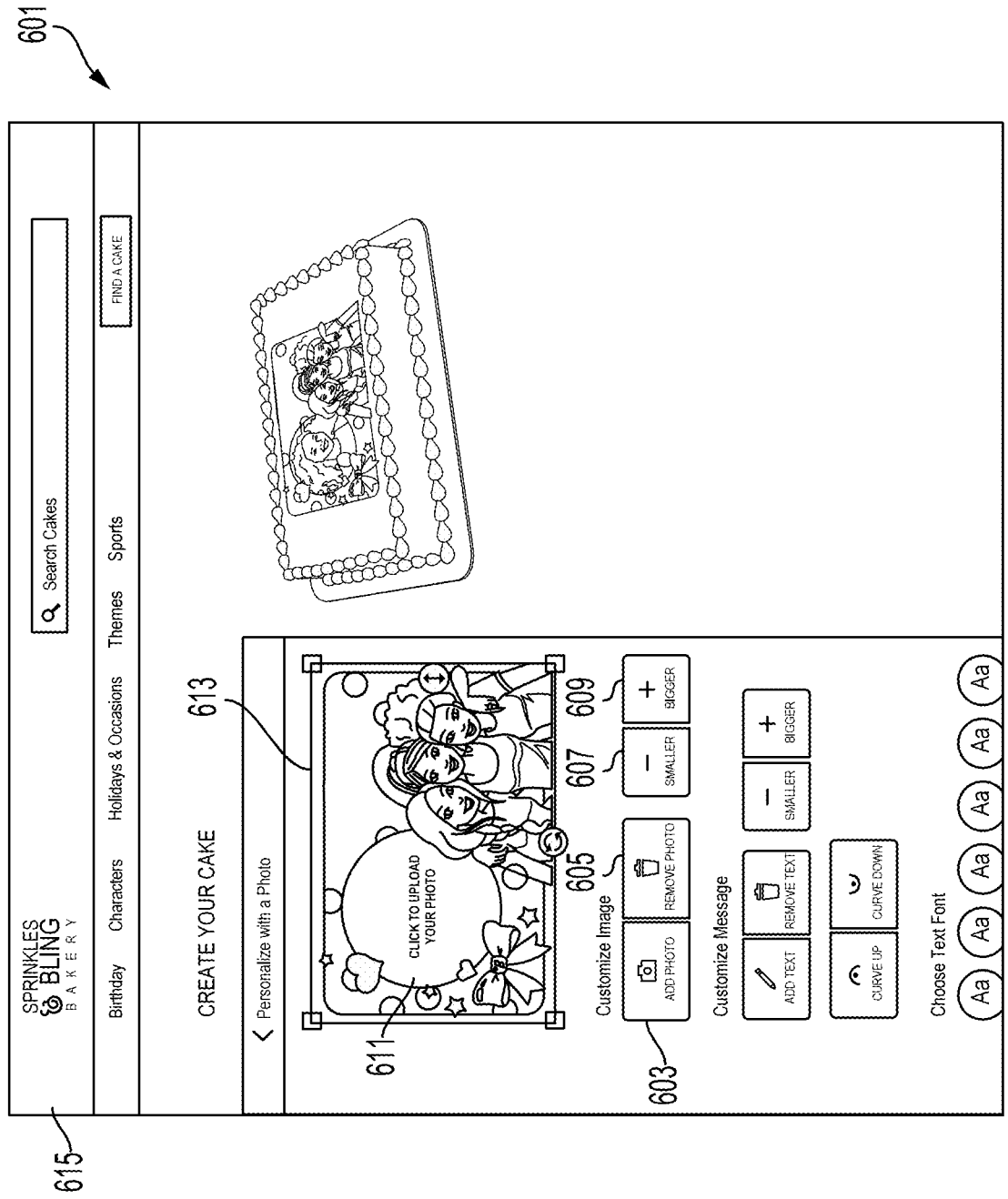
Figure 6Q:
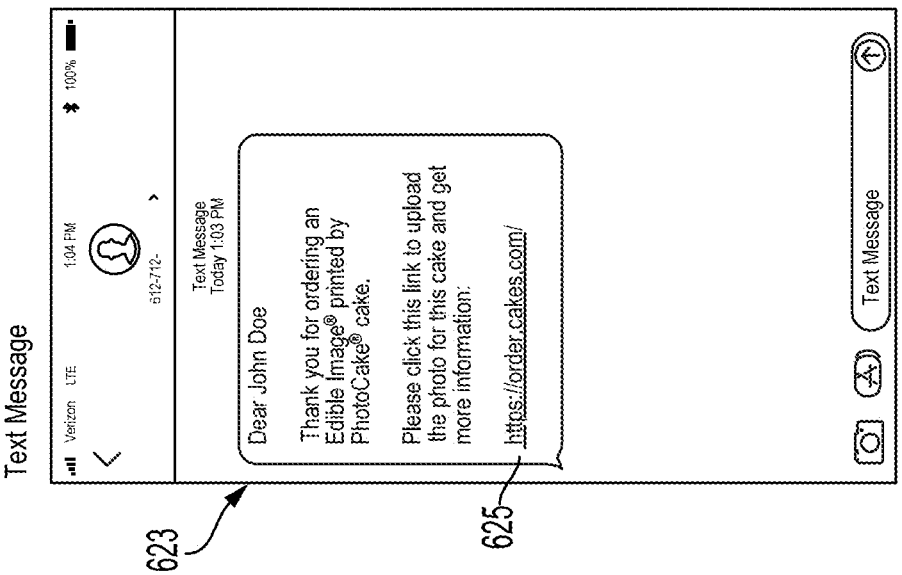
Figure 6P:
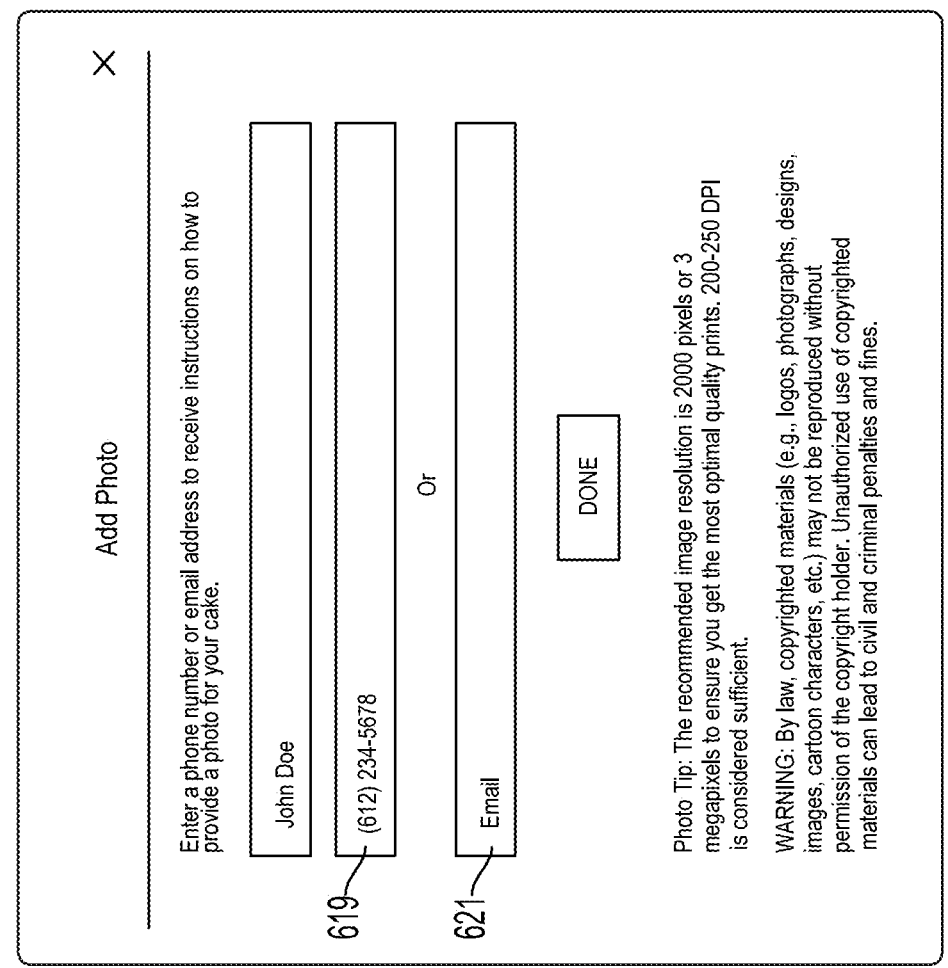
Figure 6R:
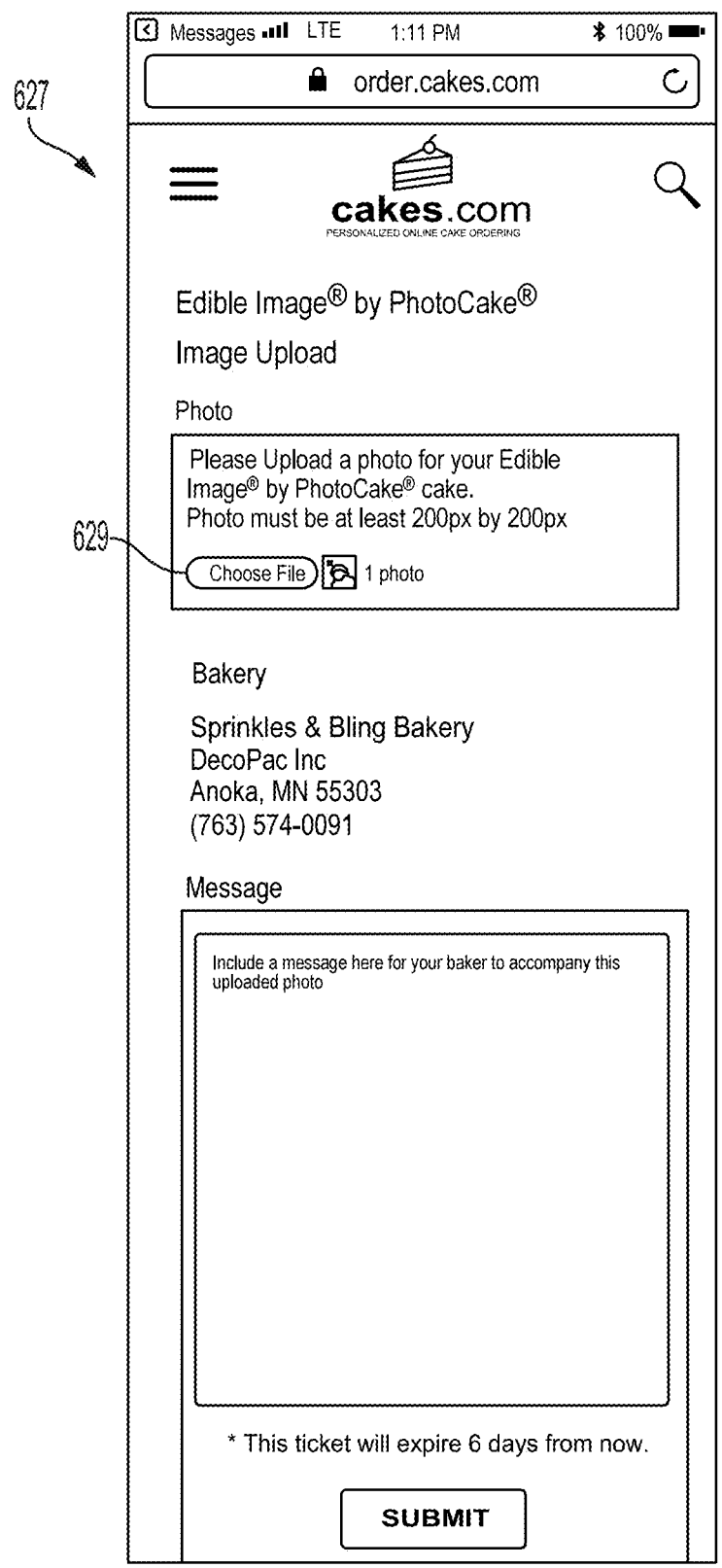

FIG. 6N illustrates an account creation UI screen 694. In some embodiments, if a first-time consumer is interacting with the system 100, the user account engine 218 presents the account creation UI screen 692 at the consumer computing device 122, which allows the consumer to provide credentials (e.g., email address, password) for logging in to the system 696. In some implementations, consumers may also create an account by linking the account to an existing social media account 698. In some embodiments, a consumer who already has an account can select a login link 699 to be directed to an account login UI screen for existing consumers.

Turning to FIG. 8, a bakery administrative UI screen 800 is illustrated. In some implementations, the customer administration engine 238 receives decorating instructions and 2D or 3D edible media print data for customized food product orders from the central control device 132 and displays information for incoming customized cake product orders on the bakery administrative UI screen 800. In one example, the UI screen 800 includes a summary section 802 that displays total numbers of new orders, orders accepted by the bakery, cancelled orders, and completed orders over a predetermined period of time (e.g., one day, one week).

In some implementations, the bakery administrative UI screen 800 can also include an order detail section 804 that displays attributes of the order, which can include an order identification number, a pickup date, a descriptive name for the food product, a price, an order source (e.g., consumer computing device, kiosk), and a current status. In some implementations, when a bakery/deli employee or other user clicks on the attributes of a particular order, the bakery administrative engine 238 displays the decorating instructions for the customized food product as well as a link to access any 2D or 3D edible media print data. In the example shown in FIG. 8, the order detail section 804 displays the attributes of the most recently received orders at the bakery. In other examples, the order detail section 804 can display the attributes for received orders in a priority order for processing. For example, the priority processing order can be based on a number of factors that may include pickup date, order reception date, type of edible media for the order, inventory at the bakery, preparation lead time for the order, and details for other orders that are in progress at the bakery. In some examples, the bakery administrative engine 238 adjusts the processing order for the orders displayed in the order detail section 804 in real-time to reflect an optimal processing order for all orders that have been received at the bakery.

System Hardware

Next, a hardware description of the computing device, mobile computing device, or server according to exemplary embodiments is described with reference to FIG. 9. In FIG. 9, the computing device, mobile computing device, or server includes a CPU 900 which performs the processes of the central control device 132, local control device 128, consumer computing device 122, and/or kiosk 161 (FIG. 1) described above. The process data and instructions may be stored in memory 902. These processes and instructions may also be stored on a storage medium disk 904 (for example, data repository 129 in system 100) such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 900 and an operating system such as Microsoft Windows, UNIX, Solaris, LINUX, Apple MAC-OS and other systems known to those skilled in the art.

CPU 900 may be a Xenon or Core processor from Intel of America or an Opteron processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The computing device, mobile computing device, or server in FIG. 9 also includes a network controller 906, such as an Intel Ethernet PRO network interface card from Intel Corporation of America, for interfacing with network 928. As can be appreciated, the network 928 can be a public network, such as the Internet, or a private network such as an LAN or WAN network, or any combination thereof and can also include PSTN or ISDN sub-networks. The network 928 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device, mobile computing device, or server further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as edible media printer 134 (FIG. 1).

A sound controller 920 is also provided in the computing device, mobile computing device, or server, such as Sound Blaster X-Fi Titanium from Creative, to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the computing device, mobile computing device, or server. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure (for example, methods 300 and 400 (FIGS. 3A-C and FIG. 4). Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 10:
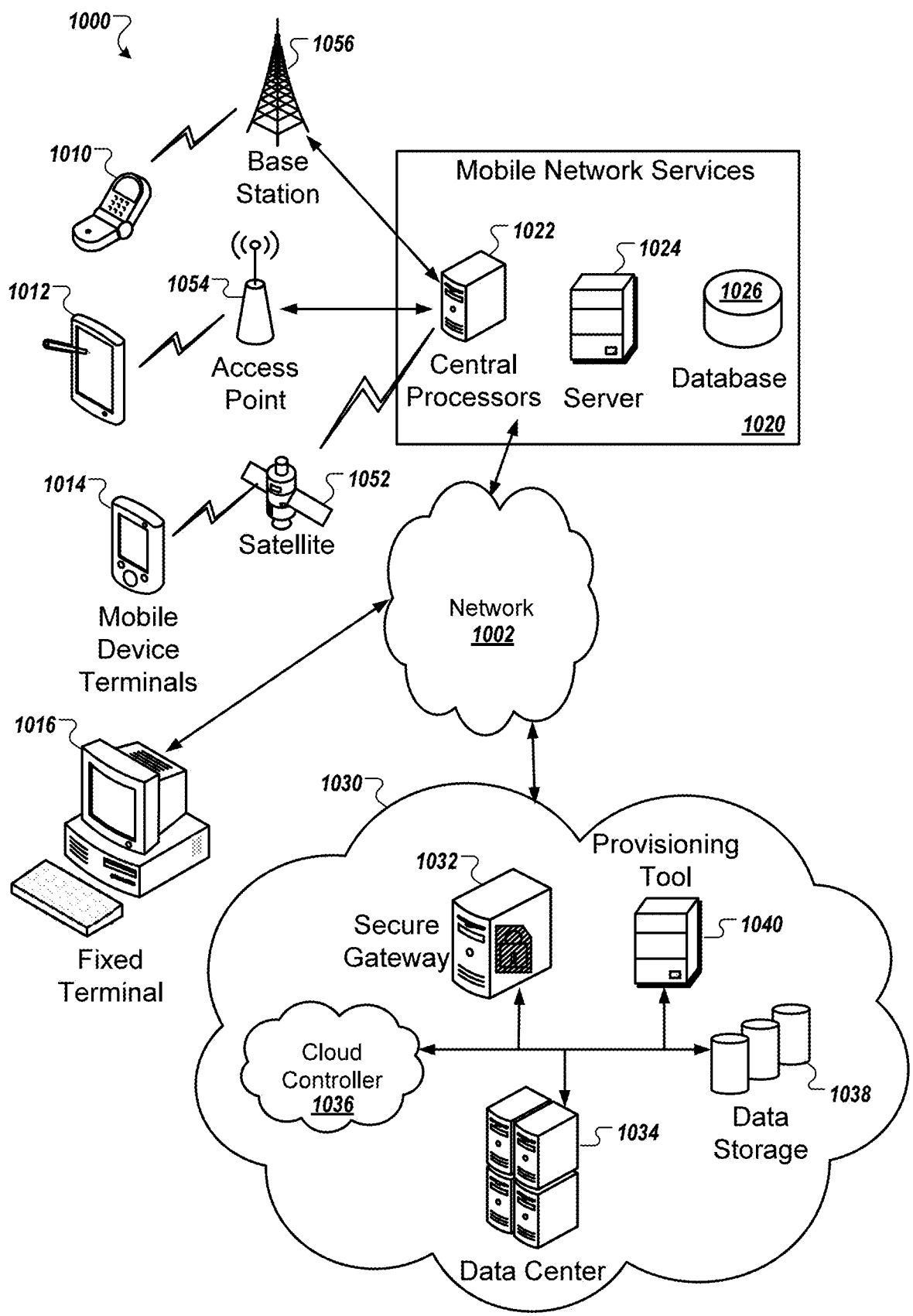
FIG. 10 is a block diagram of an example distributing computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 1030 to perform at least portions of methods or algorithms detailed above. The processes associated with the methods described herein can be executed on a computation processor by data center 1034. The data center 1034, for example, can also include an application processor that can be used as the interface with the systems described herein to receive data and output corresponding information. The cloud computing environment 1030 may also include one or more databases 1038 or other data storage, such as cloud storage and a query database. In some implementations, the cloud storage database 1038 may store processed and unprocessed data supplied by systems described herein.

The systems described herein may communicate with the cloud computing environment 1030 through a secure gateway 1032. In some implementations, the secure gateway 1032 includes a database querying interface.

The cloud computing environment 1030 may include a provisioning tool 1040 for resource management. The provisioning tool 1040 may be connected to the computing devices of a data center 1034 to facilitate the provision of computing resources of the data center 1034. The provisioning tool 1040 may receive a request for a computing resource via the secure gateway 1032 or a cloud controller 1036. The provisioning tool 1040 may facilitate a connection to a particular computing device of the data center 1034.

A network 1002 represents one or more networks, such as the Internet, connecting the cloud environment 1030 to a number of client devices such as, in some examples, a cellular telephone 1010, a tablet computer 1012, a mobile computing device 1014, and a desktop computing device 1016. The network 1002 can also communicate via wireless networks using a variety of mobile network services 1020 such as Wi-Fi, Bluetooth, cellular networks including EDGE, 3G and 4G wireless cellular systems, or any other wireless form of communication that is known. The mobile network services 1020 can include a number of associated central processors 1022, servers 1024, and databases 1026. In some implementations, the client devices 1010, 1012, 1014 can connect to the mobile network services 1020 through access point 1054, base station 1056, and/or satellite 1052. In some embodiments, the network 1002 is agnostic to local interfaces and networks associated with the client devices to allow for integration of the local interfaces and networks configured to perform the processes described herein.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for designing and producing customized food products, the system comprising:
   processing circuitry; and
   a non-transitory computer readable memory coupled to the processing circuitry, the memory storing machine-executable instructions, wherein the machine-executable instructions, when executed on the processing circuitry, cause the processing circuitry to
   receive, from a plurality of remote computing devices via a first network, a plurality of requests from a plurality of users, each request to design a respective customized food product incorporating a respective printed edible medium, wherein
      each request designates a preferred food product producer for picking up the respective customized food product upon completion, and
      each individual request of the plurality of requests is received at a different time throughout a given day,
   for each of the plurality of requests,
      calculate, based in part on a current and/or anticipated availability of a plurality of items in a product inventory at the preferred food product producer, a preparation lead time for the respective customized food product, wherein the plurality of items includes a respective substrate for the respective printed edible medium,
      prepare for presentation, in real-time responsive to receiving the respective request, one or more customization user interface screens to the respective remote computing device via the first network,
         wherein the one or more customization user interface screens provide one or more customization options for the respective customized food product, and wherein the one or more customization options are presented based in part on the current and/or anticipated availability of at least one item of the plurality of items in the product inventory at the preferred food product producer, convert, responsive to receiving, via the first network from the respective remote computing device, an order submission for the respective customized food product, customization option selections made at the one or more customization user interface screens into respective decorating instructions for the respective customized food product, wherein the respective decorating instructions include respective print data for printing onto a selected substrate at a printer of the preferred food product producer, wherein converting the customization option selections into the respective print data includes generating the respective print data that is customized to one or more properties of a printer at the preferred food product producer, wherein customizing the respective print data comprises automatically adjusting, based on the properties of the printer, contents of a data file for printing onto the respective substrate, determine, based in part on attributes of the respective decorating instructions for the respective customized food product for each of the plurality of requests, a position in the preparation queue for each respective customized food product, wherein determining the position in the preparation queue for the respective customized food product includes determining a print queue position for the respective substrate for creating the printed edible medium of the customized food product in coordination with the preparation lead time of the customized food product into which the printed edible medium is to be incorporated, and wherein the print queue position is dynamically adjusted in real-time to maximize throughput and efficiency at the printer based at least in part on both a preparation lead time for the customized food product associated with the printed edible medium and the one or more properties of the printer; and transmit, responsive to receiving the order submission for each respective customized food product, the respective decorating instructions and the position in the preparation queue to a computing system at the preferred food product producer via a second network, wherein transmitting the respective decorating instructions to the computing system includes transmitting the respective print data including the data file for printing onto the respective substrate to the printer.

2. The system of claim 1, wherein the preferred food product producer is a bakery or a deli.

3. The system of claim 1, wherein the machine-executable instructions, when executed on the processing circuitry, further cause the processing circuitry to:
receive, from the printer via the second network, a printer status signal indicating amounts of edible ink within each of a plurality of print cartridges of the printer, and
adjust the print queue position for printing onto the respective substrate based on the respective amounts of the edible ink in the plurality of print cartridges being used at a substantially similar rate.

4. The system of claim 1, wherein determining the print queue position for the respective substrate comprises determining the print queue position based on a type and size of substrate associated with the respective printed edible medium.

5. The system of claim 4, wherein determining the print queue position for the respective substrate comprises positioning the respective substrate in a printing queue such that the respective printed edible medium is printed consecutively with other substrates of the same type and size.

6. The system of claim 1, wherein the machine-executable instructions, when executed on the processing circuitry, further cause the processing circuitry to:
automatically transmit, responsive to determining that the respective printed edible medium occupies a highest print queue position, the print data for the respective substrate to the printer of the preferred food product producer.

7. The system of claim 1, wherein the product inventory comprises current and/or anticipated quantities of each of the plurality of items maintained by the preferred food product producer.

8. The system of claim 7, wherein the plurality of items in the product inventory comprises at least one of edible media, edible ink, replacement parts, printheads, food product ingredients, or consumable decorating materials.

9. The system of claim 7, wherein the machine-executable instructions, when executed on the processing circuitry, further cause the processing circuitry to:
automatically adjust in real-time, responsive to receiving a completion signal from the computing system at the preferred product producer indicating that preparation of the respective customized food product is complete, the quantities of respective items of the plurality of items used to produce the respective customized food product.

10. The system of claim 9, wherein adjusting the quantities of the respective items comprises
computing, based on attributes of the respective customized food product, amounts of the respective inventory items used to produce the respective customized food product, and
automatically adjusting in real-time, the quantities of the respective items of the plurality of items based on the computed amounts.

11. The system of claim 9, wherein the machine-executable instructions, when executed on the processing circuitry, further cause the processing circuitry to:
automatically initiate, at a third remote computing device of an inventory item vendor responsive to adjusting the quantities of one or more of the respective items to an amount less than a predetermined threshold, an order for the one or more of the respective items without interaction by a user at the preferred product producer with the system.

12. The system of claim 9, wherein the machine-executable instructions, when executed on the processing circuitry, further cause the processing circuitry to:
automatically update, responsive to the adjusting of the quantities of the respective items, preparation lead times for each of the customized food products for the plurality of requests based on the updated quantities of the respective items.

13. The system of claim 1, wherein the decorating instructions further comprise at least one of a recipe, ingredient amounts, edible media placement locations, or decoration placement locations for producing the respective customized food product.

14. The system of claim 1, wherein converting the customization option selections into the respective decorating instructions for the respective customized food product comprises, when the respective printed edible medium is a 3D printed edible medium, generating a finite element model of the respective printed edible medium from the customization option selections made at the one or more customization user interface screens.

15. The system of claim 14, wherein converting the customization option selections into the respective decorating instructions for the respective customized food product further comprises determining, from the finite element model for the respective printed edible medium, a center of mass and stability of the respective printed edible medium.

16. The system of claim 15, wherein the machine-executable instructions, when executed on the processing circuitry, further cause the processing circuitry to:
generate, from the finite element model for the respective printed edible medium, assembly instructions for the respective printed edible medium, wherein generating the assembly instructions comprises identifying at least one of a base and attachment features for the respective printed edible medium based on the center of mass and the stability of the respective printed edible medium.

17. The system of claim 1, wherein the printer is one of a plurality of printers at the preferred product producer.

18. The system of claim 17, wherein the machine-executable instructions, when executed on the processing circuitry, further cause the processing circuitry to:
automatically select the printer from the plurality of printers at the preferred food product producer based on attributes of at least one of the respective substrate or the customized food product.

19. A method comprising:
receiving, from a plurality of remote computing devices via a first network, a plurality of requests from a plurality of users, each request to design a respective customized food product incorporating a respective printed edible medium, wherein
each request designates a preferred food product producer for picking up the respective customized food product upon completion, and
each individual request of the plurality of requests is received at a different time throughout a given day;
for each of the plurality of requests,
calculating, by processing circuitry based in part on current and/or anticipated availability of a plurality of items in a product inventory at the preferred food product producer, a preparation lead time for the respective customized food product, wherein the plurality of items includes a respective substrate for the respective printed edible medium;
preparing for presentation, by the processing circuitry in real-time responsive to receiving the respective request, one or more customization user interface screens to the respective computing device via the first network,
wherein the one or more customization user interface screens provide one or more customization options for the respective customized food product, and
wherein the one or more customization options are presented based in part on the current and/or anticipated availability of at least one item of the plurality of items in the product inventory at the preferred food product producer;
converting, by the processing circuitry responsive to receiving, via the first network from the respective remote computing device, an order submission for the respective customized food product, customization option selections made at the one or more customization user interface screens into respective decorating instructions for the respective customized food product, wherein the respective decorating instructions include respective print data for printing onto a selected substrate at a printer of the preferred food product producer
wherein converting the customization option selections into the respective print data includes generating the respective print data that is customized to one or more properties of the printer at the preferred food product producer, wherein
customizing the respective print data comprises automatically adjusting, based on the properties of the printer, contents of a data file for printing onto the respective substrate;
determining, by the processing circuitry for each of the plurality of requests based in part on a type and size of the respective substrate, a position in a print queue for printing onto each respective substrate by the printer,
wherein the position in the print queue is dynamically adjusted in real-time to maximize throughput and efficiency at the printer based at least in part on both a preparation lead time for the customized food product associated with the printed edible medium and the one or more properties of the printer; and
automatically transmitting, by the processing circuitry responsive to determining that the respective substrate occupies a highest position in the print queue, the respective print data for the respective substrate to the printer of the preferred food product producer via a second network, wherein transmitting the respective print data includes transmitting the data file for printing onto the respective substrate.

20. The system of claim 1, wherein converting the customization option selections into the respective decorating instructions includes dynamically adjusting, in real-time responsive to receiving adjusted customization selections for the respective customized food product at the one or more customization user interface screens, ingredient amounts for preparing the respective customized food product.

21. The system of claim 1, wherein presenting the one or more customization user interface screens to the first remote computing device comprises dynamically adjusting, in real-time based on ingredient amounts allocated to other respective customized food product orders associated with other requests of the plurality of requests assigned to the preferred food product producer, an availability of a portion of the one or more customization options for selection at the one or more customization user interface screens.

22. The system of claim 1, wherein adjusting the contents of the data file for printing onto the respective substrate includes applying color matching and correction to the data file based on the properties of the detected printer.

23. The system of claim 1, wherein the machine-executable instructions, when executed on the processing circuitry, further cause the processing circuitry to:

receive, from the printer via the second network, a printer status signal indicating a current status of a portion of the one or more printer properties; and dynamically adjust the print queue position for printing onto the respective substrate to maximize throughput and efficiency at the printer based on the current status indicated in the printer status signal.

24. The system of claim 1, wherein the machine-executable instructions, when executed on the processing circuitry, further cause the processing circuitry to:

automatically detect, via the second network, the printer communicatively coupled to the respective remote computing device; and determine, responsive to automatically detecting the printer, the one or more properties of the detected printer.

* * * * *